United States Patent
Zhang et al.

(10) Patent No.: US 11,825,123 B2
(45) Date of Patent: Nov. 21, 2023

(54) INTERPLAY BETWEEN IN-LOOP FILTERING AND VIDEO TILES

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Yang Wang, Beijing (CN); Ye-kui Wang, San Diego, CA (US); Zhipin Deng, Beijing (CN); Jizheng Xu, San Diego, CA (US); Hongbin Liu, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/888,227

(22) Filed: Aug. 15, 2022

(65) Prior Publication Data
US 2022/0394250 A1    Dec. 8, 2022

Related U.S. Application Data

(63) Continuation of application No. PCT/CN2021/076248, filed on Feb. 9, 2021.

(30) Foreign Application Priority Data

Feb. 14, 2020   (WO) ............... PCT/CN2020/075216

(51) Int. Cl.
*H04N 19/70* (2014.01)
*H04N 19/174* (2014.01)
(Continued)

(52) U.S. Cl.
CPC .......... *H04N 19/70* (2014.11); *H04N 19/117* (2014.11); *H04N 19/119* (2014.11);
(Continued)

(58) Field of Classification Search
CPC .... H04N 19/70; H04N 19/117; H04N 19/172; H04N 19/174; H04N 19/186;
(Continued)

(56) References Cited

U.S. PATENT DOCUMENTS

2010/0208829 A1\*   8/2010   Jang ................. H04N 21/64792
                                                                                  375/E7.027
2013/0003824 A1    1/2013   Guo et al.
(Continued)

FOREIGN PATENT DOCUMENTS

| CN | 101401428 A | 4/2009 |
|---|---|---|
| CN | 103947213 A | 7/2014 |

(Continued)

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.

(Continued)

*Primary Examiner* — Christopher S Kelley
*Assistant Examiner* — Asmamaw G Tarko
(74) *Attorney, Agent, or Firm* — Conley Rose, P.C.

(57) ABSTRACT

A method includes performing a conversion between a video comprising a video unit and a bitstream of the video, wherein the bitstream conforms to a format rule, and wherein the format rule specifies that a first syntax element indicating whether an in-loop filtering operation is per- (Continued)

formed across tile boundaries is selectively included in the bitstream based on whether or how the video unit is partitioned into tiles.

19 Claims, 30 Drawing Sheets

(51) Int. Cl.
| | |
|---|---|
| *H04N 19/186* | (2014.01) |
| *H04N 19/46* | (2014.01) |
| *H04N 19/117* | (2014.01) |
| *H04N 19/172* | (2014.01) |
| *H04N 19/82* | (2014.01) |
| *H04N 19/119* | (2014.01) |
| *H04N 19/635* | (2014.01) |

(52) U.S. Cl.
CPC ......... *H04N 19/172* (2014.11); *H04N 19/174* (2014.11); *H04N 19/186* (2014.11); *H04N 19/46* (2014.11); *H04N 19/635* (2014.11); *H04N 19/82* (2014.11)

(58) Field of Classification Search
CPC ...... H04N 19/46; H04N 19/82; H04N 19/119; H04N 19/12; H04N 19/176; H04N 19/52; H04N 19/86
USPC .................................................... 375/240.02
See application file for complete search history.

(56) References Cited

U.S. PATENT DOCUMENTS

| | | | | |
|---|---|---|---|---|
| 2013/0107973 | A1* | 5/2013 | Wang ..................... | H04N 19/82 375/E7.193 |
| 2013/0195171 | A1 | 8/2013 | Wang et al. | |
| 2015/0016551 | A1 | 1/2015 | Esenlik et al. | |
| 2015/0103920 | A1 | 4/2015 | Rapaka | |
| 2016/0165238 | A1* | 6/2016 | Cheung .................. | H04N 19/86 375/240.24 |
| 2018/0054613 | A1* | 2/2018 | Lin ........................ | H04N 19/117 |
| 2020/0021827 | A1* | 1/2020 | Wenger ................ | H04N 19/436 |
| 2021/0044838 | A1* | 2/2021 | Chen ..................... | H04N 19/96 |
| 2021/0392378 | A1 | 12/2021 | Deshpande | |
| 2023/0058538 | A1 | 2/2023 | Deng | |
| 2023/0071429 | A1 | 3/2023 | Wang | |

FOREIGN PATENT DOCUMENTS

| | | |
|---|---|---|
| CN | 104471946 A | 3/2015 |
| CN | 109219958 A | 1/2019 |
| EP | 2772051 A1 | 9/2014 |
| WO | 2014168650 A1 | 10/2014 |
| WO | 2019103126 A1 | 5/2019 |
| WO | 2021122956 A1 | 6/2021 |

OTHER PUBLICATIONS

"Information Technology—High efficiency coding and media delivery in heterogeneous environments—Part 2: High Efficiency Video Coding", Rec. ITU-T H.265, ISO/IEC JTC 1/SC 29/WG 11 N17661, 23008-2 (in force edition), Apr. 20, 2018, 8 pages.
Document: JVET-G1001-v1, Chen, J., et al., "Algorithm Description of Joint Exploration Test Model 7 (JEM 7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.
Document: JVET-P2001-vE, Bross, B., et al., Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Document: JVET-P2002-v1, Chen, J., et al., "Algorithm description for Versatile Video Coding and Test Model 7 (VTM 7)," Joint Video Experts Team (JVET) of ITU-T SG 16 WP 3 and ISO/IEC JTC 1/SC 29/WG 11 16th Meeting: Geneva, CH, Oct. 1-11, 2019, 90 pages.
Suehring, K., Retrieved From the Internet: https://vcgit.hhi.fraunhofer.de/jvet/VVCSoftware_VTM.git, VTM software, Nov. 4, 2022, 3 pages.
Document: JCTVC-AC1005-v2, Boyce, J., et al., "HEVC Additional Supplemental Enhancement Information (Draft 1)," Joint Collaborative Team on Video Coding (JCT-VC) of ITU-T SG 16 WP 3 and ISO/IEC JTC 1/SC 29/WG 11 29th Meeting: Macao, CN, Oct. 19-25, 2017, 56 pages.
Document: JVET-D0104, Lin, H-C., et al., "AHG8: Compact cube layout with tile partition," Joint Video Exploration Team (JVET) of ITU-T SG 16 WP 3 and ISO/IEC JTC 1/SC 29/WG 11 4th Meeting: Chengdu, CN, Oct. 15-21, 2016, 6 pages.
Document: JVET-L0423, Huangfu, X., et al., "CE13-related: HEC with in-loop filters using spherical neighbors," Join Video Experts Team (JVET) of ITU-T SG 16 WP 3 and ISO/IEC JTC 1/SC 29/WG 11 12th Meeting: Macao, CN, Oct. 3-12, 2018, 3 pages.
Document: JVET-Q2002-v3, Chen, J., "Algorithm description for Versatile Video Coding and Test Model 8 (VTM 8)," Joint Video Experts Team (JVET) of ITU-T SG 16 WP 3 and ISO/IEC JTC 1/SC 29/WG 11 17th Meeting: Brussels, BE, Jan. 7-17, 2020, 97 pages.
Foreign Communication From A Related Counterpart Application, International Application No. PCT/CN2021/076248, English Translation of International Search Report dated May 10, 2021, 9 pages.
Foreign Communication From A Related Counterpart Application, International Application No. PCT/CN2021/076255, English Translation of International Search Report dated Apr. 25, 2021, 10 pages.
Foreign Communication From A Related Counterpart Application, International Application No. PCT/CN2021/076262, English Translation of International Search Report dated May 10, 2021, 6 pages.
Foreign Communication From A Related Counterpart Application, Indian Application No. 202247046914, Indian Office Action dated Nov. 22, 2022, 6 pages.
Document: JVET-P0252-v1, Abe, K., et al., "AHG12: Loop filter control flag for tile boundary," Joint Video Experts Team (JVET) of ITU-T SG 16 WP 3 and ISO/IEC JTC 1/SC 29/WG 11 16th Meeting: Geneva, CH, Oct. 1-11, 2019, 3 pages.
Document: JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 452 pages.
Foreign Communication From A Related Counterpart Application, European Application No. 21753466.8, Extended European Search Report dated Mar. 13, 2023, 7 pages.
Non-Final Office Action dated May 2, 2023, 35 pages, U.S. Appl. No. 17/888,238, filed Aug. 15, 2022.
Document: JVET-O2001-vC., Bross, B., et al., "Versatile Video Coding (Draft 8)," Joint Video Experts Team (JVET) of ITU-T SG 16 WP3 and ISO/IEC JTC 1/SC29/WG 11, 17th Meeting: Brussels, BE., Jan. 7-17, 2020, 21 pages. pp. 43-45,55-56, 110-117,133-136.
DOcument: JVET-P0246, Jang, H., et al., "AHG17/Non-CE5: on loop filter processing for subpicture treated as a picture," Joint Video Experts Team (JVET) of ITU-TSG 16 WP 3 and ISO/IEC JTC 1/SC 29/WG 11 16th Meeting: Geneva, CH, Oct. 1-11, 2019, 9 pages.
Document: JVET-Q0120-v1, Zhang, L., et al., "AHG12: Control of loop filtering across subpicture/tile/slice boundaries," Joint Video Experts Team (JVET) of ITU-T SG 16 WP 3 and ISO/IEC JTC 1/SC 29/WG 11, 17th Meeting: Brussels, BE, Jan. 7-17, 2020, 13 pages.

* cited by examiner

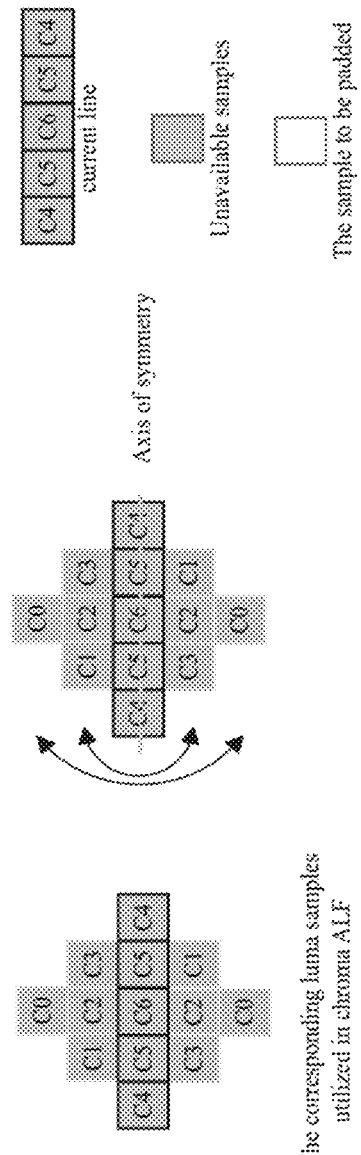
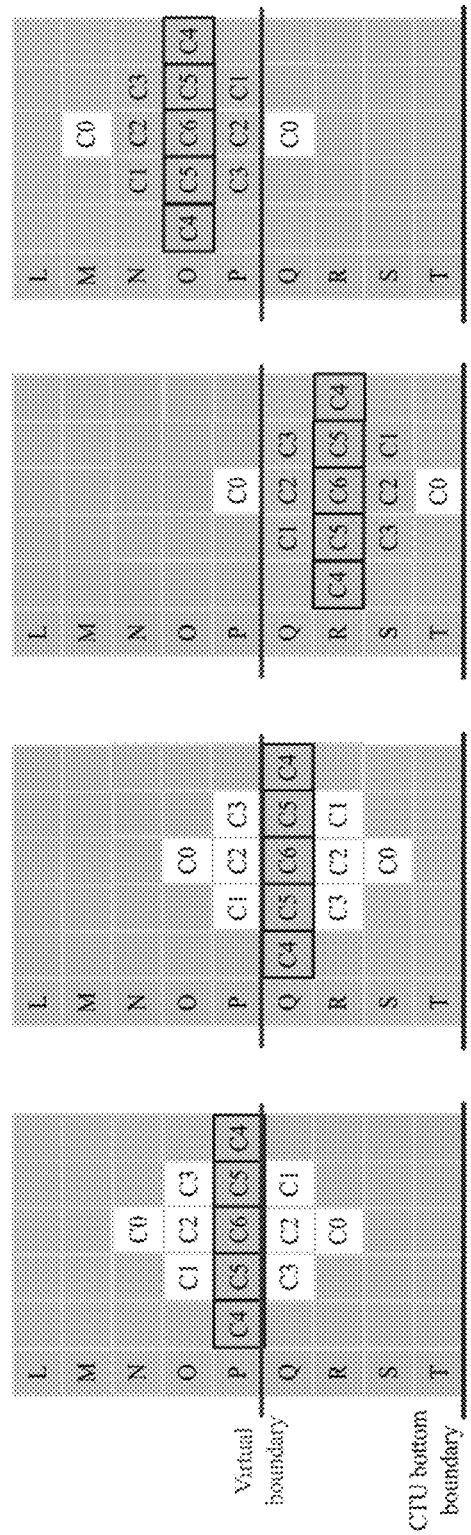
FIG. 14A  FIG. 14B  FIG. 14C  FIG. 14D

2102 — Performing a conversion between a video comprising a video unit and a bitstream of the video, wherein the bitstream conforms to a format rule, and wherein the format rule specifies that a first syntax element indicating whether an in-loop filtering operation is performed across tile boundaries is selectively included in the bitstream responsive to whether or how the video unit is partitioned into tiles

2200

Performing a conversion between a video unit of a video and a bitstream of the video, wherein the bitstream conforms to a format rule, and wherein the format rule specifies that a syntax element indicating whether an in-loop filtering operation is performed across slice boundaries is selectively included in the bitstream responsive to whether or how the video unit is partitioned into slices — 2202

Performing a conversion between a video region of a video and a bitstream of the video, wherein the bitstream conforms to a format rule, wherein the format rule specifies that information about applicability of a tool to the conversion is indicated in the bitstream at a video slice level and/or at a video picture level, and wherein the tool maps luma samples to particular values and selectively applies a scaling operation to the values of chroma samples

Performing a conversion between a video region of a video and a bitstream of the video, wherein the conversion confirms to a size rule, and wherein, the size rule specifies a maximum size of the video region coded using a transform-skip (TS) coding scheme or a block-based delta pulse code modulation (BDPCM) coding scheme, or a maximum size of a transform block for the video region according to a coding characteristic of the video region

FIG. 24

2700

2702

Performing a conversion between a video unit of a video and a bitstream of the video according to a format rule, wherein the bitstream conforms to the format rule that specifies that a minimum allowed coding block size used during the conversion controls whether and/or how a field indicative of whether a transform-skip (TS) scheme or a block-based delta pulse code modulation (BDPCM) scheme is enabled or disabled is included in the bitstream

3102 Performing a conversion between a video region of a video and a bitstream of the video region by conforming a processing rule that is applicable to the conversion due to the video being a 4:2:2 video or a 4:4:4 video, wherein the processing rule defines that chroma and luma are aligned for one or more of the following: (a) a number of pixel lines between a virtual boundary of an adaptive loop filtering (ALF) operation and a bottom boundary of a coding tree block (CTB); or (b) a filter strength of a filter applied to a row between the virtual boundary of the ALF operation and the bottom boundary of the CTB; or (c) a padding method used for padding luma and chroma samples in a same row

FIG. 31

INTERPLAY BETWEEN IN-LOOP FILTERING AND VIDEO TILES

CROSS REFERENCE TO RELATED APPLICATIONS

This application is a continuation of International Patent Application No. PCT/CN2021/076248, filed on Feb. 9, 2021 which claims the priority to and benefits of International Patent Application No. PCT/CN2020/075216, filed on Feb. 14, 2020, all of which are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders for processing coded representation of video using control information useful for decoding of the coded representation.

In an example aspect, a video processing method is disclosed. The method includes performing a conversion between a video comprising a video unit and a bitstream of the video, wherein the bitstream conforms to a format rule, and wherein the format rule specifies that a first syntax element indicating whether an in-loop filtering operation is performed across tile boundaries is selectively included in the bitstream responsive to whether or how the video unit is partitioned into tiles.

In another example aspect, a video processing method is disclosed. The method includes performing a conversion between a video unit of a video and a bitstream of the video, wherein the bitstream conforms to a format rule, and wherein the format rule specifies that a syntax element indicating whether an in-loop filtering operation is performed across slice boundaries is selectively included in the bitstream responsive to whether or how the video unit is partitioned into slices In another example aspect, a video processing method is disclosed. The method includes performing a conversion between a video region of a video and a bitstream of the video, wherein the bitstream conforms to a format rule, wherein the format rule specifies that information about applicability of a tool to the conversion is indicated in the bitstream at a video slice level and/or at a video picture level, and wherein the tool maps luma samples to particular values and selectively applies a scaling operation to the values of chroma samples.

In another example aspect, a video processing method is disclosed. The method includes performing a conversion between a video region of a video and a bitstream of the video, wherein the conversion confirms to a size rule, and wherein, the size rule specifies a maximum size of the video region coded using a transform-skip (TS) coding scheme or a block-based delta pulse code modulation (BDPCM) coding scheme, or a maximum size of a transform block for the video region according to a coding characteristic of the video region.

In another example aspect, a video processing method is disclosed. The method includes performing a conversion between a video region of a video and a bitstream of the video, wherein the bitstream conforms to a format rule that specifies that a minimum allowed coding block size used during the conversion controls whether and/or how a maximum allowed transform block size is included in the bitstream.

In another example aspect, a video processing method is disclosed. The method includes performing a conversion between a video region of a video and a bitstream of the video, wherein the bitstream conforms to a format rule that specifies that a minimum allowed coding block size used during the conversion controls whether and/or how an indication of a maximum size of a video region for coding or decoding using a transform-skip (TS) scheme or a block-based delta pulse code modulation (BDPCM) scheme is included in the bitstream.

In another example aspect, a video processing method is disclosed. The method includes performing a conversion between a video unit of a video and a bitstream of the video according to a format rule, wherein the bitstream conforms to the format rule that specifies that a minimum allowed coding block size used during the conversion controls whether and/or how a field indicative of whether a transform-skip (TS) scheme or a block-based delta pulse code modulation (BDPCM) scheme is enabled or disabled is included in the bitstream.

In another example aspect, a video processing method is disclosed. The method includes performing a conversion between a video unit of a video and a bitstream of the video according to a format rule, wherein the bitstream conforms to the format rule that specifies that a minimum allowed coding block size used during the conversion controls whether and/or how a field carrying information regarding applicability of a coding tool in the conversion is included at a video region level in the bitstream.

In another example aspect, a video processing method is disclosed. The method includes determining, for a conversion between a video region of a video and a bitstream of the video, that due to a dual-tree coding scheme being enabled for the video region, that splitting schemes used for luma component and a chroma component of the video have different minimum allowed block sizes, and performing the conversion based on the determining.

In another example aspect, a video processing method is disclosed. The method includes determining, for a conversion between a video region of a video and a bitstream of the video, a maximum number of sub-block based merge candidates allowed for the video region based on a rule; and performing the conversion based on the determining, wherein the rule specifies that maximum number of sub-block based merge candidates used during the conversion is derivable as a sum of a first variable and a second variable, wherein the first variable is equal to zero responsive to an affine prediction being disabled, and wherein the second variable is based on whether a sub-block based temporal motion vector prediction (sbTMVP) is enabled.

In another example aspect, a video processing method is disclosed. The method includes performing a conversion between a video region of a video and a bitstream of the video region by conforming a processing rule that is applicable to the conversion due to the video being a 4:2:2 video or a 4:4:4 video, wherein the processing rule defines that chroma and luma are aligned for one or more of the following: (a) a number of pixel lines between a virtual boundary of an adaptive loop filtering (ALF) operation and a bottom boundary of a coding tree block (CTB); or (b) a filter strength of a filter applied to a row between the virtual boundary of the ALF operation and the bottom boundary of the CTB; or (c) a padding method used for padding luma and chroma samples in a same row.

In another example aspect, a video processing method is disclosed. The method includes determining, for a conversion between a video unit of a video and a coded representation of the video, whether an indication of applicability of in-loop filtering across video regions of the video unit is included in the coded representation; and performing the conversion based on the determining.

In another example aspect, a video processing method is disclosed. The method includes performing a conversion between a video region of a video and a coded representation of the video, wherein the coded representation conforms to a format rule, wherein the format rule specifies that information about applicability of luma mapping with chroma scaling (LMCS) tool to the conversion is indicated in the coded representation at a video slice level; wherein, the LMCS tool includes, during the conversion, to construct the current video block based on a first domain and a second domain and/or chroma residue is scaled in a luma-dependent manner.

In another example aspect, a video processing method is disclosed. The method includes performing a conversion between a video and a coded representation of the video, wherein the conversion confirms to a size rule that specifies that: enforcing the size rule, during encoding, a maximum size of a video region coded using a transform-skip coding scheme or a delta pulse coded modulation coding scheme, or parsing and decoding the coded representation, during decoding, by enforcing the size rule for the maximum size of the video region decoded using a transform-skip decoding scheme or a delta pulse coded modulation decoding scheme.

In another example aspect, a video processing method is disclosed. The method includes performing a conversion between a video region of a video and a coded representation of the video, wherein the coded representation conforms to a format rule that specifies that a minimum allowed transform block size used during the conversion controls whether or how an indication of maximum allowed transform block size is included in the coded representation.

In another example aspect, a video processing method is disclosed. The method includes performing a conversion between a video unit of a video and a coded representation of the video according to a format rule, wherein the coded representation conforms to the format rule that specifies that a minimum allowed coding block size used during the conversion controls whether a field carrying information regarding applicability of a coding tool in the conversion is included at a video region level.

In another example aspect, a video processing method is disclosed. The method includes determining, for a conversion between a video region of a video and a coded representation of the video, that due to using a dual-tree coding is used for the conversion, that splitting schemes used for luma and chroma components of the video have different allowed minimum block sizes for the luma and chroma components, and performing the conversion based on the determining.

In another example aspect, a video processing method is disclosed. The method includes performing a conversion between a video region of a video and a coded representation of the video region by conforming a format rule for the coded representation; wherein the format rule specifies that a maximum number of sub-block based merge candidates used during the conversion is derivable as a sum of a first variable and a second variable, wherein use of affine prediction controls a value of the first variable, and wherein use of sub-block based temporal motion vector prediction controls a value of the second variable.

In another example aspect, a video processing method is disclosed. The method includes performing a conversion between a video region of a video and a coded representation of the video region by conforming a processing rule that is applicable to the conversion due to the video being a 4:2:2 or a 4:4:4 video, wherein the processing rule defines that chroma and luma are aligned for one or more of the following: (a) a number of pixel lines between a virtual boundary of an adaptive loop filtering operation and a bottom boundary of a coding tree block; or (b) a filter strength of a filter applied to a row between the virtual boundary of the adaptive loop filtering operation and the bottom boundary of the coding tree block; or (c) a padding method used for padding video samples in a row.

In yet another example aspect, a video encoder apparatus is disclosed. The video encoder comprises a processor configured to implement the above-described methods.

In yet another example aspect, a video decoder apparatus is disclosed. The video decoder comprises a processor configured to implement the above-described methods.

In yet another example aspect, a computer readable medium having code stored thereon is disclose. The code embodies one of the methods described herein in the form of processor-executable code.

These, and other, features are described throughout the present document.

BRIEF DESCRIPTION OF DRAWINGS

Figures 7A, 7B, 7C, 7D:
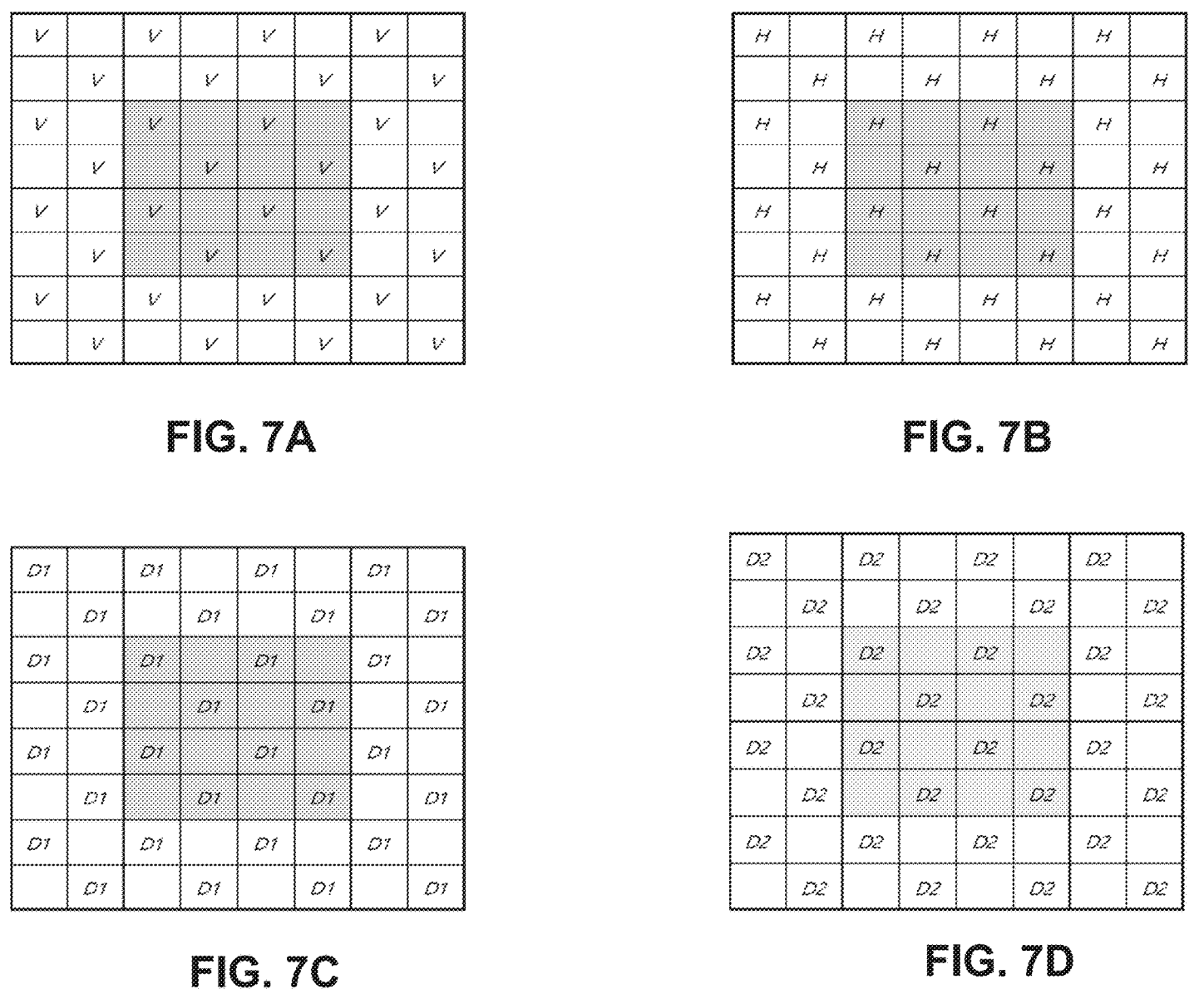

FIGS. 7A-7D show subsampled Laplacian calculation, in which FIG. 7A shows Subsampled positions for vertical gradient, FIG. 7B shows Subsampled positions for horizontal gradient, FIG. 7C shows Subsampled positions for diagonal gradient, and FIG. 7D shows Subsampled positions for diagonal gradient.

FIGS. 14A-14D show an example of mirrored padding for ALF.

FIGS. 21-31 are flowcharts for example methods of video processing.

DETAILED DESCRIPTION

Figure 1:
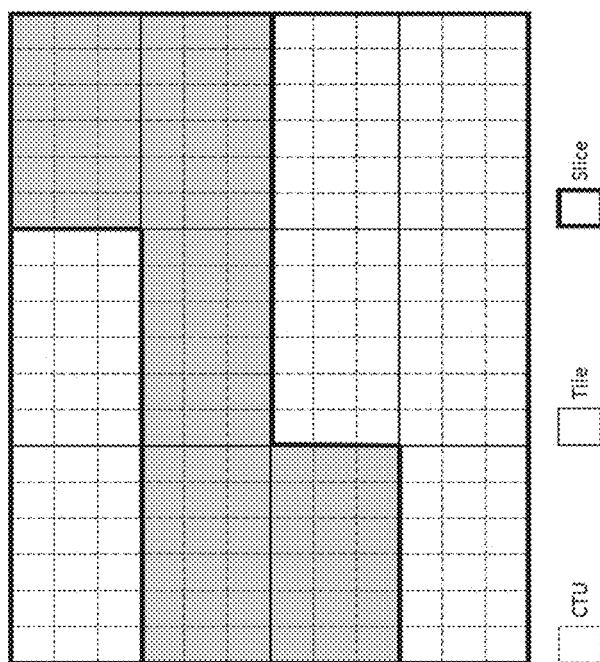
FIG. 1 shows an example of raster-scan slice partitioning of a picture, where the picture is divided into 12 tiles and 3 raster-scan slices.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Summary

This document is related to video coding technologies. Specifically, it is about signalling of subpictures, tiles, and slices. The ideas may be applied individually or in various combination, to any video coding standard or non-standard video codec that supports multi-layer video coding, e.g., the being-developed Versatile Video Coding (VVC).

2. Abbreviations

APS Adaptation Parameter Set
AU Access Unit
AUD Access Unit Delimiter
AVC Advanced Video Coding
CLVS Coded Layer Video Sequence
CPB Coded Picture Buffer
CRA Clean Random Access
CTU Coding Tree Unit
CVS Coded Video Sequence
DPB Decoded Picture Buffer
DPS Decoding Parameter Set
EOB End Of Bitstream
EOS End Of Sequence
GDR Gradual Decoding Refresh
HEVC High Efficiency Video Coding
HRD Hypothetical Reference Decoder
IDR Instantaneous Decoding Refresh
JEM Joint Exploration Model
MCTS Motion-Constrained Tile Sets
NAL Network Abstraction Layer
OLS Output Layer Set
PH Picture Header
PPS Picture Parameter Set
PTL Profile, Tier and Level
PU Picture Unit
RBSP Raw Byte Sequence Payload
SEI Supplemental Enhancement Information
SPS Sequence Parameter Set
SVC Scalable Video Coding
VCL Video Coding Layer
VPS Video Parameter Set
VTM VVC Test Model
VUI Video Usability Information
VVC Versatile Video Coding 3. Initial Discussion Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced moving pictures expert group (MPEG-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, the video coding standards are based on the hybrid video coding structure wherein temporal prediction plus transform coding are utilized. To explore the future video coding technologies beyond HEVC, the Joint Video Exploration Team (WET) was founded by VCEG and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion (FDIS) at the July 2020 meeting.

3.1. Picture Partitioning Schemes in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own network abstraction layer (NAL) unit, and in-picture prediction (intra sample prediction, motion information prediction, coding mode prediction) and entropy coding dependency across slice boundaries are disabled. Thus, a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at treeblock boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring treeblock rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. Tile column runs from the top of a picture to the bottom of the picture. Likewise, tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signalled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions may need to be fulfilled: 1) all coded treeblocks in a slice belong to the same tile; 2) all coded treeblocks in a tile belong to the same slice. Finally, a wavefront segment contains exactly one CTB row, and when WPP is in use, if a slice starts within a CTB row, it may end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that may require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2. Partitioning of Pictures in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

FIG. 1 shows an example of raster-scan slice partitioning of a picture, where the picture is divided into 12 tiles and 3 raster-scan slices.

Figure 2:
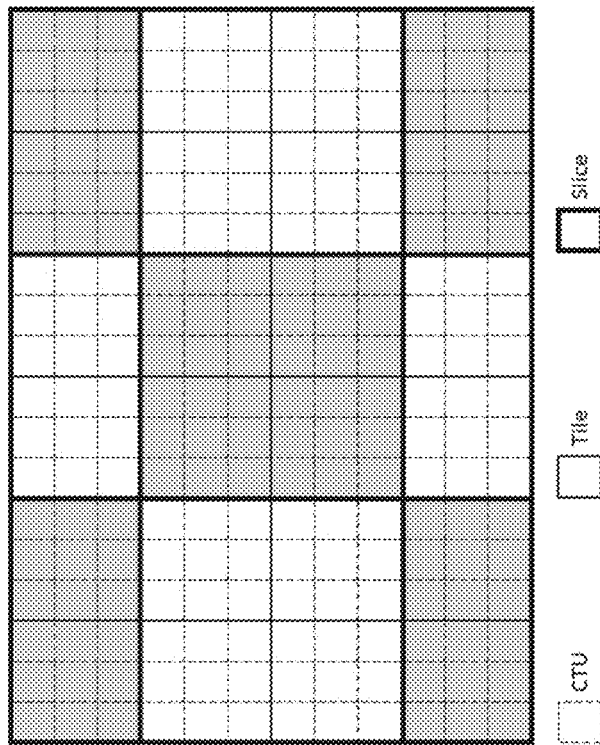
FIG. 2 shows an example of rectangular slice partitioning of a picture, where the picture is divided into 24 tiles (6 tile columns and 4 tile rows) and 9 rectangular slices.

FIG. 2 shows an example of rectangular slice partitioning of a picture, where the picture is divided into 24 tiles (6 tile columns and 4 tile rows) and 9 rectangular slices.

Figure 3:
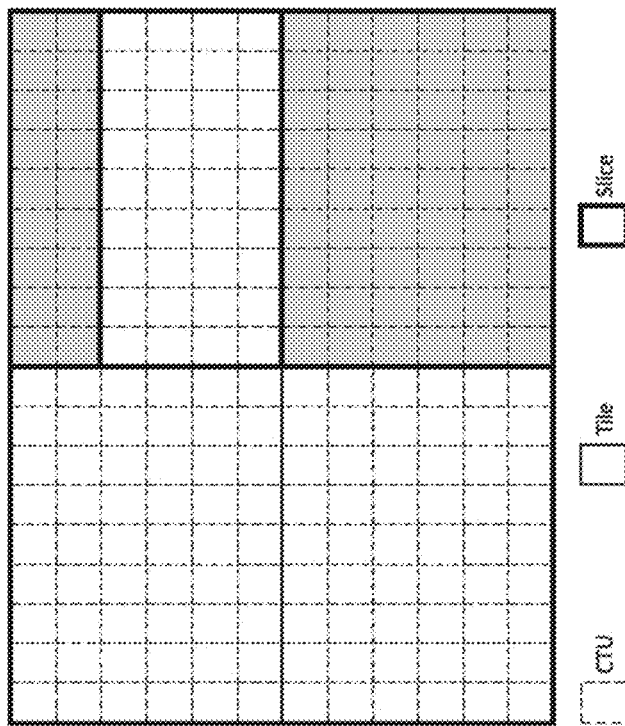
FIG. 3 shows an example of a picture partitioned into tiles and rectangular slices, where the picture is divided into 4 tiles (2 tile columns and 2 tile rows) and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
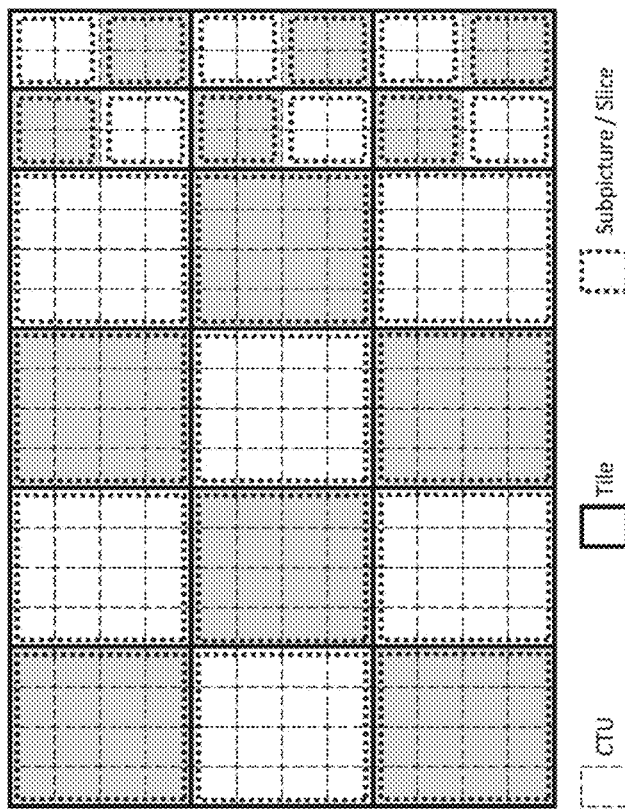
FIG. 4 shows a picture that is partitioned into 15 tiles, 24 slices and 24 subpictures.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3. Signalling of SPS/PPS/Picture Header/Slice Header in VVC (as JVET-Q2001-vB)

7.3.2.3 Sequence Parameter Set RBSP Syntax

| seq_parameter_set_rbsp( ) { | Descriptor |
|---|---|
| sps_seq_parameter_set_id | u(4) |
| sps_video_parameter_set_id | u(4) |
| sps_max_sublayers_minus1 | u(3) |
| sps_reserved_zero_4bits | u(4) |
| sps_ptl_dpb_hrd_params_present_flag | u(1) |
| if( sps_ptl_dpb_hrd_params_present_flag ) | |
|    profile_tier_level( 1, sps_max_sublayers_minus1 ) | |
| gdr_enabled_flag | u(1) |
| chroma_format_idc | u(2) |
| if( chroma_format_idc = = 3 ) | |
|    separate_colour_plane_flag | u(1) |
| res_change_in_clvs_allowed_flag | u(1) |
| pic_width_max_in_luma_samples | ue(v) |
| pic_height_max_in_luma_samples | ue(v) |
| sps_conformance_window_flag | u(1) |
| if( sps_conformance_window_flag ) { | |
|    sps_conf_win_left_offset | ue(v) |
|    sps_conf_win_right_offset | ue(v) |
|    sps_conf_win_top_offset | ue(v) |
|    sps_conf_win_bottom_offset | ue(v) |
| } | |
| sps_log2_ctu_size_minus5 | u(2) |
| subpic_info_present_flag | u(1) |
| if( subpic_info_present_flag ) { | |
|    sps_num_subpics_minus1 | ue(v) |
|    sps_independent_subpics_flag | u(1) |
|    for( i = 0; sps_num_subpics_minus1 > 0 && i <= sps_num_subpics_minus1; i++ ) { | |
|      if( i > 0 && pic_width_max_in_luma_samples > CtbSizeY ) | |
|        subpic_ctu_top_left_x[ i ] | u(v) |
|      if( i > 0 && pic_height_max_in_luma_samples > CtbSizeY ) { | |
|        subpic_ctu_top_left_y[ i ] | u(v) |
|      if( i < sps_num_subpics_minus1 && pic_width_max_in_luma_samples > CtbSizeY ) | |
|        subpic_width_minus1[ i ] | u(v) |
|      if( i < sps_num_subpics_minus1 && pic_height_max_in_luma_samples > CtbSizeY ) | |
|        subpic_height_minus1[ i ] | u(v) |
|      if(! ps_independent_subpics_flag ) { | |
|        subpic_treated_as_pic_flag[ i ] | u(1) |
|        loop_filter_across_subpic_enabled_flag[ i ] | u(1) |
|      } | |
|    } | |
|    sps_subpic_id_len_minus1 | ue(v) |
|    subpic_id_mapping_explicitly_signalled_flag | u(1) |
|    if( subpic_id_mapping_explicitly_signalled_flag ) { | |
|      subpic_id_mapping_in_sps_flag | u(1) |
|      if( subpic_id_mapping_in_sps_flag ) | |
|        for( i = 0; i <= sps_num_subpics_minus1; i++ ) | |
|          sps_subpic_id[ i ] | u(v) |
|    } | |
| } | |
| bit_depth_minus8 | ue(v) |
| sps_entropy_coding_sync_enabled_flag | u(1) |
| if( sps_entropy_coding_sync_enabled_flag ) | |
|    sps_wpp_entry_point_offsets_present_flag | u(1) |
| sps_weighted_pred_flag | u(1) |
| sps_weighted_bipred_flag | u(1) |
| log2_max_pic_order_cnt_lsb_minus4 | u(4) |
| sps_poc_msb_flag | u(1) |
| if( sps_poc_msb_flag ) | |
|    poc_msb_len_minus1 | ue(v) |
| num_extra_ph_bits_bytes | u(2) |
|    extra_ph_bits_struct( num_extra_ph_bits_bytes ) | |

-continued

| seq_parameter_set_rbsp( ) { | Descriptor |
|---|---|
|   num_extra_sh_bits_bytes | u(2) |
|     extra_sh_bits_struct( num_extra_sh_bits_bytes ) | |
|   if( sps_max_sublayers_minus1 > 0 ) | |
|     sps_sublayer_dpb_params_flag | u(1) |
|   if( sps_ptl_dpb_hrd_params_present_flag ) | |
|     dpb_parameters( sps_max_sublayers_minus1, sps_sublayer_dpb_params_flag ) | |
|   long_term_ref_pics_flag | u(1) |
|   inter_layer_ref_pics_present_flag | u(1) |
|   sps_idr_rpl_present_flag | u(1) |
|   rpl1_same_as_rpl0_flag | u(1) |
|   for( i = 0; i < !rpl1_same_as_rpl0_flag ? 2 : 1; i++ ) { | |
|     num_ref_pic_lists_in_sps[ i ] | ue(v) |
|     for( j = 0; j < num_ref_pic_lists_in_sps[ i ]; j++) | |
|       ref_pic_list_struct( i, j ) | |
|   } | |
|   if( ChromaArrayType != 0 ) | |
|     qtbtt_dual_tree_intra_flag | u(1) |
|   log2_min_luma_coding_block_size_minus2 | ue(v) |
|   partition_constraints_override_enabled_flag | u(1) |
|   sps_log2_diff_min_qt_min_cb_intra_slice_luma | ue(v) |
|   sps_max_mtt_hierarchy_depth_intra_slice_luma | ue(v) |
|   if( sps_max_mtt_hierarchy_depth_intra_slice_luma != 0 ) { | |
|     sps_log2_diff_max_bt_min_qt_intra_slice_luma | ue(v) |
|     sps_log2_diff_max_tt_min_qt_intra_slice_luma | ue(v) |
|   } | |
|   sps_log2_diff_min_qt_min_cb_inter_slice | ue(v) |
|   sps_max_mtt_hierarchy_depth_inter_slice | ue(v) |
|   if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
|   } | |
|   if( qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|     } | |
|   } | |
|   sps_max_luma_transform_size_64_flag | u(1) |
|   if( ChromaArrayType != 0 ){ | |
|     sps_joint_cbcr_enable_flag | u(1) |
|     same_qp_table_for_chroma | u(1) |
|     numQpTables = same_qp_table_for_chroma ? 1 : ( sps_joint_cbcr_enabled_flag ? 3 : 2 ) | |
|     for( i = 0; i < numQpTables; i++ ) { | |
|       qp_table_start_minus26[ i ] | se(v) |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_diff_val[ i ][ j ] | ue(v) |
|       } | |
|     } | |
|   } | |
|   sps_sao_enabled_flag | u(1) |
|   sps_alf_enabled_flag | u(1) |
|   if( sps_alf_enabled_flag && ChromaArrayType != 0 ) | |
|     sps_ccalf_enabled_flag | u(1) |
|   sps_transform_skip_enabled_flag | u(1) |
|   if( sps_transform_skip_enabled_flag ) { | |
|     log2_transform_skip_max_size_minus2 | ue(v) |
|     sps_bdpcm_enabled_flag | u(1) |
|   } | |
|   sps_ref_wraparound_enabled_flag | u(1) |
|   sps_temporal_mvp_enabled_flag | u(1) |
|   if( sps_temporal_mvp_enabled_flag ) | |
|     sps_sbtmvp_enabled_flag | u(1) |
|   sps_amvr_enabled_flag | u(1) |
|   sps_bdof_enabled_flag | u(1) |
|   if( sps_bdof_enabled_flag ) | |
|     sps_bdof_pic_present_flag | u(1) |
|   sps_smvd_enabled_flag | u(1) |
|   sps_dmvr_enabled_flag | u(1) |
|   if( sps_dmvr_enabled_flag ) | |
|     sps_dmvr_pic_present_flag | u(1) |
|   sps_mmvd_enabled_flag | u(1) |

-continued

| seq_parameter_set_rbsp( ) { | Descriptor |
|---|---|
|   sps_isp_enabled_flag | u(1) |
|   sps_mrl_enabled_flag | u(1) |
|   sps_mip_enabled_flag | u(1) |
|   if( ChromaArrayType != 0 ) | |
|     sps_cclm_enabled_flag | u(1) |
|   if( chroma_format_idc = = 1 ) { | |
|     sps_chroma_horizontal_collocated_flag | u(1) |
|     sps_chroma_vertical_collocated_flag | u(1) |
|   } | |
|   sps_mts_enabled_flag | u(1) |
|   if( sps_mts_enabled_flag ) { | |
|     sps_explicit_mts_intra_enabled_flag | u(1) |
|     sps_explicit_mts_inter_enabled_flag | u(1) |
|   } | |
|   six_minus_max_num_merge_cand | ue(v) |
|   sps_sbt_enabled_flag | u(1) |
|   sps_affine_enabled_flag | u(1) |
|   if( sps_affine_enabled_flag ) { | |
|     five_minus_max_num_subblock_merge_cand | ue(v) |
|     sps_affine_type_flag | u(1) |
|     if( sps_amvr_enabled_flag ) | |
|       sps_affine_amvr_enabled_flag | u(1) |
|     sps_affine_prof_enabled_flag | u(1) |
|     if( sps_affine_prof_enabled_flag ) | |
|       sps_prof_pic_present_flag | u(1) |
|   } | |
|   sps_palette_enabled_flag | u(1) |
|   if( ChromaArrayType = = 3 && !sps_max_luma_transform_size_64_flag ) | |
|     sps_act_enabled_flag | u(1) |
|   if( sps_transform_skip_enabled_flag \|\| sps_palette_enabled_flag ) | |
|     min_qp_prime_ts_minus4 | ue(v) |
|   sps_bcw_enabled_flag | u(1) |
|   sps_ibc_enabled_flag | u(1) |
|   if( sps_ibc_enabled_flag ) | |
|     six_minus_max_num_ibc_merge_cand | ue(v) |
|   sps_ciip_enabled_flag | u(1) |
|   if( sps_mmvd_enabled_flag ) | |
|     sps_fpel_mmvd_enabled_flag | u(1) |
|   if( MaxNumMergeCand >= 2 ) { | |
|     sps_gpm_enabled_flag | u(1) |
|     if( sps_gpm_enabled_flag && MaxNumMergeCand >= 3 ) | |
|       max_num_merge_cand_minus_max_num_gpm_cand | ue(v) |
|   } | |
|   sps_lmcs_enabled_flag | u(1) |
|   sps_lfnst_enabled_flag | u(1) |
|   sps_ladf_enabled_flag | u(1) |
|   if( sps_ladf_enabled_flag ) { | |
|     sps_num_ladf_intervals_minus2 | u(2) |
|     sps_ladf_lowest_interval_qp_offset | se(v) |
|     for( i = 0; i < sps_num_ladf_intervals_minus2 + 1; i++ ) { | |
|       sps_ladf_qp_offset[ i ] | se(v) |
|       sps_ladf_delta_threshold_minus1[ i ] | ue(v) |
|     } | |
|   } | |
|   log2_parallel_merge_level_minus2 | ue(v) |
|   sps_scaling_list_enabled_flag | u(1) |
|   sps_dep_quant_enabled_flag | u(1) |
|   if(! sps_dep_quant_enabled_flag ) | |
|     sps_sign_data_hiding_enabled_flag | u(1) |
|   sps_virtual_boundaries_enabled_flag | u(1) |
|   if( sps_virtual_boundaries_enabled_flag ) { | |
|     sps_virtual_boundaries_present_flag | u(1) |
|     if( sps_virtual_boundaries_present_flag ) { | |
|       sps_num_ver_virtual_boundaries | u(2) |
|       for( i = 0; i < sps_num_ver_virtual_boundaries; i++ ) | |
|         sps_virtual_boundaries_pos_x[ i ] | u(13) |
|       sps_num_hor_virtual_boundaries | u(2) |
|       for( i = 0; i < sps_num_hor_virtual_boundaries; i++ ) | |
|         sps_virtual_boundaries_pos_y[ i ] | u(13) |
|     } | |
|   } | |
|   if( sps_ptl_dpb_hrd_params_present_flag ) { | |
|     sps_general_hrd_params_present_flag | u(1) |
|     if( sps_general_hrd_params_present_flag ) { | |
|       general_hrd_parameters( ) | |
|       if( sps_max_sublayers_minus1 > 0 ) | |

| seq_parameter_set_rbsp( ) { | Descriptor |
|---|---|
|         sps_sublayer_cpb_params_present_flag | u(1) |
|         firstSubLayer = sps_sublayer_cpb_params_present_flag ? 0 : | |
|            sps_max_sublayers_minus1 | |
|         ols_hrd_parameters( firstSubLayer, sps_max_sublayers_minus1 ) | |
|     } | |
|   } | |
|   field_seq_flag | u(1) |
|   vui_parameters_present_flag | u(1) |
|   if( vui_parameters_present_flag ) | |
|     vui_parameters( ) /* Specified in ITu-T H.SEI | ISO/IEC 23002-7 */ | |
|   sps_extension_flag | u(1) |
|   if( sps_extension_flag ) | |
|     while( more_rbsp_data( ) ) | |
|       sps_extension_data_flag | u(1) |
|   rbsp_trailing_bits( ) | |
| } | |

7.3.2.4 Picture Parameter Set RBSP Syntax

| pic_parameter_set_rbsp( ) { | Descriptor |
|---|---|
|   pps_pic_parameter_set_id | ue(v) |
|   pps_seq_parameter_set_id | u(4) |
|   mixed_nalu_types_in_pic_flag | u(1) |
|   pic_width_in_luma_samples | ue(v) |
|   pic_height_in_luma_samples | ue(v) |
|   pps_conformance_window_flag | u(1) |
|   if( pps_conformance_window_flag ) { | |
|     pps_conf_win_left_offset | ue(v) |
|     pps_conf_win_right_offset | ue(v) |
|     pps_conf_win_top_offset | ue(v) |
|     pps_conf_win_bottom_offset | ue(v) |
|   } | |
|   scaling_window_explicit_signalling_flag | u(1) |
|   if( scaling_window_explicit_signalling_flag ) { | |
|     scaling_win_left_offset | ue(v) |
|     scaling_win_right_offset | ue(v) |
|     scaling_win_top_offset | ue(v) |
|     scaling_win_bottom_offset | ue(v) |
|   } | |
|   output_flag_present_flag | u(1) |
|   subpic_id_mapping_in_pps_flag | u(1) |
|   if( subpic_id_mapping_in_pps_flag ) { | |
|     pps_num_subpics_minus1 | ue(v) |
|     pps_subpic_id_len_minus1 | ue(v) |
|     for( i = 0; i <= pps_num_subpic_minus1; i++ ) | |
|       pps_subpic_id[ i ] | u(v) |
|   } | |
|   no_pic_partition_flag | u(1) |
|   if( !no_pic_partition _flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && ! single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if(   NumTileRows   >   1   && | |
|           ( tile_idx_deltaj>resent_flag | | tileIdx % NumTileColumns = = 0 ) ) | |
|           slice_height_in_tiles_minus1[ i ] | ue(v) |
|         if( slice_width_in_tiles_minus1[ i ]     = =   0   && | |

-continued

| pic_parameter_set_rbsp( ) { | Descriptor |
|---|---|
|         slice_height_in_tiles_minus1[ i ]  ==  0  && | |
|         RowHeight SliceTopLeftTileIdx[ i ] / NumTileColumns ] > 1 ) | |
| { | |
|     num_exp_slices_in_tile[ i ] | ue(v) |
|     numExpSlicesInTile = num_exp_slices_in_tile[ i ] | |
|     for( j = 0; j < numExpSlicesInTile; j++ ) | |
|       exp_slice_height_in_ctus_minus1[ j ] | ue(v) |
|     i += NumSlicesInTile[ i ] | |
|     } | |
|   if( tile_idx_delta_present_flag && i < num_slices_in_pic_minus1 ) | |
|     tile_idx_delta[ i ] | se(v) |
|   } | |
| } | |
|   loop_filter_across_tiles_enabled_flag | u(1) |
|   loop_filter_across_slices_enabled_flag | u(1) |
| } | |
| cabac_init_present_flag | u(1) |
| for( i = 0; i < 2; i++ ) | |
|   num_ref_idx_default_active_minus1[ i ] | ue(v) |
| rpl1_idx_present_flag | u(1) |
| init_qp_minus26 | se(v) |
| cu_qp_delta_enabled_flag | u(1) |
| pps_chroma_tool_offsets_present_flag | u(1) |
| if( pps_chroma_tool_offsets_present_flag ) { | |
|   pps_cb_qp_offset | se(v) |
|   pps_cr_qp_offset | se(v) |
|   pps_joint_cbcr_qp_offset_present_flag | u(1) |
|   if( pps_joint_cbcr_qp_offset_present_flag ) | |
|     pps_joint_cbcr_qp_offset_value | se(v) |
|   pps_slice_chroma_qp_offsets_present_flag | u(1) |
|   pps_cu_chroma_qp_offset_list_enabled_flag | u(1) |
| } | |
| if( pps_cu_chroma_qp_offset_list_enabled_flag ) { | |
|   chroma_qp_offset_list_len_minus1 | ue(v) |
|   for( i = 0; i <= chroma_qp_offset_list_len_minus1; i++ ) { | |
|     cb_qp_offset_list[ i ] | se(v) |
|     cr_qp_offset_list[ i ] | se(v) |
|     if( pps_joint_cbcr_qp_offset_present_flag ) | |
|       joint_cbcr_qp_offset_list[ i ] | se(v) |
|   } | |
| } | |
| pps_weighted_pred_flag | u(1) |
| pps_weighted_bipred_flag | u(1) |
| deblocking_filter_control_present_flag | u(1) |
| if( deblocking_filter_control_present_flag ) { | |
|   deblocking_filter_override_enabled_flag | u(1) |
|   pps_deblocking_filter_disabled_flag | u(1) |
|   if( !pps_deblocking_filter_disabled_flag ) { | |
|     pps_beta_offset_div2 | se(v) |
|     pps_tc_offset_div2 | se(v) |
|     pps_cb_beta_offset_div2 | se(v) |
|     pps_cb_tc_offset_div2 | se(v) |
|     pps_cr_beta_offset_div2 | se(v) |
|     pps_cr_tc_offset_div2 | se(v) |
|   } | |
| } | |
| rpl_info_in_ph_flag | u(1) |
| if( deblocking_filter_override_enabled_flag ) | |
|   dbf_info_in_ph_flag | u(1) |
| sao_info_in_ph_flag | u(1) |
| alf_info_in_ph_flag | u(1) |
| if( ( pps_weighted_pred_flag || pps_weighted_bipred_flag ) && | |
| rpl_present_in_ph_flag ) | |
|   wp_info_in_ph_flag | u(1) |
| qp_delta_info_in_ph_flag | u(1) |
| pps_ref_wraparound_enabled_flag | u( ) |
| if( pps_ref_wraparound_enabled_flag ) | |
|   pps_ref_wraparound_offset | ue(v) |
| picture_header_extension_present_flag | u(1) |
| slice_header_extension_present_flag | u(1) |
| pps_extension_flag | u(1) |
| if( pps_extension_flag ) | |
|   while( more_rbsp_data( ) ) | |
|     pps_extension_data_flag | u(1) |
| rbsp_trailing_bits( ) | |
| } | |

7.3.2.7 Picture Header Structure Syntax

| picture_header_structure( ) { | Descriptor |
|---|---|
|   gdr_or_irap_pic_flag | u(1) |
|   if( gdr_or_irap_pic_flag ) | |
|     gdr_pic_flag | u(1) |
|   ph_inter_slice_allowed_flag | u(I) |
|   if( ph_inter_slice_allowed_flag ) | |
|     ph_intra_slice_allowed_flag | u(1) |
|   non_reference_picture_flag | u(1) |
|   ph_pic_parameter_set_id | ue(v) |
|   ph_pic_order_cnt_lsb | u(v) |
|   if( gdr_or_irap_pic_flag ) | |
|     no_output_of_prior_pics_flag | u(1) |
|   if( gdr_pic_flag ) | |
|     recovery_poc_cnt | ue(v) |
|   for( i = 0; i < NumExtraPhBits; i++ ) | |
|     ph_extra_bit[ i ] | u(1) |
|   if( sps_poc_msb_flag ) { | |
|     ph_poc_msb_present_flag | u(1) |
|     if( ph_poc_msb_present_flag ) | |
|       poc_msb_val | u(v) |
|   } | |
|   if( sps_alf_enabled_flag && alf_info_in_ph_flag ) { | |
|     ph_alf_enabled_flag | u(1) |
|     if( ph_alf_enabled_flag ) { | |
|       ph_num_alf_aps_ids_luma | u(3) |
|       for( i = 0; i < ph_num_alf_aps_ids_luma; i++ ) | |
|         ph_alf_aps_id_luma[ i ] | u(3) |
|       if( ChromaArrayType != 0 ) | |
|         ph_alf_chroma_idc | u(2) |
|       if( ph_alf_chroma_idc ) | |
|         ph_alf_aps_id_chroma | u(3) |
|       if( sps_ccalf_enabled_flag ) { | |
|         ph_cc_alf_cb_enabled_flag | u(1) |
|         if( ph_cc_alf_eb_enabled_flag ) | |
|           ph_cc_alf_cb_aps_id | u(3) |
|         ph_cc_alf_cr_enabled_flag | u(1) |
|         if( ph_cc_alf_cr_enabled_flag ) | |
|           ph_cc_alf_cr_aps_id | u(3) |
|       } | |
|     } | |
|   } | |
|   if( sps_lmcs_enabled_flag ) { | |
|     ph_lmcs_enabled_flag | u(1) |
|     if( ph_lmcs_enabled_flag ) { | |
|       ph_lmcs_aps_id | u(2) |
|       if( ChromaArrayType != 0 ) | |
|         ph_chroma_residual_scale_flag | u(1) |
|     } | |
|   } | |
|   if( sps_scaling_list_enabled_flag ) { | |
|     ph_scaling_list_present_flag | u(1) |
|     if( ph_scaling_list_present_flag ) | |
|       ph_scaling_list_aps_id | u(3) |
|   } | |
|   if( sps_virtual_boundaries_enabled_flag && !sps_virtual_boundaries_present_flag ) { | |
|     ph_virtual_boundaries_present_flag | u(1) |
|     if( ph_virtual_boundaries_present_flag ) { | |
|       ph_num_ver_virtual_boundaries | u(2) |
|       for( i = 0; i < ph_num_ver_virtual_boundaries; i++ ) | |
|         ph_virtual_boundaries_pos_x[ i ] | u(13) |
|       ph_num_hor_virtual_boundaries | u(2) |
|       for( i = 0; i < ph_num_hor_virtual_boundaries; i++ ) | |
|         ph_virtual_boundaries_pos_y[ i ] | u(13) |
|     } | |
|   } | |
|   if( output_flag_present_flag ) | |
|     pic_output_flag | u(1) |
|   if( rpl_info_in_ph_flag ) | |
|     ref_pic_lists( ) | |
|   if( partition_constraints_override_enabled_flag ) | |
|     partition_constraints_override_flag | u(1) |
|     if( ph_intra_slice_allowed_flag ) { | |
|   if( partition_constraints_override_flag ) { | |
|     ph_log2_diff_min_qt_min_cb_intra_slice_luma | ue(v) |
|     ph_max_mtt_hierarchy_depth_intra_slice_luma | ue(v) |
|     if( ph_max_mtt_hierarchy_depth_intra_slice_luma != 0 ) { | |
|       ph_log2_diff_max_bt_min_qt_intra_slice_luma | ue(v) |

-continued

| picture_header_structure( ) { | Descriptor |
|---|---|
|     ph_log2_diff_max_tt_min_qt_intra_slice_luma | ue(v) |
|   } | |
|   if( qtbtt_dual_tree_intra_flag ) { | |
|     ph_log2_diff_min_qt_min_cb_intra_slice_chroma | ue(v) |
|     ph_max_mtt_hierarchy_depth_intra_slice_chroma | ue(v) |
|     if( ph_max_mtt_hierarchy_depth_intra_slice_chroma != 0 ) { | |
|       ph_log2_diff_max_qt_min_qt_intra_slice_chroma | ue(v) |
|       ph_log2_diff_max_tt_min_qt_intra_slice_chroma | ue(v) |
|     } | |
|   } | |
| } | |
| if( cu_qp_delta_enabled_flag ) | |
|   ph_cu_qp_delta_subdiv_intra_slice | ue(v) |
| if( pps_cu_chroma_qp_offset_list_enabled_flag ) | |
|   ph_cu_chroma_qp_offset_subdiv_intra_slice | ue(v) |
| } | |
| if( ph_inter_slice_allowed_flag ) { | |
|   if( partition_constraints_override_flag ) { | |
|     ph_log2_diff_min_qt_min_cb_inter_slice | ue(v) |
|     ph_max_mtt_hierarchy_depth_inter_slice | ue(v) |
|     if( ph_max_mtt_hierarchy_depth_inter)slice != 0 ) { | |
|       ph_log2_diff_max_bt_min_qt_inter_slice | ue(v) |
|       ph_log2_diff_max_tt_min_qt_inter_slice | ue(v) |
|     } | |
|   } | |
|   if( cu_qp_delta_enabled_flag ) | |
|     ph_cu_qp_delta_subdiv_inter_slice | ue(v) |
|   if( pps_cu_chroma_qp_offset_list_enabled_flag ) | |
|     ph_cu_chroma_qp_offset_subdiv_inter_slice | ue(v) |
|   if( sps_temporal_mvp_enabled_flag ) { | |
|     ph_temporal_mvp_enabled_flag | u(1) |
|     if( ph_temporal_mvp_enabled_flag && rpl_info_in_ph_flag ) { | |
|       ph_collocated_from_l0_flag | u(1) |
|       if(   (  ph_collocated_from_l0_flag   &&<br>        num_ref_entries[ 0 ][ PicRplsIdx[ 0 ] ]   >   1 )  ||<br>        (   !ph_collocated_from_l0_flag   &&<br>        num_ref_entries[ 1 ][ PicRplsIdx[ 1 ] ] > 1 ) ) | |
|         ph_collocated_ref_idx | ue(v) |
|     } | |
|   } | |
|   mvd_l1_zero_flag | u(1) |
|   if( sps_fpel_mmvd_enabled_flag ) | |
|     ph_fpel_mmvd_enabled_flag | u(1) |
|   if( sps_bdof_pic_present_flag ) | |
|     ph_disable_bdof_flag | u(1) |
|   if( sps_dmvr_pic_present_flag ) | |
|     ph_disabled_mvr_flag | u(1) |
|   if( sps_prof_pic_present_flag ) | |
|     ph_disable_prof_flag | u(1) |
|   if( ( pps_weighted_pred_flag || pps_weighted_bipred_flag )  &&<br>wp_info_in_ph_flag ) | |
|     pred_weight_table( ) | |
| } | |
| if( qp_delta_info_in_ph_flag ) | |
|   ph_qp_delta | se(v) |
| if( sps_joint_cbcr_enabled_flag ) | |
|   ph_joint_cbcr_sign_flag | u(1) |
| if( sps_sao_enabled_flag && sao_info_in_ph_flag ) { | |
|   ph_sao_luma_enabled_flag | u(1) |
|   if( ChromaArrayType != 0 ) | |
|     ph_sao_chroma_enabled_flag | u(1) |
| } | |
| if( sps_dep_quant_enabled_flag ) | |
|   ph_dep_quant_enabled_flag | u(1) |
| if( sps_sign_data_hiding_enabled_flag && !ph_dep_quant_enabled_flag ) | |
|   pic_sign_data_hiding_enabled_flag | u(1) |
| if( deblocking_filter_override_enabled_flag && dbf_info_in_ph_flag ) { | |
|   ph_deblocking_filter_override_flag | u(1) |
|   if( ph_deblocking_filter_override_flag ) { | |
|     ph_deblocking_filter_disabled_flag | u(1) |
|     if( !ph_deblocking_filter_disabled_flag ) { | |
|       ph_beta_offset_div2 | se(v) |
|       ph_tc_offset_div2 | se(v) |
|       ph_cb_beta_offset_div2 | se(v) |
|       ph_cb_tc_offset_div2 | se(v) |
|       ph_cr_beta_offset_div2 | se(v) |
|       ph_cr_tc_offset_div2 | se(v) |

-continued

| picture_header_structure( ) { | Descriptor |
|---|---|
|     } | |
|    } | |
|   } | |
|   if( picture_header_extension_present_flag ) { | |
|     ph_extension_length | ue(v) |
|     for( i = 0; i < ph_extension_length; i++ ) | |
|       ph_extension_data_byte[ i ] | u(8) |
|   } | |
| } | |

7.3.7.1 General Slice Header Syntax

| slice_header( ) { | Descriptor |
|---|---|
|   picture_header_in_slice_header_flag | u(1) |
|   if( picture_header_in_slice_header_flag ) | |
|     picture_header_structure( ) | |
|   if( subpic_info_present_flag ) | |
|     slice_subpic_id | u(v) |
|   if( ( rect_slice_flag && NumSlicesInSubpic[ CurrSubpicIdx ] > 1 ) | |
|     ( !rect_slice_flag && NumTilesInPic > 1 ) ) | |
|     slice_address | u(v) |
|   for( i = 0; i < NumExtraPhBits; i++ ) | |
|     sh_extra_bit[ i ] | u(1) |
|   if( !rect_slice_flag && NumTilesInPic > 1 ) | |
|     num_tiles_in_slice_minus1 | ue(v) |
|   if( ph_inter_slice_allowed_flag ) | |
|     slice_type | ue(v) |
|   if( sps_alf_enabled_flag && !alf_info_in_ph_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|       if( sps_cc_alf_enabled_flag ) { | |
|         slice_cc_alf_cb_enabled_flag | u(1) |
|         if( slice_cc_alf_cb_enabled_flag ) | |
|           slice_cc_alf_cb_aps_id | u(3) |
|         slice_cc_alf_cr_enabled_flag | u(1) |
|         if( slice_cc_alf_cr_enabled_flag ) | |
|           slice_cc_alf_cr_aps_id | u(3) |
|       } | |
|     } | |
|   } | |
|   if( separate_colour_plane_flag = = 1 ) | |
|     colour_plane_id | u(2) |
|   if( !rpl_info_in_ph_flag && ( (nal_unit_type != IDR_W_RADL && nal_unit_type != | |
|     IDR_N_LP ) \|\| sps_idr_rpl_present_flag ) ) | |
|     ref_pic_lists( ) | |
|   if( ( rpl_info_in_ph flag \|\| ((nal_unit_type != IDR_W_RADL && nal_unit_type != | |
|     IDR_N_LP) \|\| sps_idr_rpl_present_flag ) ) && | |
|     ( slice_type != I && num_ref_entries[ 0 ][ RplsIdx[ 0 ] ] > 1 ) \|\| | |
|     ( slice_type = = B && num_ref_entries[ 1 ][ RplsIdx[ 1 ] ] > 1 ) ) { | |
|     num_ref_idx_active_override_flag | u(1) |
|     if( num_ref_idx_active_override_flag ) | |
|       for( i = 0; i < ( slice_type = = B ? 2: 1 ); i++ ) | |
|         if( num_ref_entries[ i ][ RplsIdx[ i ] ] > 1 ) | |
|           num_ref_idx_active_minus1[ i ] | ue(v) |
|   } | |
|   if( slice_type != I ) { | |
|     if( cabac_init_present_flag ) | |
|       cabac_init_flag | u(1) |
|     if( ph_temporal_mvp_enabled_flag && !rpl_info_in_ph_flag ) { | |
|       if( slice_type = = B ) | |
|         slice_collocated_from_l0_flag | u(1) |
|       if( ( slice_collocated_from_l0_flag && NumRefIdxActive[ 0 ] > 1 ) \| | |

| slice_header( ) { | Descriptor |
|---|---|
|       ( ! slice_collocated_from_l0_flag && NumRefIdxActive[ 1 ] > 1 ))  | |
|       slice_collocated_ref_idx | ue(v) |
|   } | |
|   if( !wp_info_in_ph_flag && ((pps_weighted_pred_flag && slice_type = = P )  \|\|  (pps_weighted_bipred_flag && slice_type = = B ) ) ) | |
|     pred_weight_table( ) | |
|   } | |
|   if( !qp_delta_info_in_ph_flag ) | |
|     slice_qp_delta | se(v) |
|   if( pps_slice_chroma_qp_offsets_present_flag ) { | |
|     slice_cb_qp_offset | se(v) |
|     slice_cr_qp_offset | se(v) |
|     if( sps_joint_cbcr_enabled_flag ) | |
|       slice_joint_cbcr_qp_offset | se(v) |
|   } | |
|   if( pps_cu_chroma_qp_offset_list_enabled_flag ) | |
|     cu_chroma_qp_offset_enabled_flag | u(1) |
|   if( sps_sao_enabled_flag && !sao_info_in_ph_flag ) { | |
|     slice_sao_luma_flag | u(1) |
|     if( ChromaArrayType != 0 ) | |
|       slice_sao_chroma_flag | u(1) |
|   } | |
|   if( deblocking_filter_override_enabled_flag && !dbf_info_in_ph_flag ) | |
|     slice_deblocking_filter_override_flag | u(1) |
|   if( slice_deblocking_filter_override_flag ) { | |
|     slice_deblocking_filter_disabled_flag | u(1) |
|     if( !slice_deblocking_filter_disabled_flag ) { | |
|       slice_beta_offset_div2 | se(v) |
|       slice_tc_offset_div2 | se(v) |
|       slice_cb_beta_offset_div2 | se(v) |
|       slice_cb_tc_offset_div2 | se(v) |
|       slice_cr_beta_offset_div2 | se(v) |
|       slice_cr_tc_offset_div2 | se(v) |
|     } | |
|   } | |
|   slice_ts_residual_coding_disabled_flag | u(1) |
|   if( ph_lmcs_enabled_flag ) | |
|     slice_lmcs_enabled_flag | u(1) |
|   if( pic_scaling_list_enabled_flag ) | |
|     slice_scaling_list_present_flag | u(1) |
|   if( NumEntryPoints > 0 ) { | |
|     offset_len_minus1 | ue(v) |
|     for( i = 0; i < NumEntryPoints; i++ ) | |
|       entry_point_offset_minus1[ i ] | u(v) |
|   } | |
|   if( slice_header_extension_present_flag ) { | |
|     slice_header_extension_length | ue(v) |
|     for( i = 0; i < slice_header_extension_length; i++ ) | |
|       slice_header_extension_data_byte[ i ] | u(8) |
|   } | |
|   byte_alignment( ) | |
| } | |

3.4. Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

3.4.1. 4:4:4

Each of the three Y'CbCr components have the same sample rate, thus there is no chroma subsampling. This scheme is sometimes used in high-end film scanners and cinematic post production.

3.4.2. 4:2:2

The two chroma components are sampled at half the sample rate of luma: the horizontal chroma resolution is halved while the vertical chroma resolution is unchanged. This reduces the bandwidth of an uncompressed video signal by one-third with little to no visual difference. An example of nominal vertical and horizontal locations of 4:2:2 color format is depicted in FIG. 5 in VVC working draft.

Figure 5:
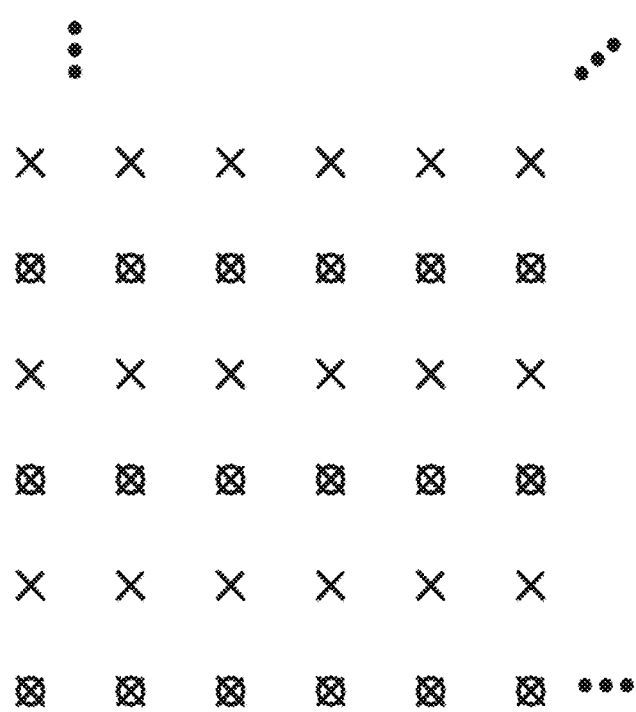
FIG. 5 shows a nominal vertical and horizontal locations of 4:2:2 luma and chroma samples in a picture.

FIG. 5 shows a nominal vertical and horizontal locations of 4:2:2 luma and chroma samples in a picture.

3.4.3. 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1 Cb and Cr are sited interstitially, halfway between alternate him samples.

In 4:2:0 DV, Cb and Cr are co-sited in the horizontal direction. In the vertical direction, they are co-sited on alternating lines.

TABLE 3-1

SubWidthC and SubHeightC values derived from chroma_format_idc and separate_colour_plane_flag

| chroma_format_idc | separate_colour_plane_flag | Chroma format | SubWidth C | SubHeight C |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

3.5. Adaptive Loop Filter (ALF)

In VVC, an Adaptive Loop Filter (ALF) with block-based filter adaption is applied. For the luma component, one among 25 filters is selected for each 4×4 block, based on the direction and activity of local gradients.

3.5.1. Filter Shape

Figure 6:
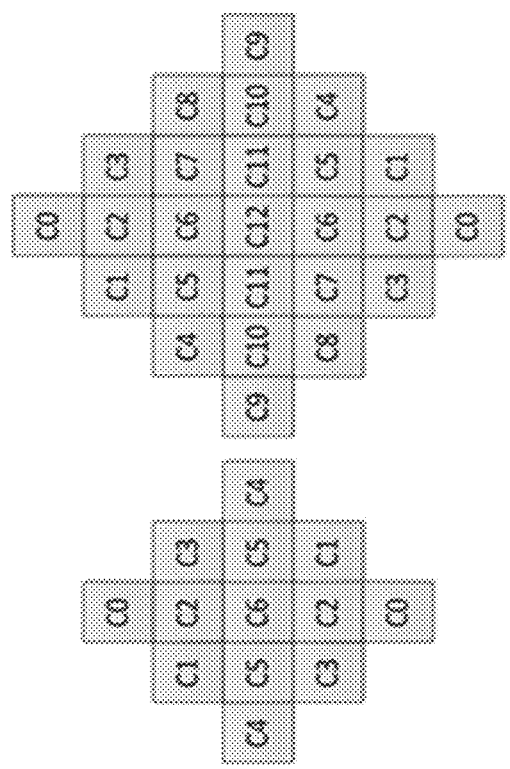
FIG. 6 shows example of ALF filter shapes.

Two diamond filter shapes (as shown in FIG. 6) are used. The 7×7 diamond shape is applied for luma component and the 5×5 diamond shape is applied for chroma components.

FIG. 6 shows example of ALF filter shapes (chroma: 5×5 diamond, luma: 7×7 diamond).

3.5.2. Block Classification

For luma component, each 4×4 block is categorized into one out of 25 classes. The classification index C is derived based on its directionality D and a quantized value of activity $\hat{A}$, as follows:

$$C = 5D + \hat{A} \quad (3\text{-}1)$$

To calculate D and $\hat{A}$, gradients of the horizontal, vertical and two diagonal direction are first calculated using 1-D Laplacian:

$$g_v = \Sigma_{k=i-2}^{i+3}\Sigma_{l=j-2}^{j+3} V_{k,l}, V_{k,l} = |2R(k,l) - R(k,l-1) - R(k,l+1)| \quad (3\text{-}2)$$

$$g_h = \Sigma_{k=i-2}^{i+3}\Sigma_{l=j-2}^{j+3} H_{k,l}, H_{k,l} = |2R(k,l) - R(k-1,l) - R(k+1,l)| \quad (3\text{-}3)$$

$$g_{d1} = \Sigma_{k=i-2}^{i+3}\Sigma_{l=j-2}^{j+3} D1_{k,l}, D1_{k,l} = |2R(k,l) - R(k-1,l-1) - R(k+1,l+1)| \quad (3\text{-}4)$$

$$g_{d2} = \Sigma_{k=i-2}^{i+3}\Sigma_{l=j-2}^{j+3} D2_{k,l}, D2_{k,l} = |2R(k,l) - R(k-1,l+1) - R(k+1,l-1)| \quad (3\text{-}5)$$

Where indices i and j refer to the coordinates of the upper left sample within the 4×4 block and R(i, j) indicates a reconstructed sample at coordinate (i, j).

To reduce the complexity of block classification, the subsampled 1-D Laplacian calculation is applied. As shown in FIGS. 7A-7D, same subsampled positions are used for gradient calculation of all directions.

FIGS. 7A-7D show subsampled Laplacian calculation

Then D maximum and minimum values of the gradients of horizontal and vertical directions are set as:

$$g_{h,v}^{max} = \max(g_h, g_v), g_{h,v}^{min} = \min(g_h, g_v) \quad (3\text{-}6)$$

The maximum and minimum values of the gradient of two diagonal directions are set as:

$$g_{d0,d1}^{max} = \max(g_{d0}, g_{d1}), g_{d0,d1}^{min} = \min(g_{d0}, g_{d1}) \quad (3\text{-}7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \Sigma_{k=i-2}^{i+3}\Sigma_{l=j-2}^{j+3}(V_{k,l} + H_{k,l}) \quad (2\text{-}8)$$

A is further quantized to the range of 0 to 4, inclusively, and the quantized value is denoted as $\hat{A}$.

For chroma components in a picture, no classification method is applied, i.e. a single set of ALF coefficients is applied for each chroma component.

3.5.3. Geometric Transformations of Filter Coefficients and Clipping Values

Before filtering each 4×4 luma block, geometric transformations such as rotation or diagonal and vertical flipping are applied to the filter coefficients f (k, l) and to the corresponding filter clipping values c(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(l,k), c_D(k,l) = c(l,k),$ (3-9)

Vertical flip: $f_V(k,l) = f(k,K-l-1), c_V(k,l) = c(k,K-l-1)$ (3-10)

Rotation: $f_R(k,l) = f(K-l-1,k), c_R(k,l) = c(K-l-1,k)$ (3-11)

where K is the size of the filter and $0 \leq k, l \leq K-1$ are coefficients coordinates, such that location (0,0) is at the upper left corner and location (K-1, K-1) is at the lower right corner. The transformations are applied to the filter coefficients f (k, l) and to the clipping values c(k, l) depending on gradient values calculated for that block. The relationship between the transformation and the four gradients of the four directions are summarized in the following table.

TABLE 3-2

Mapping of the gradient calculated for one block and the transformations

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

3.5.4. Filter Parameters Signalling

ALF filter parameters are signalled in Adaptation Parameter Set (APS). In one APS, up to 25 sets of luma filter coefficients and clipping value indexes, and up to eight sets of chroma filter coefficients and clipping value indexes could be signalled. To reduce bits overhead, filter coefficients of different classification for luma component can be merged. In slice header, the indices of the APSs used for the current slice are signalled.

Clipping value indexes, which are decoded from the APS, allow determining clipping values using a table of clipping values for both luma and Chroma components. These clipping values are dependent of the internal bitdepth. More precisely, the clipping values are obtained by the following formula:

$$\text{AlfClip} = \{\text{round}(2^{B-\alpha*n}) \text{ for } n \in [0 \ldots N-1]\} \quad (3\text{-}12)$$

with B equal to the internal bitdepth, α is a pre-defined constant value equal to 2.35, and N equal to 4 which is the number of allowed clipping values in VVC.

In slice header, up to 7 APS indices can be signalled to specify the luma filter sets that are used for the current slice. The filtering process can be further controlled at CTB level. A flag is always signalled to indicate whether ALF is applied to a luma CTB. A luma CTB can choose a filter set among 16 fixed filter sets and the filter sets from APSs. A filter set index is signalled for a luma CTB to indicate which filter set is applied. The 16 fixed filter sets are pre-defined and hard-coded in both the encoder and the decoder.

For chroma component, an APS index is signalled in slice header to indicate the chroma filter sets being used for the current slice. At CTB level, a filter index is signalled for each chroma CTB if there is more than one chroma filter set in the APS.

The filter coefficients are quantized with norm equal to 128. In order to restrict the multiplication complexity, a bitstream conformance is applied so that the coefficient value of the non-central position may be in the range of $-2^7$ to $2^7-1$, inclusive. The central position coefficient is not signalled in the bitstream and is considered as equal to 128.

3.5.5. Filtering Process

At decoder side, when ALF is enabled for a CTB, each sample R(i, j) within the CU is filtered, resulting in sample value R'(i, j) as shown below, $$R'(i,j) = R(i,j) + ((\Sigma_{k\neq 0}\Sigma_{l\neq 0}f(k,l) \times K(R(i+k,j+1) - R(i,j), c(k,l)) + 64) >> 7) \quad (3\text{-}13)$$

where f (k, l) denotes the decoded filter coefficients, K(x, y) is the clipping function and c(k, l) denotes the decoded clipping parameters. The variable k and l varies between −L/2 and L/2 where L denotes the filter length. The clipping function K(x, y)=min(y, max(−y, x)) which corresponds to the function Clip3(−y, y, x).

3.5.6. Virtual Boundary Filtering Process for Line Buffer Reduction

In hardware and embedded software, picture-based processing is practically unacceptable due to its high picture buffer requirement. Using on-chip picture buffers is very expensive and using off-chip picture buffers significantly increases external memory access, power consumption, and data access latency. Therefore, DF, sample adaptive offset (SAO), and ALF will be changed from picture-based to LCU-based decoding in real products. When LCU-based processing is used for DF, SAO, and ALF, the entire decoding process can be done LCU by LCU in a raster scan with an LCU-pipelining fashion for parallel processing of multiple LCUs. In this case, line buffers may be required for DF, SAO, and ALF because processing one LCU row may require pixels from the above LCU row. If off-chip line buffers (e.g. dynamic random access memory (DRAM)) are used, the external memory bandwidth and power consumption will be increased; if on-chip line buffers (e.g. static random access memory (SRAM)) are used, the chip area will be increased. Therefore, although line buffers are already much smaller than picture buffers, it is still desirable to reduce line buffers.

Figure 8:
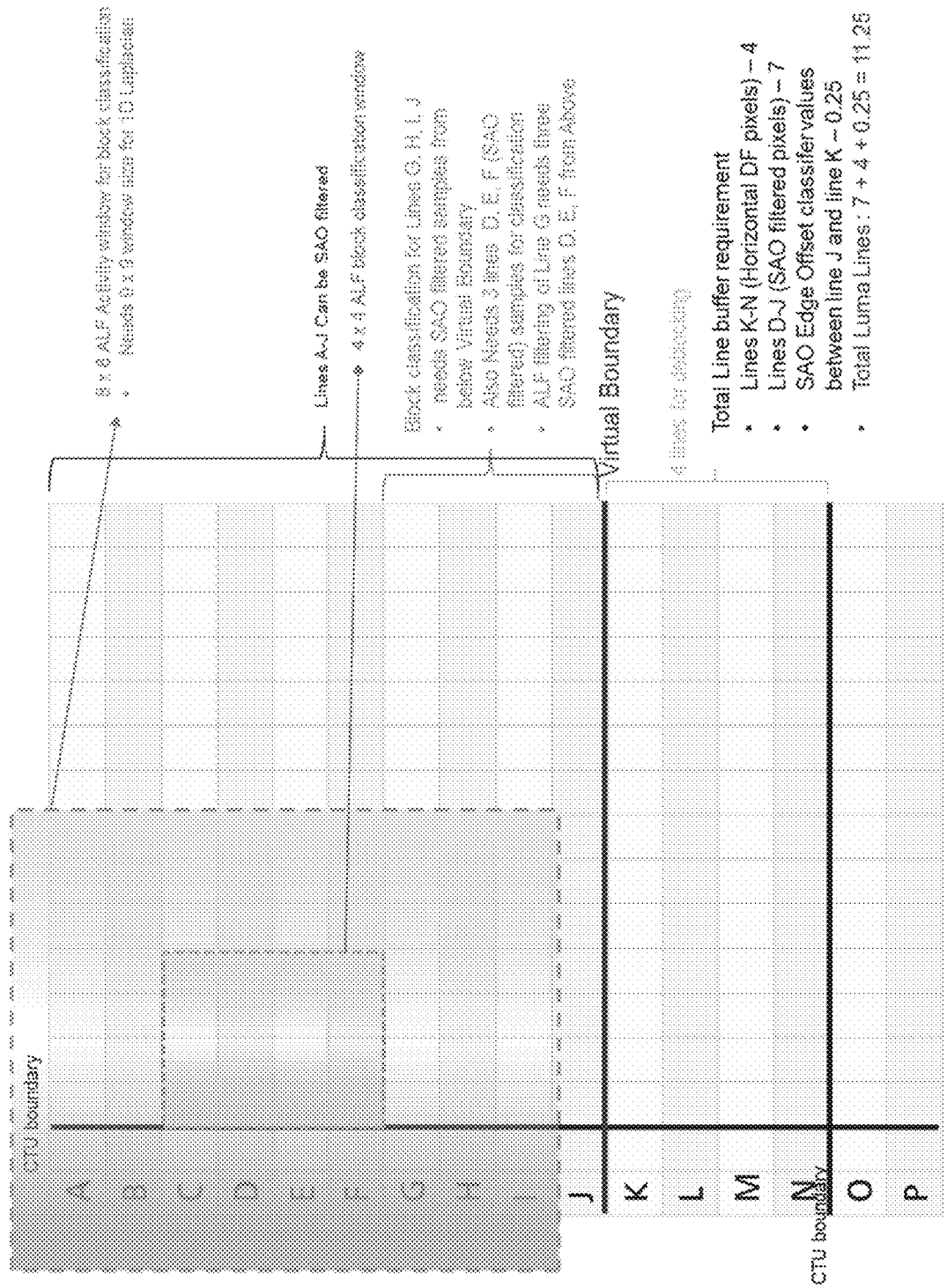
FIG. 8 shows an example of a loop filter line buffer requirement in VTM-4.0 for Luma component.

In VTM-4.0, as shown in FIG. 8, the total number of line buffers that may be required is 11.25 lines for the Luma component. The explanation of the line buffer requirement is as follows: The deblocking of horizontal edge overlapping with CTU edge cannot be performed as the decisions and filtering may require lines K, L, M, M from the first CTU and Lines O, P from the bottom CTU. Therefore, the deblocking of the horizontal edges overlapping with the CTU boundary is postponed until the lower CTU comes. Therefore, for the lines K, L, M, N reconstructed luma samples have to be stored in the line buffer (4 lines). Then the SAO filtering can be performed for lines A till J. The line J can be SAO filtered as deblocking does not change the samples in line K. For SAO filtering of line K, the edge offset classification decision is only stored in the line buffer (which is 0.25 Luma lines). The ALF filtering can only be performed for lines A-F. As shown in FIG. 8, the ALF classification is performed for each 4×4 block. Each 4×4 block classification needs an activity window of size 8×8 which in turn needs a 9×9 window to compute the 1d Laplacian to determine the gradient.

Therefore, for the block classification of the 4×4 block overlapping with lines G, H, I, J needs, SAO filtered samples below the Virtual boundary. In addition, the SAO filtered samples of lines D, E, F are may be required for ALF classification. Moreover, the ALF filtering of Line G needs three SAO filtered lines D, E, F from above lines. Therefore, the total line buffer requirement may be as follows:

Lines K-N(Horizontal DF pixels): 4 lines
Lines D-J (SAO filtered pixels): 7 lines
SAO Edge offset classifier values between line J and line K: 0.25 line Therefore, the total number of luma lines that may be required is 7+4+0.25=11.25.

Figure 9:
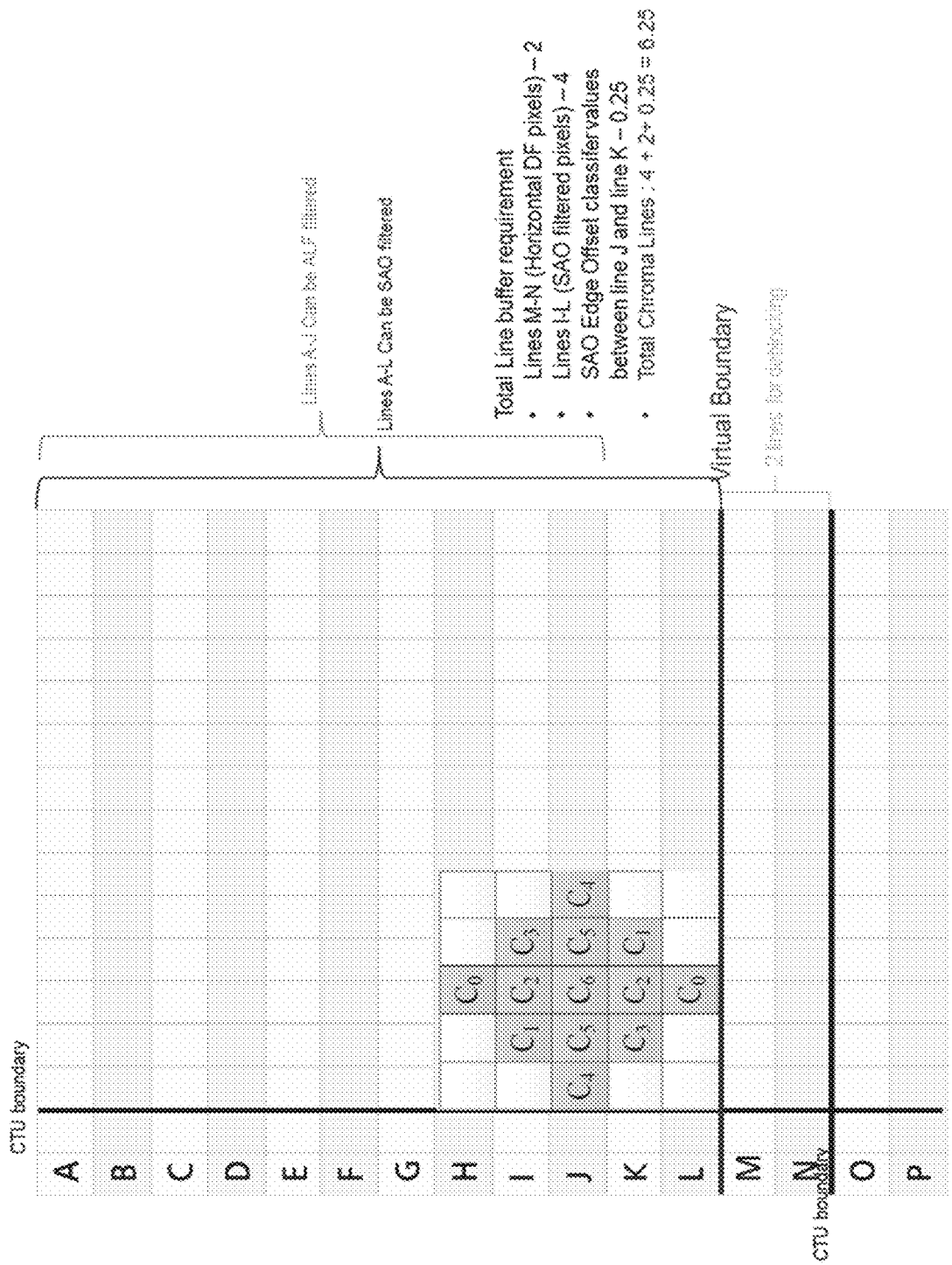
FIG. 9 shows an example of a loop filter line buffer requirement in VTM-4.0 for Chroma component.

Similarly, an example of the line buffer requirement of the Chroma component is illustrated in FIG. 9. The line buffer requirement for Chroma component may be evaluated to be 6.25 lines.

FIG. 8 shows an example of a loop filter line buffer requirement in VTM-4.0 for Luma component.

FIG. 9 shows an example of a loop filter line buffer requirement in VTM-4.0 for Chroma component.

In order to eliminate the line buffer requirements of SAO and ALF, the concept of virtual boundary (VB) is introduced to reduce the line buffer requirement of ALF in the latest VVC. Modified block classification and filtering are employed for the samples near horizontal CTU boundaries. As shown in FIG. 8, VBs are upward shifted horizontal LCU boundaries by N pixels. For each LCU, SAO and ALF can process pixels above the VB before the lower LCU comes but cannot process pixels below the VB until the lower LCU comes, which is caused by DF. With consideration of the hardware implementation cost, the space between the proposed VB and the horizontal LCU boundary is set as four pixels for luma component (i.e. N=4 in FIG. 8 or FIG. 10) and two pixels for chroma component (i.e. N=2).

Figure 10:
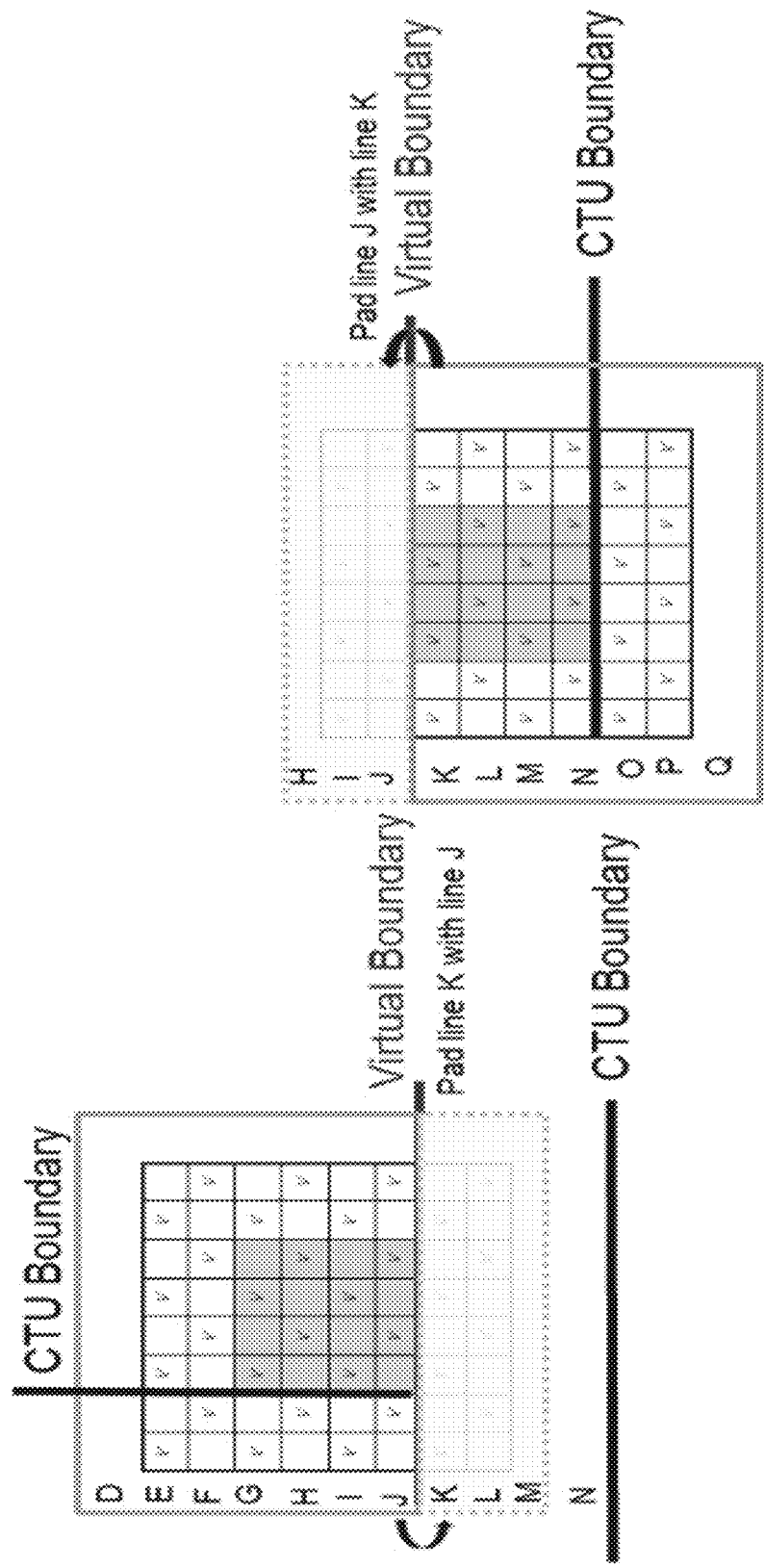
FIG. 10 shows a modified block classification at virtual boundaries.

FIG. 10 shows a modified block classification at virtual boundaries.

Figure 11:
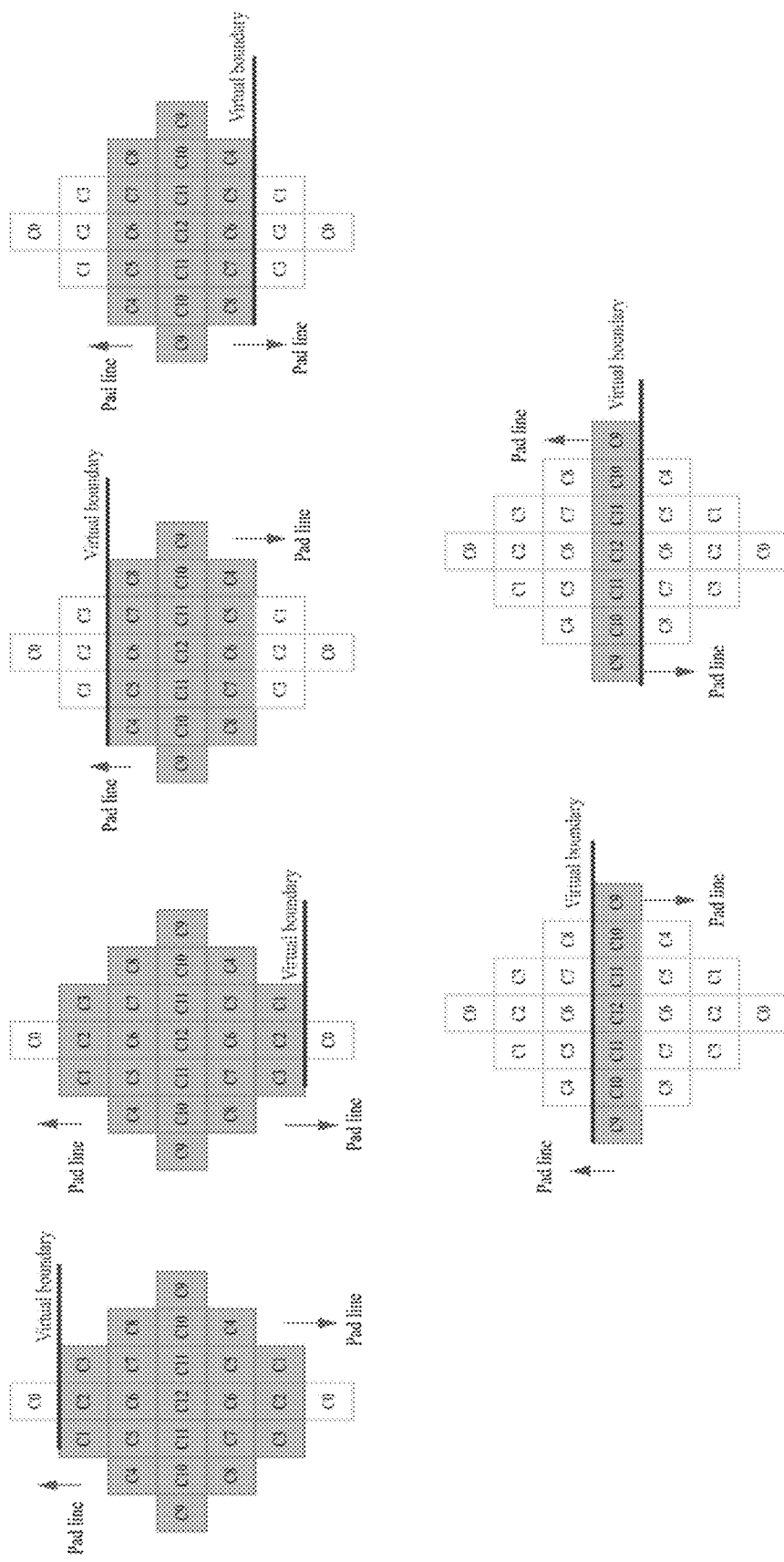
FIG. 11 shows an example of modified ALF filtering for Luma component at virtual boundaries.

Modified block classification is applied for the Luma component as depicted in FIG. 11. For the 1D Laplacian gradient calculation of the 4×4 block above the virtual boundary, only the samples above the virtual boundary are used. Similarly, for the 1D Laplacian gradient calculation of the 4×4 block below the virtual boundary, only the samples below the virtual boundary are used. The quantization of activity value A is accordingly scaled by taking into account the reduced number of samples used in 1D Laplacian gradient calculation.

For filtering processing, mirrored (symmetric) padding operation at the virtual boundaries are used for both Luma and Chroma components. As shown in FIG. 11, when the sample being filtered is located below the virtual boundary, the neighboring samples that are located above the virtual boundary are padded. Meanwhile, the corresponding samples at the other sides are also padded, symmetrically.

Figure 12A:
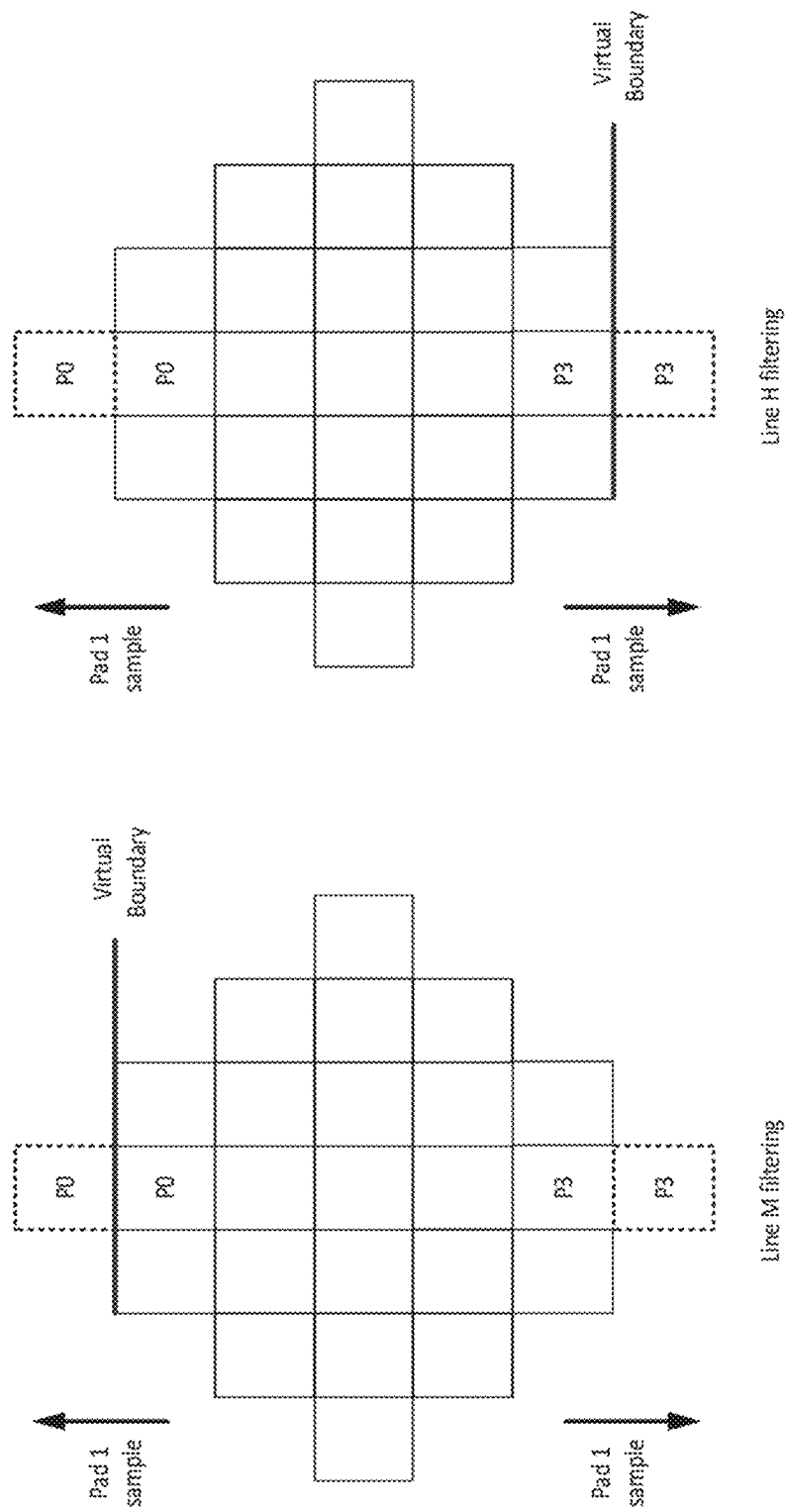
FIGS. 12A-12C show Modified luma ALF filtering at virtual boundary
Figure 12B:
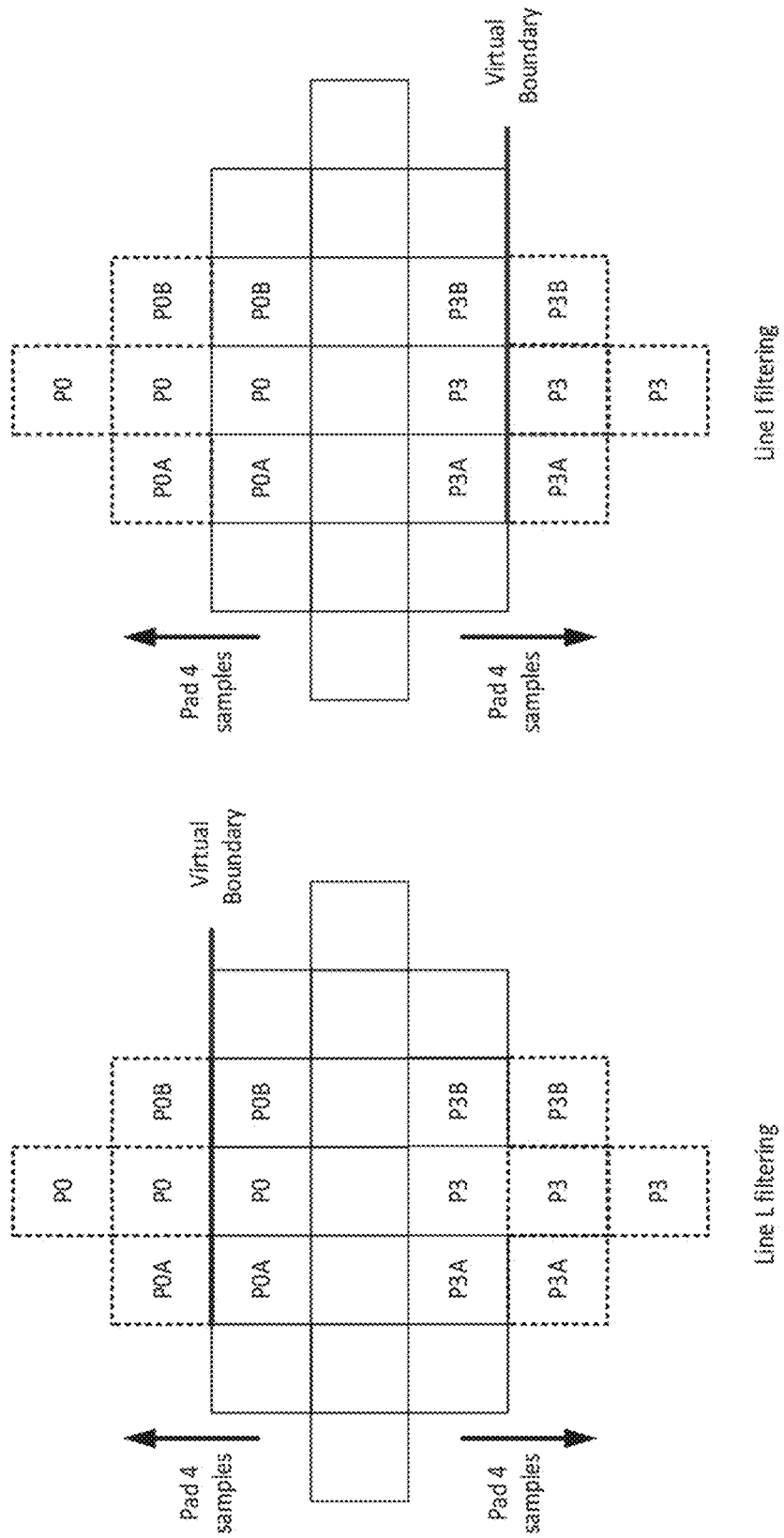
Figure 12C:
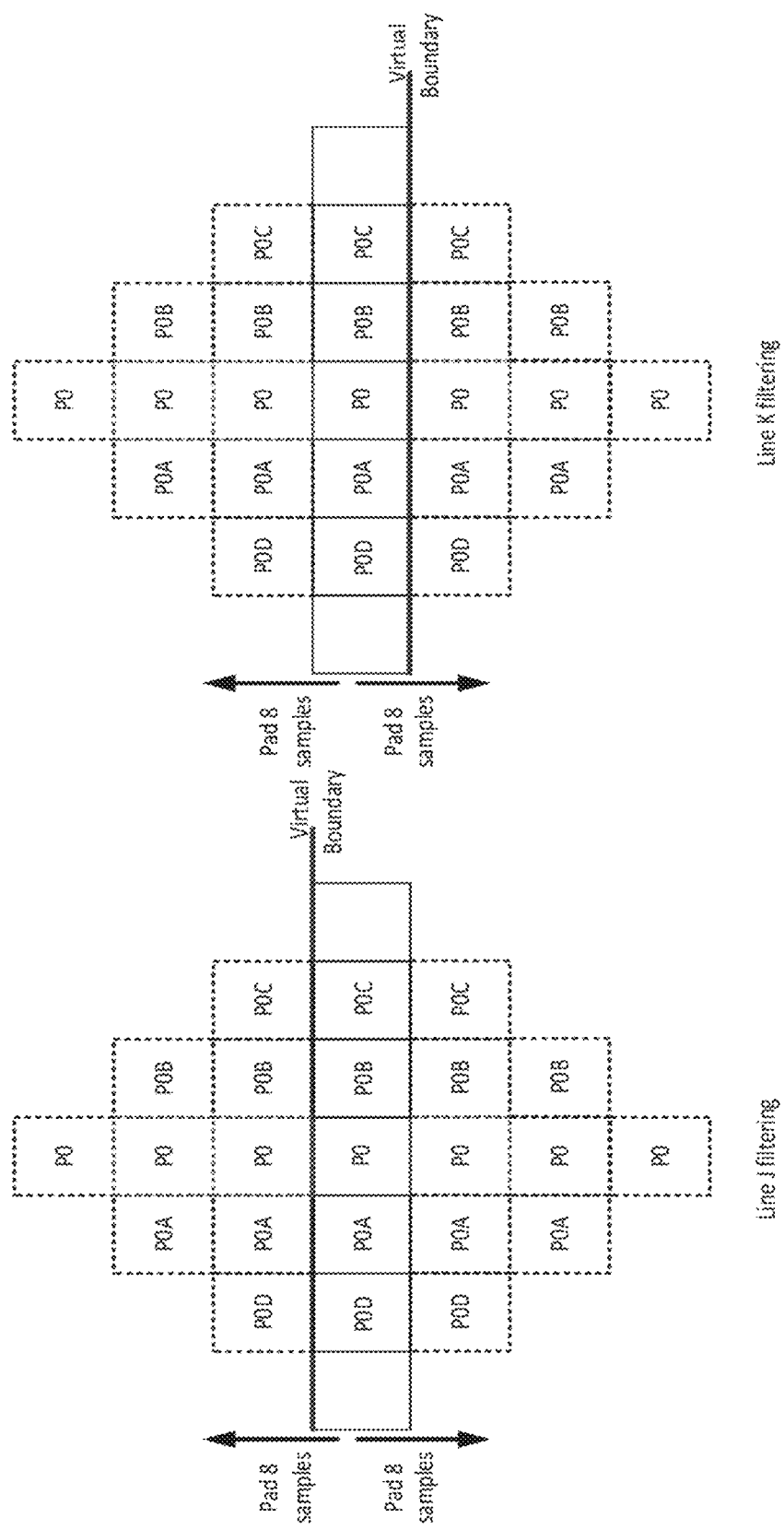

For another example, if one sample located at (i, j) (e.g., the POA with dash line in FIG. 12B is padded, then the corresponding sample located at (m, n) (e.g., the P3B with dash line in FIG. 12B which share the same filter coefficient is also padded even the sample is available, as depicted in FIGS. 12A-12C.

FIG. 12A shows one required line above/below VB need to be padded (per side).

FIG. 12B shows 2 required lines above/below VB need to be padded (per side)

FIG. 12C shows 3 required lines above/below VB need to be padded (per side)

Figure 13:
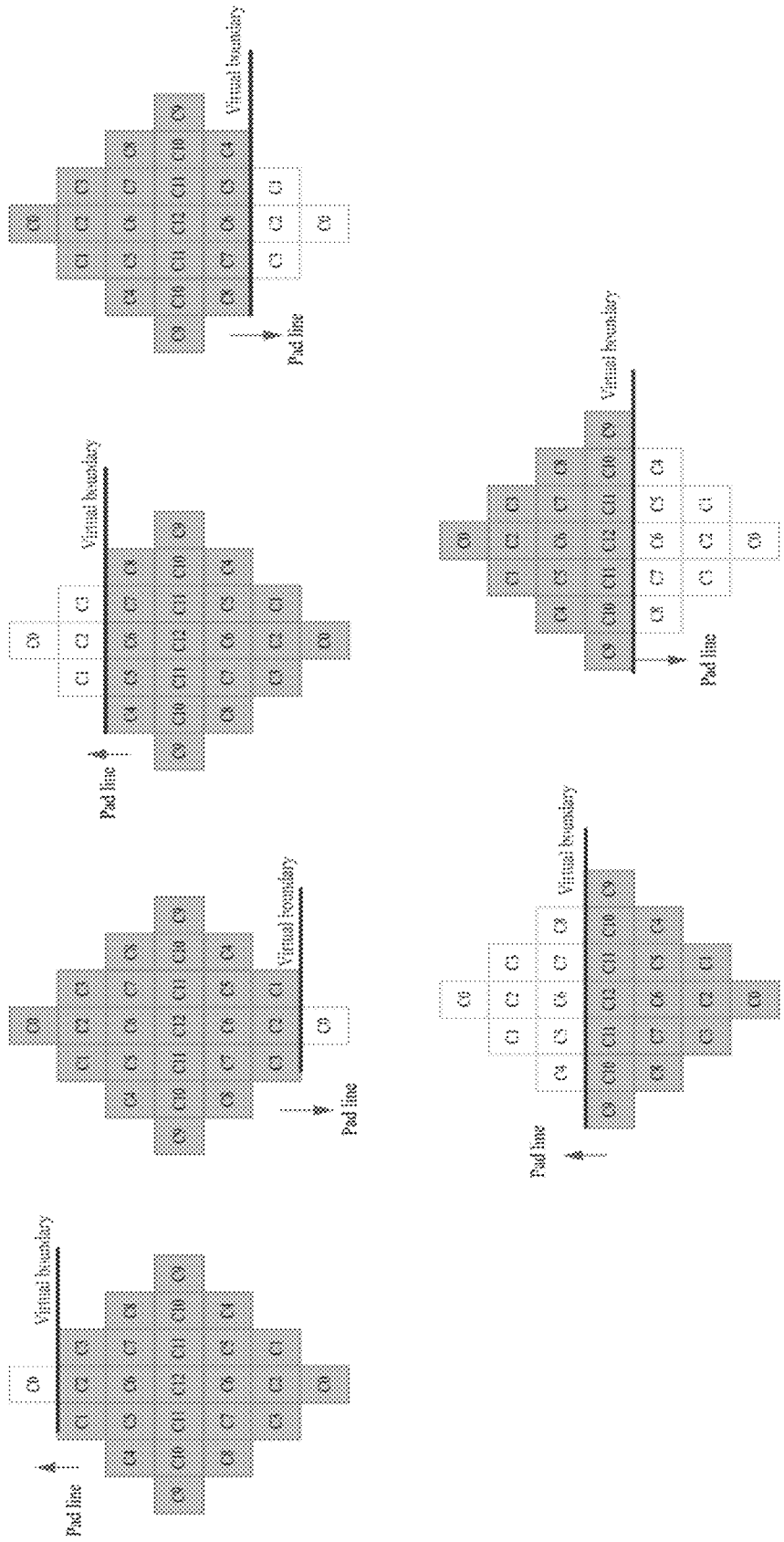
FIG. 13 shows examples of repetitive padding for luma ALF filtering at picture or subpicture or slice or tile boundary.

Different to the mirrored (symmetric) padding method used at horizontal CTU boundaries, repetitive (one-side) padding process is applied for slice, tile and subpicture boundaries when filter across the boundaries is disabled. The repetitive (one-side) padding process is also applied at picture boundary. The padded samples are used for both classification and filtering process. FIG. 13 depicts an example of repetitive padding method for luma ALF filtering at picture/subpicture/slice/tile boundary.

3.5.7. Adaptive Loop Filter Process in Spec 8.8.5.2 7Coding Tree Block Filtering Process for Luma Samples Inputs of this process are:
 a reconstructed luma picture sample array recPicture prior to the adaptive loop filtering process,
 a filtered reconstructed luma picture sample array alfPicture$_L$,
 a luma location (xCtb, yCtb) specifying the top-left sample of the current luma coding tree block relative to the top left sample of the current picture.

Output of this process is the modified filtered reconstructed luma picture sample array alfPicture$_L$.

The derivation process for filter index clause 8.8.5.3 is invoked with the location (xCtb, yCtb) and the reconstructed luma picture sample array recPicture as inputs, and filtIdx[x][y] and transposeIdx[x][y] with x, y=0 . . . CtbSizeY−1 as outputs.

For the derivation of the filtered reconstructed luma samples alfPicture$_L$[x][y], each reconstructed luma sample inside the current luma coding tree block recPicture[x][y] is filtered as follows with x, y=0 . . . CtbSizeY−1:

The array of luma filter coefficients f[j] and the array of luma clipping values c[j] corresponding to the filter specified by filtIdx[x][y] is derived as follows with j=0 . . . 11:

If AlfCtbFiltSetIdxY[xCtb>>CtbLog2SizeY][yCtb>>CtbLog2SizeY] is less than 16, the following applies:

$i$=AlfCtbFiltSetIdxY[$xCtb$>>Ctb Log 2Size$Y$]
[$yCtb$>>Ctb Log 2Size$Y$]    (1453)

$f[j]$=AlfFixFiltCoeff[AlfClassToFiltMap[$i$][filtIdx[$x$]
[$y$]]][$j$]    (1454)

$c[j]=2^{BitDepth}$    (1455)

Otherwise (AlfCtbFiltSetIdxY[xCtb>>CtbLog2SizeY][yCtb>>CtbLog2SizeY] is greater than or equal to 16, the following applies:

$i$=slice_alf_aps_id_luma[AlfCtbFiltSetIdx$Y$
[$xCtb$>>Ctb Log 2Size$Y$][$yCtb$>>Ctb Log
2Size$Y$]−16]    (1456)

$f[j]$=AlfCoeff$_L$[$i$][filtIdx[$x$][$y$]][$j$]    (1457)

$c[j]$=AlfClip$_L$[$i$][filtIdx[$x$][$y$]][$j$]    (1458)

The luma filter coefficients and clipping values index idx are derived depending on transposeIdx[x][y] as follows:

If transposeIndex[x][y] is equal to 1, the following applies:

idx[ ]={9,4,10,8,1,5,11,7,3,0,2,6}    (1459)

Otherwise, if transposeIndex[x][y] is equal to 2, the following applies:

idx[ ]={0,3,2,1,8,7,6,5,4,9,10,11}    (1460)

Otherwise, if transposeIndex[x][y] is equal to 3, the following applies:

idx[ ]={9,8,10,4,3,7,11,5,1,0,2,6}    (1461)

Otherwise, the following applies:

idx[ ]={0,1,2,3,4,5,6,7,8,9,10,11}    (1462)

The locations ($h_{x+i}$, $v_{y+1}$) for each of the corresponding luma samples (x, y) inside the given array recPicture of luma samples with i, j=−3 . . . 3 are derived as follows:

$h_{x+i}$=Clip3(0,pic_width_in_luma_samples−1,$xCtb$+$x$+
$i$)    (1463)

$v_{y+j}$=Clip3(0,pic_height_in_luma_samples−1,$yCtb$+$y$+
$j$)    (1464)

The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtb, yCtb) and (x, y) as inputs.

The variables $h_{x+i}$ and $v_{y+i}$ are modified by invoking the ALF sample padding process as specified in clause 8.8.5.6 with (xCtb, yCtb), ($h_{x+i}$, $v_{y+i}$), 0, clipLeftPos, clipRightPos, clipTopPos, clipBottomPos, clipTopLeftFlag and clipBotRightFlag as input.

The variable applyAlfLineBufBoundaryis derived as follows:

If the bottom boundary of the current coding tree block is the bottom boundary of current picture and pic_height_in_luma_samples−yCtb<=CtbSizeY−4, applyAlfLineBufBoundary is set equal to 0:

Otherwise, applyAlfLineBufBoundary is set equal to 1.

The vertical sample position offsets y1, y2, y3 and the variable alfShiftY are specified in Table 45 according to the vertical luma sample position y and applyAlfLineBufBoundary.

The variable curr is derived as follows:

$$\text{curr}=\text{recPicture}[h_x][v_y] \qquad (1465)$$

The variable sum is derived as follows:

sum=f[idx[0]]*(Clip3(−c[idx[0]],c[idx[0]],recPicture[$h_x$][$v_{y+y3}$]−curr)+Clip3(−c[idx[0]],c[idx[0]],recPicture[$h_x$][$v_{y−y3}$]−curr))+f[idx[1]]*(Clip3(−c[idx[1]],c[idx[1]],recPicture[$h_{x+1}$][$v_{y+y2}$]−curr)+Clip3(−c[idx[1]],c[idx[1]],recPicture[$h_{x−1}$][$v_{y−y2}$]−curr))+f[idx[2]]*(Clip3(−c[idx[2]],c[idx[2]],recPicture[$h_x$][$v_{y+y2}$]−curr)+Clip3(−c[idx[2]],c[idx[2]],recPicture[$h_x$][$v_{y−y2}$]−curr))+f[idx[3]]*(Clip3(−c[idx[3]],c[idx[3]],recPicture[$h_{x−1}$][$v_{y+y2}$]−curr)+Clip3(−c[idx[3]],c[idx[3]],recPicture[$h_{x+1}$][$v_{y−y2}$]−curr))+f[idx[4]]*(Clip3(−c[idx[4]],c[idx[4]],recPicture[$h_{x+2}$][$v_{y+y1}$]−curr)+Clip3(−c[idx[4]],c[idx[4]],recPicture[$h_{x−2}$][$v_{y−y1}$]−curr))+f[idx[5]]*(Clip3(−c[idx[5]],c[idx[5]],recPicture[$h_{x+1}$][$v_{y+y1}$]−curr)+Clip3(−c[idx[5]],c[idx[5]],recPicture[$h_{x−1}$][$v_{y−y1}$]−curr))+f[idx[6]]*(Clip3(−c[idx[6]],c[idx[6]],recPicture[$h_x$][$v_{y+y1}$]−curr)+Clip3(−c[idx[6]],c[idx[6]],recPicture[$h_x$][$v_{y−y1}$]−curr))+f[idx[7]]*(Clip3(−c[idx[7]],c[idx[7]],recPicture[$h_{x−1}$][$v_{y+y1}$]−curr)+Clip3(−c[idx[7]],c[idx[7]],recPicture[$h_{x+1}$][$v_{y−y1}$]−curr))+f[idx[8]]*(Clip3(−c[idx[8]],c[idx[8]],recPicture[$h_{x−2}$][$v_{y+y1}$]−curr)+Clip3(−c[idx[8]],c[idx[8]],recPicture[$h_{x+2}$][$v_{y−y1}$]−curr))+f[idx[9]]*(Clip3(−c[idx[9]],c[idx[9]],recPicture[$h_{x+3}$][$v_y$]−curr)+Clip3(−c[idx[9]],c[idx[9]],recPicture[$h_{x−3}$][$v_y$]−curr))+f[idx[10]]*(Clip3(−c[idx[10]],c[idx[10]],recPicture[$h_{x+2}$][$v_y$]−curr)+Clip3(−c[idx[10]],c[idx[10]],recPicture[$h_{x−2}$][$v_y$]−curr))+f[idx[11]]*(Clip3(−c[idx[11]],c[idx[11]],recPicture[$h_{x+1}$][$v_y$]−curr)+Clip3(−c[idx[11]],c[idx[11]],recPicture[$h_{x−1}$][$v_y$]−curr)) (1466)

$$\text{sum}=\text{curr}+((\text{sum}+64)>>\text{alfShift}Y) \qquad (1467)$$

The modified filtered reconstructed luma picture sample alfPicture$_L$[xCtb+x][yCtb+y] is derived as follows:

$$\text{alfPicture}_L[xCtb+x][yCtb+y]=\text{Clip3}(0,(1<<\text{BitDepth})-1,\text{sum}) \qquad (1468)$$

TABLE 45

Specification of y1, y2, y3 and alfShiftY according to the vertical luma sample position y and applyAlfLineBufBoundary

| Condition | alfShiftY | y1 | y2 | y3 |
|---|---|---|---|---|
| ( y = = CtbSizeY − 5 \|\| y = = CtbSizeY − 4 ) && ( applyAlfLineBufBoundary = = 1 ) | 10 | 0 | 0 | 0 |
| ( y = = CtbSizeY − 6 \|\| y = = CtbSizeY − 3 ) && ( applyAlfLineBufBoundary = = 1 ) | 7 | 1 | 1 | 1 |
| ( y = = CtbSizeY − 7 \|\| y = = CtbSizeY − 2 ) && ( applyAlfLineBufBoundary = = 1 ) | 7 | 1 | 2 | 2 |
| otherwise | 7 | 1 | 2 | 3 |

8.8.5.4 Coding Tree Block Filtering Process for Chroma Samples

Inputs of this process are:
a reconstructed chroma picture sample array recPicture prior to the adaptive loop filtering process,
a filtered reconstructed chroma picture sample array alfPicture,
a chroma location (xCtbC, yCtbC) specifying the top-left sample of the current chroma coding tree block relative to the top left sample of the current picture,
an alternative chroma filter index altIdx.

Output of this process is the modified filtered reconstructed chroma picture sample array alfPicture. The width and height of the current chroma coding tree block ctbWidthC and ctbHeightC is derived as follows:

$$\text{ctbWidth}C=\text{CtbSize}Y/\text{SubWidth}C \qquad (1500)$$

$$\text{ctbHeight}C=\text{CtbSize}Y/\text{SubHeight}C \qquad (1501)$$

For the derivation of the filtered reconstructed chroma samples alfPicture[x][y], each reconstructed chroma sample inside the current chroma coding tree block recPicture[x][y] is filtered as follows with x=0 . . . ctbWidthC−1, y=0 . . . ctbHeightC−1:

The locations ($h_{x+i}$, $v_{y+j}$) for each of the corresponding chroma samples (x, y) inside the given array recPicture of chroma samples with i, j=−2 . . . 2 are derived as follows:

$$h_{x+i}=\text{Clip3}(0,\text{pic\_width\_in\_luma\_samples}/\text{SubWidth}C-1,xCtbC+x+i) \qquad (1502)$$

$$v_{y+j}=\text{Clip3}(0,\text{pic\_height\_in\_luma\_samples}/\text{SubHeight}C-1,yCtbC+y+j) \qquad (1503)$$

The variables clipLeftPos, clipRightPos, clipTopPos, clipBottomPos, clipTopLeftFlag and clipBotRightFlag are derived by invoking the ALF boundary position derivation process as specified in clause 8.8.5.5 with (xCtbC*SubWidthC, yCtbC*SubHeightC) and (x*SubWidthC, y*SubHeightC) as inputs.

The variables $h_{x+i}$ and $v_{y+j}$ are modified by invoking the ALF sample padding process as specified in clause 8.8.5.6 with (xCtb, yCtb), ($h_{x+i}$, $v_{y+j}$), the variable isChroma set equal to 1, clipLeftPos, clipRightPos, clipTopPos, clipBottomPos, clipTopLeftFlag and clipBotRightFlag as input.

The variable applyAlfLineBufBoundary is derived as follows:

If the bottom boundary of the current coding tree block is the bottom boundary of the picture and pic_height_in_luma_samples−(yCtbC*SubHeightC)<CtbSizeY−4, applyAlfLineBufBoundary is set equal to 0.

Otherwise, applyAlfLineBufBoundary is set equal to 1.

The vertical sample position offsets y1, y2 and the variable alfShiftC are specified in Table 45 according to the vertical chroma sample position y and applyAlfLineBufBoundary.

The variable curr is derived as follows:

$$\text{curr}=\text{recPicture}[h_x][v_y] \qquad (1504)$$

The array of chroma filter coefficients f[j] and the array of chroma clipping values c[j] is derived as follows with j=0 . . . 5:

$$f[j]=\text{AlfCoeff}_C[\text{slice\_alf\_aps\_id\_chroma}][\text{altIdx}][j] \qquad (1505)$$

$$c[j]=\text{AlfClip}_C[\text{slice\_alf\_aps\_id\_chroma}][\text{altIdx}][j] \qquad (1506)$$

The variable sum is derived as follows:

$$sum=f[0]*(Clip3(-c[0],c[0],recPicture[h_x][v_{y+y2}]-curr)+Clip3(-c[0],c[0],recPicture[h_x][v_{y-y2}]-curr))+f[1]*(Clip3(-c[1],c[1],recPicture[h_{x+1}][v_{y+y1}]-curr)+Clip3(-c[1],c[1],recPicture[h_{x-1}][v_{y-y1}]-curr))+f[2]*(Clip3(-c[2],c[2],recPicture[h_x][v_{y+y1}]-curr)+Clip3(-c[2],c[2],recPicture[h_x][v_{y-y1}]-curr))+f[3]*(Clip3(-c[3],c[3],recPicture[h_{x-1}][v_{y+y1}]-curr)+Clip3(-c[3],c[3],recPicture[h_{x+1}][v_{y-y1}]-curr))+f[4]*(Clip3(-c[4],c[4],recPicture[h_{x+2}][v_y]-curr)+Clip3(-c[4],c[4],recPicture[h_{x-2}][v_y]-curr))+f[5]*(Clip3(-c[5],c[5],recPicture[h_{x+1}][v_y]-curr)+Clip3(-c[5],c[5],recPicture[h_{x-1}][v_y]-curr))$$ (1507)

$$sum=curr+((sum+64)>>alfShiftC)$$ (1508)

The modified filtered reconstructed chroma picture sample alfPicture[xCtbC+x][yCtbC+y] is derived as follows:

$$alfPicture[xCtbC+x][yCtbC+y]=Clip3(0,(1<<BitDepth)-1,sum)$$ (1509)

TABLE 46

Specification of y1, y2 and alfShiftC according to the vertical chroma sample position y and applyAlfLineBufBoundary

| Condition | alfShiftC | y1 | y2 |
|---|---|---|---|
| ( y = = ctbHeightC − 2 \|\| y = = ctbHeightC − 3 ) && ( applyAlfLineBufBoundary = = 1 ) | 10 | 0 | 0 |
| ( y = = ctbHeightC − 1 \|\| y = = ctbHeightC − 4 ) && ( applyAlfLineBufBoundary = = 1 ) | 7 | 1 | 1 |
| Otherwise | 7 | 1 | 2 |

4. Examples of Technical Problems Addressed by Disclosed Solutions

The existing designs for signalling of SPS/PPS/Picture header/Slice header in VVC have the following problems:

1) loop_filter_across_tiles_enabled_flag is signalled even if there is only one tile.
2) loop_filter_across_slices_enabled_flag is signalled even if there is only one slice.
3) LMCS information is signalled in picture header, not in slice header.
4) The maximum allowed TS block size may be larger than the maximum CU size.
5) MaxNumSubblockMergeCand is derived in different ways depending on affine is enabled or not.
6) Mirrored padding is applied at ALF virtual boundary to get the unavailable samples and their corresponding samples for ALF (e.g., luma ALF and chroma ALF), wherein the position of ALF virtual boundary is utilized to determine which samples are unavailable and need to be padded. However, in an embodiment, the position of ALF virtual boundary in chroma ALF may not necessarily aligned with that in luma ALF for 4:2:2/4:4:4 chroma format video.
7) In an embodiment, the filter strength is reduced for ALF filtering of the rows adjacent to the virtual horizontal CTU boundary, which is dependent on the position of virtual boundary. However, the incorrect position of ALF virtual boundary makes filter strength reduced at unintentional sample rows.

5. Examples of Techniques and Embodiments

To solve the above problems, and others, methods as summarized below are disclosed. The listed items should be considered as examples to explain the general concepts and should not be interpreted in a narrow way. Furthermore, these items can be applied individually or combined in any manner.

In the disclosure, a neighboring (adjacent or non-adjacent) sample (or line, or row) is "unavailable" if it is located in a different video processing unit (e.g., out of the current picture, or current sub-picture, or current tile, or current slice, or current brick, or current CTU, or current processing unit (such as ALF processing unit or narrow ALF processing unit), or any other current video unit) or not reconstructed or cross-filtering video processing unit is disallowed.

The padding method used for ALF virtual boundaries may be denoted as 'Mirrored Padding' wherein for a first unavailable sample located at (i, j) (or a first unavailable line j, or a first unavailable row i), it needs to be padded, and a second sample, defined by 'corresponding sample of the first sample' (or 'corresponding line of the first line', or corresponding row of the first row') in the filter support (e.g., the corresponding sample located at (m, n) (or the corresponding line n, or the corresponding row m) which share the same distance from the current sample (or current line, or current row)) in ALF is also padded even the second sample is available.

1. Signalling of an indication of whether in-loop filtering operations is performed across tile boundaries (e.g., loop_filter_across_tiles_enabled_flag) may be conditioned on whether and/or how a video unit (e.g., a picture) is partitioned into tiles.
    a. In one example, loop_filter_across_tiles_enabled_flag is signalled only if the video unit is partitioned into more than one tile.
    b. Alternatively, signalling of loop_filter_across_tiles_enabled_flag is skipped when there is only one tile for the video unit.
    c. In one example, loop_filter_across_tiles_enabled_flag is signalled only if the general constraint flag one_tile_per_pic_constraint_flag is equal to 0.
        i. Alternatively, if the general constraint flag one_tile_per_pic_constraint_flag is equal to 1, loop_filter_across_tiles_enabled_flag is referred (or, may be required) to be equal to 0.
2. Signalling of an indication of whether in-loop filtering operations is performed across slice boundaries (e.g., loop_filter_across_slices_enabled_flag) may be conditioned on whether and/or how a video unit (e.g., a picture and/or a subpicture) is partitioned into slices.
    a. In one example, loop_filter_across_slices_enabled_flag is not signalled if the video unit is partitioned into only one slice.
    b. In one example, loop_filter_across_slices_enabled_flag is not signalled if each subpicture is partitioned into only one slice (e.g. single_slice_per_subpic_flag is equal to 1).
    c. In one example, loop_filter_across_slices_enabled_flag is signalled if each subpicture is partitioned into only one slice (e.g. single_slice_per_subpic_flag is equal to 1).
    d. In one example, loop_filter_across_slices_enabled_flag is signalled if a picture is partitioned into slices by a non-rectangular way (e.g. rect_slice_flag is equal to 0).
    e. In one example, loop_filter_across_slices_enabled_flag is not signalled if a picture is partitioned into slices by a rectangular way (e.g. rect_slice_flag is equal to 0) and the number of slices is equal to 1 (e.g. num_slices_in_pic_minus1 is equal to 0).

f. In one example, loop_filter_across_slices_enabled_flag is signalled only if the general constraint flag one_slice_per_pic_constraint_flag is equal to 0.
   i. Alternatively, if the general constraint flag one_slice_per_pic_constraint_flag is equal to 1, loop_filter_across_slices_enabled_flag is referred (or, may be required) to be equal to 0.
3. LMCS information (e.g., indications of usage of LMCS, and/or usage of luma reshaping, and/or the adaptation_parameter_set_id of the LMCS APS to be used and/or usage of chroma residual scaling) may be signalled in the slice header and/or the picture header.
   a. LMCS information may comprise a first indication of whether to enable LMCS or not, such as ph_lmcs_enabled_flag or slice_lmcs_enabled_flag.
   b. LMCS information may comprise a second indication of LMCS parameters, such as ph_lmcs_aps_id and/or ph_chroma_residual_scale_flag.
   c. LMCS information may be signalled in both the slice header and the picture header.
   d. LMCS information may be signalled in both the picture header and slice header, when it is present in the slice header, the picture headers, if there are, may be overwritten.
   e. LMCS information may be signalled in either the slice header or the picture header but not in both.
   f. In one example, a syntax element may be signalled in slice header to indicate which LMCS APS is used for the current slice.
   g. In on example, a syntax element (such as lmcs_info_in_ph_flag) is signalled in a higher-level video unit such as in SPS or PPS, to indicate whether LMCS information is signalled in the picture header or the slice header.
      i. The syntax element may only control the first indication.
      ii. The syntax element may only control the second indication.
      iii. The syntax element may control both the first and second indications.
   h. A syntax element of LMCS information in the picture header may be set to default value if it is not present.
   i. A syntax element of LMCS information in the slice header may be set to a default value if it is not present.
      i. A syntax element of LMCS information in the slice header may be set to the value of the corresponding syntax element of LMCS information in the picture header, if it is not present.
   j. In one example, more than one adaptation_parameter_set_id of the LMCS APS that the slices associated with the PH refers to (such as a list of ph_lmcs_aps_id[ ]) may be signalled in the picture header.
      i. In one example, the length of the list of ph_lmcs_aps_id[ ] may be dependent on the number of slices in the picture.
      ii. In one example, a syntax element may be signalled in slice header to indicate which LMCS APS in the list ph_lmcs_aps_id[ ] is used for the current slice.
4. The maximum allowed size for Transform Skip (TS) and/or BDPCM may be smaller than or equal to the Coding Tree Block (CTB) size.
   a. For example, a maximum allowed width and height for TS and/or BDPCM for a luma block may be smaller than or equal to CtbSizeY.
   b. For example, a maximum allowed width and height for TS and/or BDPCM for a chroma block may be smaller than or equal to CtbSizeY/subWidthC and/or CtbSizeY/subHeightC.
      i. Alternatively, a maximum allowed width for TS and/or BDPCM for a chroma block may be smaller than or equal to CtbSizeY/subWidthC and/or CtbSizeY/subHeightC.
      ii. Alternatively, a maximum allowed height for TS and/or BDPCM for a chroma block may be smaller than or equal to CtbSizeY/subWidthC and/or CtbSizeY/subHeightC.
   c. For example, log 2_transform_skip_max_size_minus2 plus 2 may be smaller than or equal to CtbLog2SizeY.
   d. For example, the maximum value of log 2_transform_skip_max_size_minus2 is equal to CtbLog2SizeY−2.
   e. For example, MaxTsSize is derived as MaxTsSize=Min(CtbSizeY,1<<(log 2_transform_skip_max_size_minus2+2)).

f. For example, MaxTsSize is derived as

MaxTsSize=1<<Min(log 2_transform_skip_max_size_minus2+2, CtbLog2SizeY).

g. The maximum allowed block size for TS and/or BDPCM for a chroma block may be smaller than or equal to the maximum transform block size for a chroma block.
      i. In one example, suppose MaxTbSizeY denotes the maximum transform size for a luma block, then maximum allowed width and height for TS and/or BDPCM for a chroma block may be smaller than or equal to MaxTbSizeY/SubWidthC.
      ii. In one example, suppose MaxTbSizeY denotes the maximum transform size for a luma block, then maximum allowed width for TS and/or BDPCM for a chroma block may be smaller than or equal to MaxTbSizeY/SubWidthC.
      iii. In one example, suppose MaxTbSizeY denotes the maximum transform size for a luma block, then maximum allowed height for TS and/or BDPCM for a chroma block may be smaller than or equal to MaxTbSizeY/SubHeightC.
   h. The maximum allowed Transform Skip (TS) block size may be signalled with a binary syntax element (such as, "0" represents equal to 16 and "1" represents equal to 32).
5. The maximum allowed Transform Skip (TS) block size and/or maximum allowed transform block size may be no smaller than the minimum coding block size.
6. Whether to and/or how to signal or interpret or restrict the maximum allowed transform block size (e.g. denoted as MaxTbSizeY in JVET-Q2001-vB) may depend on the minimum allowed coding block size (e.g. denoted as MinCbSizeY in JVET-Q2001-vB).
   a. In one example, MaxTbSizeY may be larger than or equal to MinCbSizeY.
      i. In one example, when MinCbSizeY is equal to 64, the value of sps_max_luma_transform_size_64_flag may be equal to 1.
      ii. In one example, when MinCbSizeY is equal to 64, sps_max_luma_transform_size_64_flag is not signalled and inferred to be 1.
7. Whether to and/or how to signal or interpret or restrict the maximum allowed size of TS and/or BDPCM coding (e.g. denoted as MaxTsSize in JVET-Q2001-vB) may depend on the minimum allowed coding block size (e.g. denoted as MinCbSizeY in JVET-Q2001-vB).
   a. In one example, MaxTsSize may be larger than or equal to MinCbSizeY.
   b. In one example, MaxTsSize may be smaller than or equal to W, wherein W is an integer such as 32.
      i. For example, MaxTsSize may satisfy MinCbSizeY<=MaxTsSize<=W.
      ii. For example, MinCbSizeY may be smaller than or equal to X when TS and/or BDPCM coding is enabled.
   c. In one example, MaxTsSize may be larger than or equal to MinCbSizeY when TS and/or BDPCM is enabled (e.g. sps_transform_skip_enabled_flag is equal to 1).
      i. For example, log 2_transform_skip_max_size_minus2 may be larger than or equal to log 2_min_luma_coding_block_size_minus2 when sps_transform_skip_enabled_flag is equal to 1.
   d. In one example, MaxTsSize=max(MaxTsSize, MinCbSizeY).
      i. In another example, MaxTsSize=min(W, max(MaxTsSize, MinCbSizeY)) wherein W is an integer such as 32.
   e. In one example, MaxTsSize=max(MaxTsSize, MinCbSizeY) when TS and/or BDPCM is enabled (e.g. sps_transform_skip_enabled_flag is equal to 1).
      i. In one example, MaxTsSize=min(W, max(MaxTsSize, MinCbSizeY)) wherein W is an integer such as 32, when TS and/or BDPCM is enabled (e.g. sps_transform_skip_enabled_flag is equal to 1).
   f. In one example, the signalling of MaxTsSize (e.g. log 2_transform_skip_max_size_minus2 in JVET-Q2001-vB) may depend on MinCbSizeY.
      i. In one example, the difference between log 2_transform_skip_max_size_minus2 and log 2_min_luma_coding_block_size_minus2 (denoted as log 2_diff_max_trasform_skip_min_coding_block) may be signalled to indicate MaxTsSize.
         1) For example, MaxTsSize=1<<(MinCbLog2SizeY+log 2_diff_max_trasform_skip_min_coding_block).
         2) For example, MaxTsSize=min(W, 1<<(MinCbLog2SizeY+log 2_diff_max_trasform_skip_min_coding_block)) wherein W is an integer such as 32.
8. Whether to and/or how to signal or interpret or restrict the indication of TS and/or BDPCM coding (e.g. denoted as sps_transform_skip_enabled_flag in JVET-Q2001-vB) may depend on the minimum allowed coding block size (e.g. denoted as MinCbSizeY in JVET-Q2001-vB).
   a. In one example, when MinCbSizeY is equal to 64, sps_transform_skip_enabled_flag is not signalled and inferred to be 0.
   b. In one example, when MinCbSizeY is larger than the maximum allowed size for TS and/or BDPCM (e.g. the maximum allowed size for TS and/or BDPCM is 32), sps_transform_skip_enabled_flag is not signalled and inferred to be 0.
9. Whether to and/or how to signal or interpret the indication of coding tool X in SPS/PPS/Picture header/slice header may depend on the minimum allowed coding block size (e.g. MinCbSizeY in JVET-Q2001-vB).
   a. The indication of coding tool X in SPS/PPS/Picture header/slice header may not be signalled and inferred to be not used if the minimum allowed coding block size is larger than T, wherein T is an integer such as 32.
   b. The coding tool X in SPS/PPS/Picture header/slice header may be indicated to be not used if the minimum allowed coding block size is larger than T, wherein T is an integer such as 32.
   c. The coding tool X may be Combined Inter-Intra Prediction (CIIP).
   d. The coding tool X may be Multiple Transform Selection (MTS).
   e. The coding tool X may be Segment Block Transform (SBT).
   f. The coding tool X may be Symmetric Motion Vector Difference (SMVD).
   g. The coding tool X may be a bi-directional optical flow (BDOF).
   h. The coding tool X may be affine prediction.
   i. The coding tool X may be Prediction Refine with Optical Flow (PROF).
   j. The coding tool X may be Decoder-side Motion Vector Refinement (DMVR).
   k. The coding tool X may be Bi-prediction with CU-level Weights (BCW).
   l. The coding tool X may be Merge with Motion Vector Difference (MMVD).
   m. The coding tool X may be Geometric Partitioning Mode (GPM).
   n. The coding tool X may be Intra Block Copy (IBC).
   o. The coding tool X may be palette coding.
   p. The coding tool X may be Adaptive Color Transform (ACT).
   q. The coding tool X may be Joint Cb-Cr Residue coding (JCCR).
   r. The coding tool X may be Cross-Component Linear Model prediction (CCLM).
   s. The coding tool X may be Multiple Reference Line (MRL).
   t. The coding tool X may be Matrix-based Intra-Prediction (MIP).
   u. The coding tool X may be Intra Subpartitions Prediction (ISP).
10. The minimum allowed block size for Binary-Tree split (e.g. MinBtSizeY in JVET-Q2001-vB) may be different for luma component and chroma components when dual-tree coding is applied.
   a. In one example, MinBtSizeY=1<<MinBtLog2SizeY is the minimum allowed block size for Binary-Tree split for the luma component and MinBtSizeC=1<<MinBtLog2SizeC is the minimum allowed block size for Binary-Tree split for the chroma components, wherein MinBtLog2SizeY may be not equal to MinBtLog2SizeC.
      i. MinBtLog2SizeY may be signalled predicted by MinCbLog2SizeY. For example, the difference between MinBtLog2SizeY and MinCbLog2SizeY may be signalled.
      ii. MinBtLog2SizeC may be signalled predicted by MinCbLog2SizeY. For example, the difference between MinBtLog2SizeC and MinCbLog2SizeY may be signalled.
11. The minimum allowed block size for Ternary-Tree split (e.g. MinTtSizeY in JVET-Q2001-vB) may be different for luma component and chroma components when dual-tree coding is applied.

MinCbSizeY=1<<MinCbLog2SizeY denotes the minimum allowed coding block size.
  a. In one example, MinTtSizeY=1<<MinTtLog2SizeY is the minimum allowed block size for Ternary-Tree split for the luma component and MinTtSizeC=1<<MinTtLog2SizeC is the minimum allowed block size for Ternary-Tree split for the chroma components, wherein MinTtLog2SizeY may be not equal to MinTtLog2SizeC.
    i. MinTtLog2SizeY may be signalled predicted by MinCbLog2SizeY. For example, the difference between MinTtLog2SizeY and MinCbLog2SizeY may be signalled.
    ii. MinTtLog2SizeC may be signalled predicted by MinCbLog2SizeY. For example, the difference between MinTtLog2SizeC and MinCbLog2SizeY may be signalled.

12. The maximum number of subblock based merge candidates (e.g. MaxNumSubblockMergeCand) is derived as a sum of a first variable and a second variable, wherein the first variable is equal to 0 if affine prediction is disabled (e.g. sps_affine_enabled_flag is equal to 0), and the second variable depends whether subblock based TMVP (sbTMVP) is enabled or not.
  a. In one example, the first variable represents a number of allowed affine merge candidates.
  b. In one example, the second variable may be set to (sps_sbtmvp_enabled_flag && ph_temporal_mvp_enable_flag).
  c. In one example, the first variable is derived as K-S, wherein S is a value signaled by a syntax element (e.g. five_minus_num_affine_merge_cand) and K is a fixed number such as 4 or 5.
  d. In one example, MaxNumSubblockMergeCand=5−five_minus_max_num_affine_merge_cand+(sps_sbtmvp_enabled_flag && ph_temporal_mvp_enable_flag).
  e. In one example, MaxNumSubblockMergeCand=4−four_minus_max_num_affine_merge_cand+(sps_sbtmvp_enabled_flag && ph_temporal_mvp_enable_flag).
  f. In one example, MaxNumSubblockMergeCand=Min(W, MaxNumSubblockMergeCand), wherein W is a fixed number such as 5.
  g. In one example, indication of the first variable (e.g., five_minus_max_num_affine_merge_cand or four_minus_max_num_affine_merge_cand) may be conditionally signalled.
    i. In one example, it may be signalled only if sps_affine_enabled_flag is equal to 1.
    ii. When not present, five_minus_max_num_affine_merge_cand is inferred to be K (e.g., K=4 or 5).

13. Number of rows (lines) between ALF virtual boundary and CTB bottom boundary for luma component and chroma components; and/or filter strength for a row between ALF virtual boundary and CTB bottom boundary for luma component and that for a corresponding row of chroma components; and/or padding method for luma and chroma samples with the same row; are aligned for 4:2:2 and 4:4:4 cases.
  a. In one example, the vertical (and/or horizontal) position of ALF virtual boundary (VB) in chroma ALF may be aligned with the vertical (and/or horizontal) position of ALF virtual boundary in luma ALF for 4:2:2/4:4:4 chroma format video. Denote the vertical (and/or horizontal) position of ALF VB in luma ALF by vbPosY, and the vertical (and/or horizontal) position of ALF VB in chroma ALF by vbPosC.
    i. In one example, when the vertical position of ALF VB in luma ALF, vbPosY, is equal to CtbSizeY−S, the vertical position of ALF VB for chroma component, vbPosC, may be set equal to (CtbSizeY−S)/SubHeightC.
    ii. In one example, when the horizontal position of ALF VB in luma ALF, vbPosY is equal to CtbSizeY−S, the horizontal position of ALF VB for chroma component, vbPosC=(CtbSizeY−S)/SubWidthC.
    iii. In above examples, CtbSizeY specifies the luma coding tree block size of each CTU and SubHeightC and SubWidthC are defined in Table 3-1. S is an integer such as 4.
  b. In one example, the padding method in chroma ALF for K lines (and/or H columns) near the vertical (and/or horizontal) position of ALF VB may be aligned with the padding method in luma ALF. Denote the vertical (or horizontal) chroma sample position by Yc.
    i. In on example, when Yc is equal to vbPosC (e.g., in FIG. 14B) the following may apply:
      1) The above (or left) K (e.g., K=2) unavailable lines may be padded. Alternatively, furthermore, the corresponding K lines of these unavailable lines below (or right) current line may also be padded even the corresponding K lines are available.
        a. In one example, the above K unavailable lines may be padded using current line.
          i. In one example, in FIG. 14B C1, C2, C3 above current line may be set equal to C5, C6, C5. And C0 above current line may be set equal to C6.
        b. In one example, the corresponding K lines may be padded using current line.
          i. In one example, in FIG. 14B, C3, C2, C1 below current line may be set equal to C5, C6, C5. And C0 below current line may be set equal to C6.
      2) The below or (right) K unavailable lines may be padded. Alternatively, furthermore, the corresponding K lines of these unavailable lines above (or left) current line may also be padded even the corresponding K lines are available.
    ii. In on example, when Yc is equal to vbPosC−M (e.g., M=1, 2) (e.g., in FIG. 14A and FIG. 14D), the following may apply:
      1) the below (or right) K (e.g., K=1, 2) unavailable lines may be padded. And the corresponding K lines of these unavailable lines above (or left) current line may also be padded even the corresponding K lines are available.
        a. In one example, when M is equal to 1, the below K unavailable lines may be padded using current line.
          i. In one example, in FIG. 14A, C3, C2, C1 below current line may be set equal to C5, C6, C5. And C0 below current line may be set equal to C6.
        b. In one example, when M is equal to 1, the corresponding K lines may be padded using current line.

i. In one example, in FIG. 14A, C1, C2, C3 above current line may be set equal to C5, C6, C5. And C0 above current line may be set equal to C6.

c. In one example, when M is larger than or equal to 2, the below K unavailable lines may be padded using the downmost line above the ALF virtual boundary (e.g., vbPosC−1).

i. In one example, in FIG. 14D, C0 below current line may be set equal to C6.

d. In one example, when M is larger than or equal to 2, the corresponding K lines may be padded using the corresponding line of the downmost line above the ALF virtual boundary (e.g., vbPos−2*M+1).

i. In one example, in FIG. 14D, C0 above current line may be set equal to C6.

iii. In on example, when Yc is equal to vbPosC+N (e.g., N=1) (e.g., in FIG. 14C), the following may apply:

1) the above (or left) K (e.g., K=1) unavailable lines may be padded. And the corresponding K lines of these unavailable lines below (or right) current line may also be padded even the corresponding K lines are available.

a. In one example, the above K unavailable lines may be padded using current line.

i. In one example, in FIG. 14C, C0 above current line may be set equal to C6.

b. In one example, the corresponding K lines may be padded using current line.

i. In one example, in FIG. 14C, C0 below current line may be set equal to C6.

c. In one example, the ALF filter strength of M lines (or N columns) near the vertical (or horizontal) position of ALF VB in chroma ALF may be aligned with that in luma ALF for 4:2:2/4:4:4 chroma format video. The ALF filter strength of luma ALF and chroma ALF is controlled by alfShiftY (e.g., in Table 45) and alfShiftC (e.g., in Table 46).

i. In one example, when Yc==vbPosC−M (e.g., M=0, 1), alfShiftC=T1; when Yc !=vbPosC−M, alfShiftC=T2.

1) In one example, T1=10, T2=7.

ii. In one example, when Yc==vbPosC+M (e.g., M=0, 1), alfShiftC=T1; when Yc !=vbPosC+M, alfShiftC=T2.

1) In one example, T1=10, T2=7.

6. Embodiments

6.1. Embodiment of Signalling of Loop_Filter_Across_Tiles_Enabled_Flag 7.3.2.4 Picture Parameter Set RBSP Syntax

| pic_parameter_set_rbsp( ) { | Descriptor |
|---|---|
| . . . | |
| if( NumTilesInPic > 1 ) | |
| loop_filter_across_tiles_enabled_flag | u(1) |
| . . . | |
| } | |

6.2. Embodiment #1 of Signalling of Loop_Filter_Across_Slices_Enabled_Flag 7.3.2.4 Picture Parameter Set RBSP Syntax

| pic_parameter_set_rbsp( ) { | Descriptor |
|---|---|
| . . . | |
| if( !( rect_slice_flag && !single_slice_per_subpic_flag && num_slices_in_pic_minus1 = = 0 ) ) | |
| loop_filter_across_slices_enabled_flag | u(1) |
| . . . | |
| } | |

6.3. Embodiment #2 of Signalling of Loop_Filter_Across_Slices_Enabled_Flag 7.3.2.4 Picture Parameter Set RBSP Syntax

| pic_parameter_set_rbsp( ) { | Descriptor |
|---|---|
| . . . | |
| if( !rect_slice_flag \| \| single_slice_per_subpic_flag \| \| num_slices_in_pic_minus1 > 0 ) ) | |
| loop_filter_across_slices_enabled_flag | u(1) |
| . . . | |
| } | |

6.4. Embodiment #3 of Signalling of Loop_Filter_Across_Slices_Enabled_Flag 7.3.2.4 Picture Parameter Set RBSP Syntax

| pic_parameter_set_rbsp( ) { | Descriptor |
|---|---|
| . . . | |
| if( !( rect slice flag && num_slices_in_pic_minus1 = = 0 ) && !single_slice_per_subpic_flag ) | |
| loop_filter_across_slices_enabled_flag | u(1) |
| . . . | |
| } | |

6.5. Embodiment #4 of Signalling of Loop_Filter_Across_Slices_Enabled_Flag 7.3.2.4 Picture Parameter Set RBSP Syntax

| pic_parameter_set_rbsp( ) { | Descriptor |
|---|---|
| . . . | |
| if( !single_slice_per_subpic_flag && ( !rect_slice_flag \| \| num_slices_in_pic_minus1 > 0 ) ) | |
| loop_filter_across_slices_enabled_flag | u(1) |
| . . . | |
| } | |

6.6. Embodiment #1 of Signalling of LMCS Information 7.3.2.4 Picture Parameter Set RBSP Syntax

| pic_parameter_set_rbsp( ) { | Descriptor |
|---|---|
| . . . | |
| alf_info_in_ph_flag | u(1) |
| lmcs_info_in_ph_flag | u(1) |
| . . . | |
| } | |

6.7. Embodiment #2 of Signalling of LMCS Information
7.3.2.7 Picture Parameter Set RBSP Syntax

| picture_header_structure( ) { | Descriptor |
|---|---|
| ... | |
|   if( sps_lmcs_enabled_flag && | |
|   lmcs_info_in_ph_flag ) { | |
|     ph_lmcs_enabled_flag | u(1) |
|     if( ph_lmcs_enabled_flag) { | |
|       ph_lmcs_aps_id | u(2) |
|       if( ChromaArrayType != 0 ) | |
|         ph_chroma_residual_scale_flag | u(1) |
|     } | |
|   } | |
| ... | |
| } | |

6.8. Embodiment #3 of Signalling of LMCS Information
7.3.7.1 General Slice Header Syntax

| slice_header ( ) { | Descriptor |
|---|---|
| ... | |
|   if( sps_lmcs_enabled_flag && !lmcs_info_in_ph_flag ) { | |
|     slice_lmcs_enabled_flag | u(1) |
|     if( slice_lmcs_enabled_flag ) { | |
|       slice_lmcs_aps_id | u(2) |
|       if( ChromaArrayType != 0 ) | |
|         slice_chroma_residual_scale_flag | u(1) |
|     } | |
|   } | |
| ... | |
| } | |

6.9. Embodiment #4 of Signalling of LMCS Information
7.3.2.7 Picture Parameter Set RBSP Syntax

| picture_header_structure( ) { | Descriptor |
|---|---|
| ... | |
|   if( sps_lmcs_enabled_flag ) { | |
|     ph_lmcs_enabled_flag | u(1) |
|     if( ph_lmcs_enabled_flag && lmcs_info_in_ph_flag ) { | |
|       ph_lmcs_aps_id | u(2) |
|       if( ChromaArrayType != 0 ) | |
|         ph_chroma_residual_scale_flag | u(1) |
|     } | |
|   } | |
| ... | |
| } | |

6.10. Embodiment #5 of Signalling of LMCS Information
7.3.7.1 General Slice Header Syntax

| slice_header ( ) { | Descriptor |
|---|---|
| ... | |
|   if(ph_lmcs_enabled_flag) | |
|     slice_lmcs_enabled_flag | u(1) |
|   if( slice_lmcs_enabled_flag && !lmcs_info_in_ph_flag ) { | |
|     slice_lmcs_aps_id | u(2) |
|     if( ChromaArrayType != 0 ) | |
|       slice_chroma_residual_scale_flag | u(1) |
|   } | |
| ... | |
| } | |

6.11. Embodiment #6 of Signalling of LMCS Information

Eg 1: When slice_lmcs_enabled_flag is not present, it is inferred to be equal to ph_lmcs_enabled_flag.

Eg 2: When slice_lmcs_aps_id is not present, it is inferred to be equal to ph_lmcs_aps_id.

Eg 3: When slice_chroma_residual_scale_flag is not present, it is inferred to be equal to ph_chroma_residual_scale_flag.

6.12. Embodiment #1 of Signalling of Slice Information
7.3.2.4 Picture Parameter Set RBSP Syntax

| picture_header_structure( ) { | Descriptor |
|---|---|
| ... | |
|   no_pic_partition_flag | u(1) |
|   if( !no_pic_partition_flag ) { | |
|     pps_log2_ctu_size_minus5 | u(2) |
|     num_exp_tile_columns_minus1 | ue(v) |
|     num_exp_tile_rows_minus1 | ue(v) |
|     for( i = 0; i <= num_exp_tile_columns_minus1; i++ ) | |
|       tile_column_width_minus1[ i ] | ue(v) |
|     for( i = 0; i <= num_exp_tile_rows_minus1; i++ ) | |
|       tile_row_height_minus1[ i ] | ue(v) |
|     if( NumTilesInPic > 1 ) | |
|       rect_slice_flag | u(1) |
|     if( rect_slice_flag ) | |
|       single_slice_per_subpic_flag | u(1) |
|     if( rect_slice_flag && !single_slice_per_subpic_flag ) { | |
|       num_slices_in_pic_minus1 | ue(v) |
|       if( num_slices_in_pic_minus1 > 0 ) | |
|         tile_idx_delta_present_flag | u(1) |
|       for( i = 0; i < num_slices_in_pic_minus1; i++ ) { | |
|         if( NumTileColumns > 1 ) | |
|           slice_width_in_tiles_minus1[ i ] | ue(v) |
|         if( NumTileRows > 1 && | |
|           (tile_idx_delta_present_flag | | tileIdx % NumTileColumns == 0 ) ) | |
|           slice_height_in_tiles_minus1[ i ] | ue(v) |
|         if( slice_width_in_tiles_minus1[ i ] == 0 && | |
|           slice_height_in_tiles_minus1[ i ] == 0 && | |

-continued

| picture_header_structure( ) { | Descriptor |
|---|---|
|     RowHeight[ SliceTopLeftTileIdx[ i ] / NumTileColumns ] > 1 | |
| ){ | |
|       num_exp_slices_in_tile[ i ] | ue(v) |
|       numExpSlicesInTile = num_exp_slices_in_tile[ i ] | |
|       for( j = 0; j < numExpSlicesInTile; j++ ) | |
|         exp_slice_height_in_ctus_minus1[ j ] | ue(v) |
|       i += NumSlicesInTile[ i ] − 1 | |
|     } | |
|     if( tile_idx_delta_present_flag && i < num_slices_in_pic_minus1 | |
| ) | |
|       tile_idx_delta[ i ] | se(v) |
|   } | |
| } | |
|   loop_filter_across_tiles_enabled_flag | u(1) |
|   loop_filter_across_slices_enabled_flag | u(1) |
| } | |
| ... | |
| } | |

6.13. Embodiment of Handling ALF Virtual Boundary
8.8.5.4 Coding Tree Block Filtering Process for Chroma Samples
...

The vertical sample position offsets y1, y2 and the variable alfShiftC are specified in Table 46 according to the vertical chroma sample position y and applyAlfLineBufBoundary.

The variable curr is derived as follows:

$$\text{curr}=\text{recPicture}[h_x][v_y] \quad (1504)$$

The array of chroma filter coefficients f[j] and the array of chroma clipping values c[j] is derived as follows with j=0 ... 5:

$$f[j]=\text{AlfCoeff}_C[\text{slice\_alf\_aps\_id\_chroma}][\text{altIdx}][j] \quad (1505)$$

$$c[j]=\text{AlfClip}_C[\text{slice\_alf\_aps\_id\_chroma}][\text{altIdx}][j] \quad (1506)$$

The variable sum is derived as follows:

$$\begin{aligned}\text{sum}=&f[0]*(\text{Clip3}(-c[0],c[0],\text{recPicture}[h_x][v_{y+y2}]-\text{curr})+\text{Clip3}(-c[0],c[0],\text{recPicture}[h_x][v_{y-y2}]-\\&\text{curr}))+f[1]*(\text{Clip3}(-c[1],c[1],\text{recPicture}[h_{x+1}]\\&[v_{y+y1}]-\text{curr})+\text{Clip3}(-c[1],c[1],\text{recPicture}[h_{x-1}]\\&[v_{y-y1}]-\text{curr}))+f[2]*(\text{Clip3}(-c[2],c[2],\text{recPicture}\\&[h_x][v_{y+y1}]-\text{curr})+\text{Clip3}(-c[2],c[2],\text{recPicture}[h_x]\\&[v_{y-y1}]-\text{curr}))+f[3]*(\text{Clip3}(-c[3],c[3],\text{recPicture}\\&[h_{x-1}][v_{y+y1}]-\text{curr})+\text{Clip3}(-c[3],c[3],\text{recPicture}\\&[h_{x+1}][v_{y-y1}]-\text{curr}))+f[4]*(\text{Clip3}(-c[4],c[4],\\&\text{recPicture}[h_{x+2}][v_y]-\text{curr})+\text{Clip3}(-c[4],c[4],\\&\text{recPicture}[h_{x-2}][v_y]-\text{curr}))+f[5]*(\text{Clip3}(-c[5],c\\&[5],\text{recPicture}[h_{x+1}][v_y]-\text{curr})+\text{Clip3}(-c[5],c[5],\\&\text{recPicture}[h_{x-1}][v_y]-\text{curr}))\end{aligned} \quad (1507)$$

$$\text{sum}=\text{curr}+((\text{sum}+64)>>\text{alfShift}C) \quad (1508)$$

The modified filtered reconstructed chroma picture sample alfPicture[xCtbC+x][yCtbC+y] is derived as follows:

$$\text{alfPicture}[xCtbC+x][yCtbC+y]=\text{Clip3}(0,(1<<\text{BitDepth})-1,\text{sum}) \quad (1509)$$

TABLE 46

Specification of y1, y2 and alfShiftC according to the vertical chroma sample position y and applyAlfLineBufBoundary

| Condition | alfShiftC | y1 | y2 |
|---|---|---|---|
| ~~( y = = ctbHeightC − 2 \|\| y = = ctbHeightC − 3 )~~ | 10 | 0 | 0 |
| ( y = = ( ctbSizeY − 4 ) / SubHeightC − 1 \|\| y = =  | | | |

TABLE 46-continued

Specification of y1, y2 and alfShiftC according to the vertical chroma sample position y and applyAlfLineBufBoundary

| Condition | alfShiftC | y1 | y2 |
|---|---|---|---|
| ( ctbSizeY − 4 ) / SubHeightC ) && ( applyAlfLineBufBoundary = = 1 ) | | | |
| ~~( y = = ctbHeightC − 1 \|\| y = = ctbHeightC − 4 )~~ ( y = = ( ctbSizeY − 4 ) / SubHeightC − 2 \|\| y = = ( ctbSizeY − 4 ) / SubHeightC + 1 ) && ( applyAlfLineBufBoundary = = 1 ) | 7 | 1 | 1 |
| Otherwise | 7 | 1 | 2 |

Figure 15:
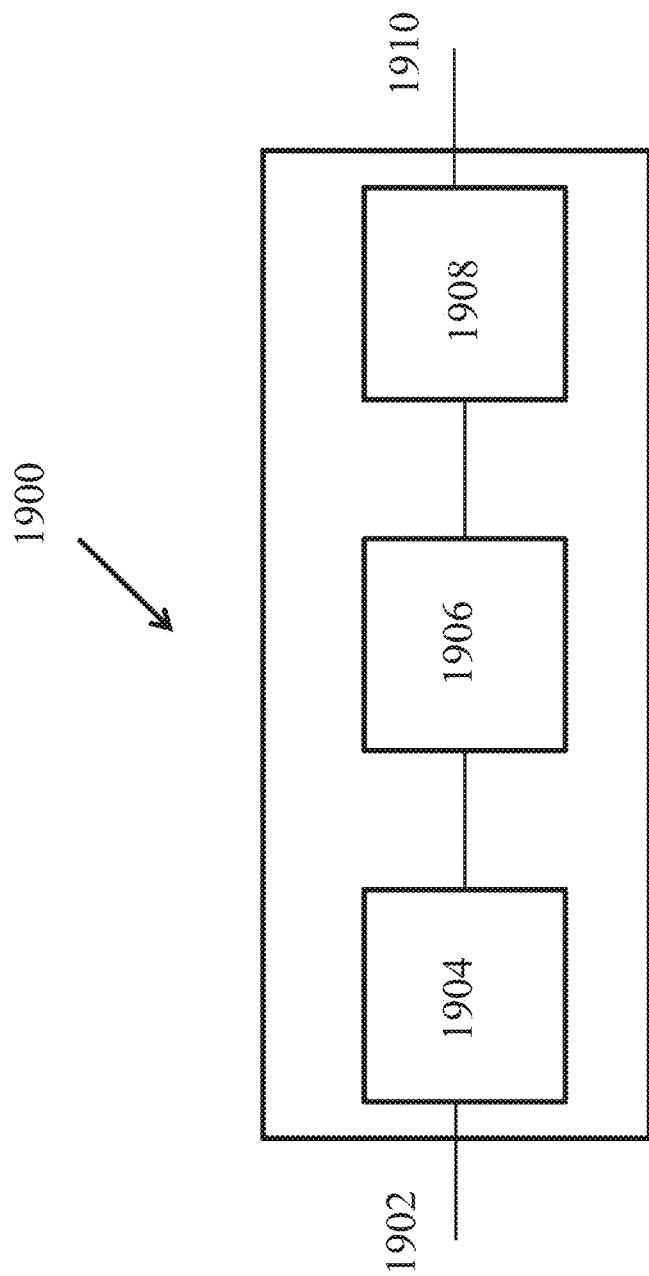
FIG. 15 is a block diagram of an example video processing system.

FIG. 15 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 16:
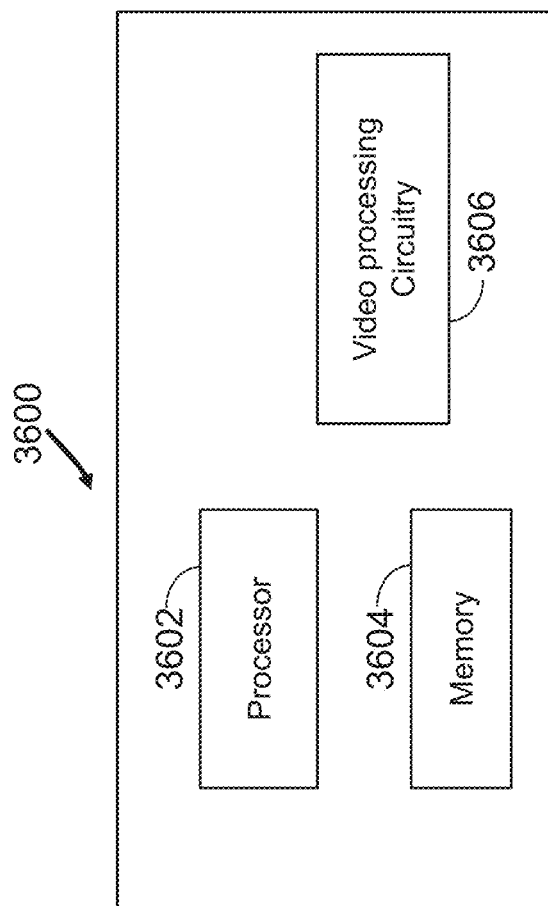
FIG. 16 is a block diagram of a video processing apparatus.

FIG. 16 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing hardware 3606. The processor(s) 3602 may be configured to implement one or more methods described in the present document. The memory (memories) 3604 may be used for storing data and code used for implementing the methods and techniques described herein. The video processing hardware 3606 may be used to implement, in hardware circuitry, some techniques described in the present document.

Figure 18:
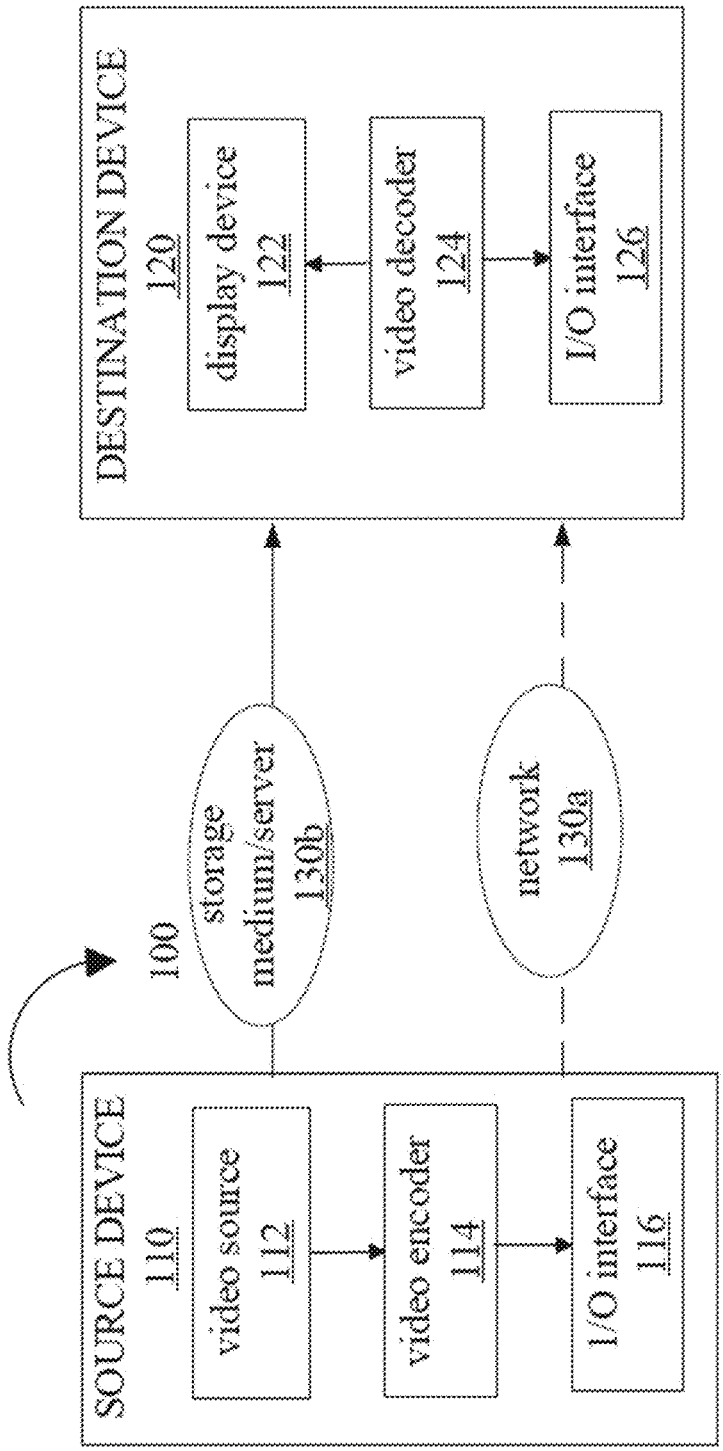
FIG. 18 is a block diagram that illustrates a video coding system according to various embodiments of the present disclosure.

FIG. 18 is a block diagram that illustrates an example video coding system 100 that may utilize the techniques of this disclosure.

As shown in FIG. 18, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 19:
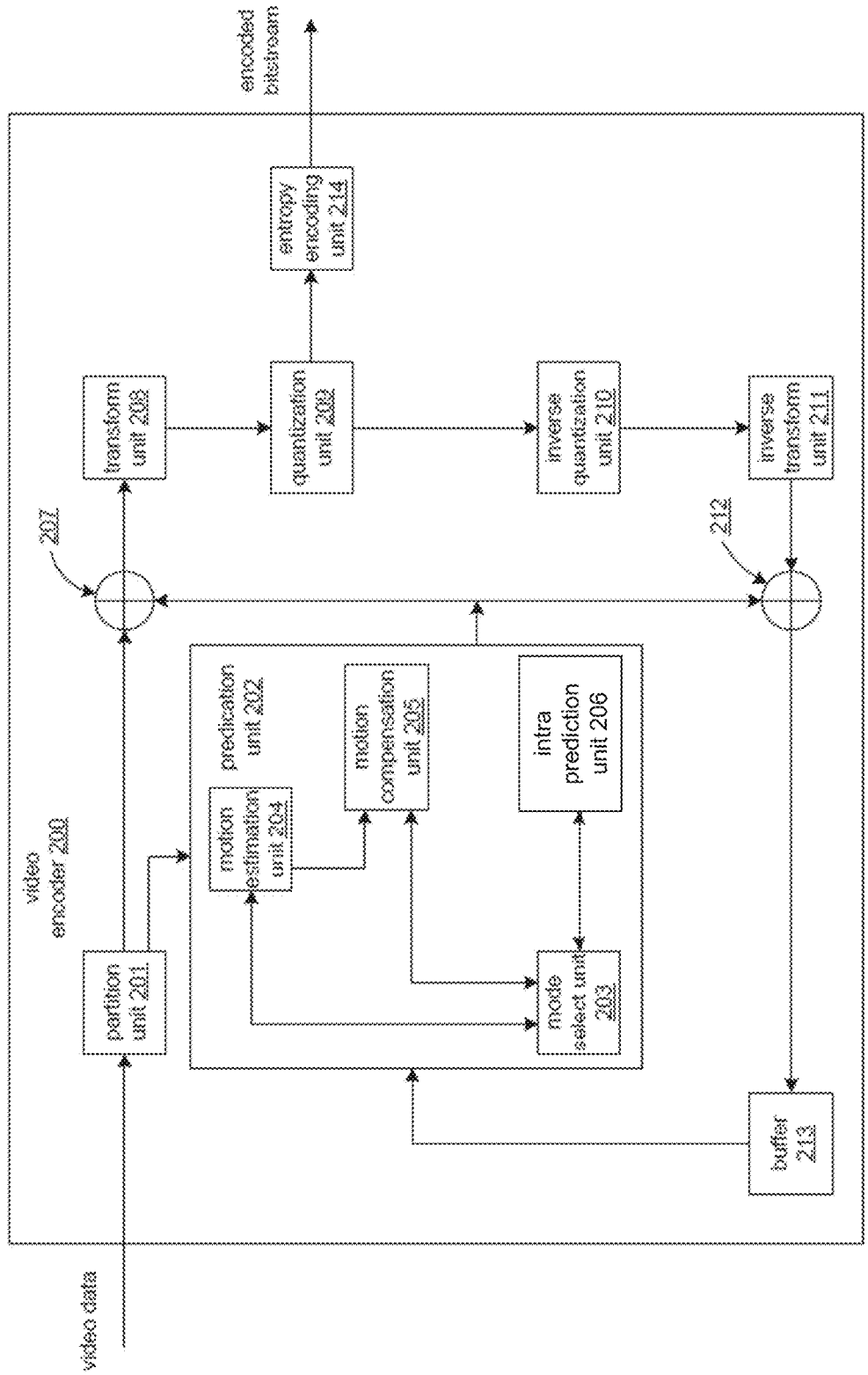
FIG. 19 is a block diagram that illustrates an encoder according to various embodiments of the present disclosure.

FIG. 19 is a block diagram illustrating an example of video encoder 200, which may be video encoder 114 in the system 100 illustrated in FIG. 18.

Video encoder 200 may be configured to perform any or all of the techniques of this disclosure. In the example of FIG. 19, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205, an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 19 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the other video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signalling techniques that may be implemented by video encoder 200 include advanced motion vector predication (AMVP) and merge mode signalling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Figure 20:
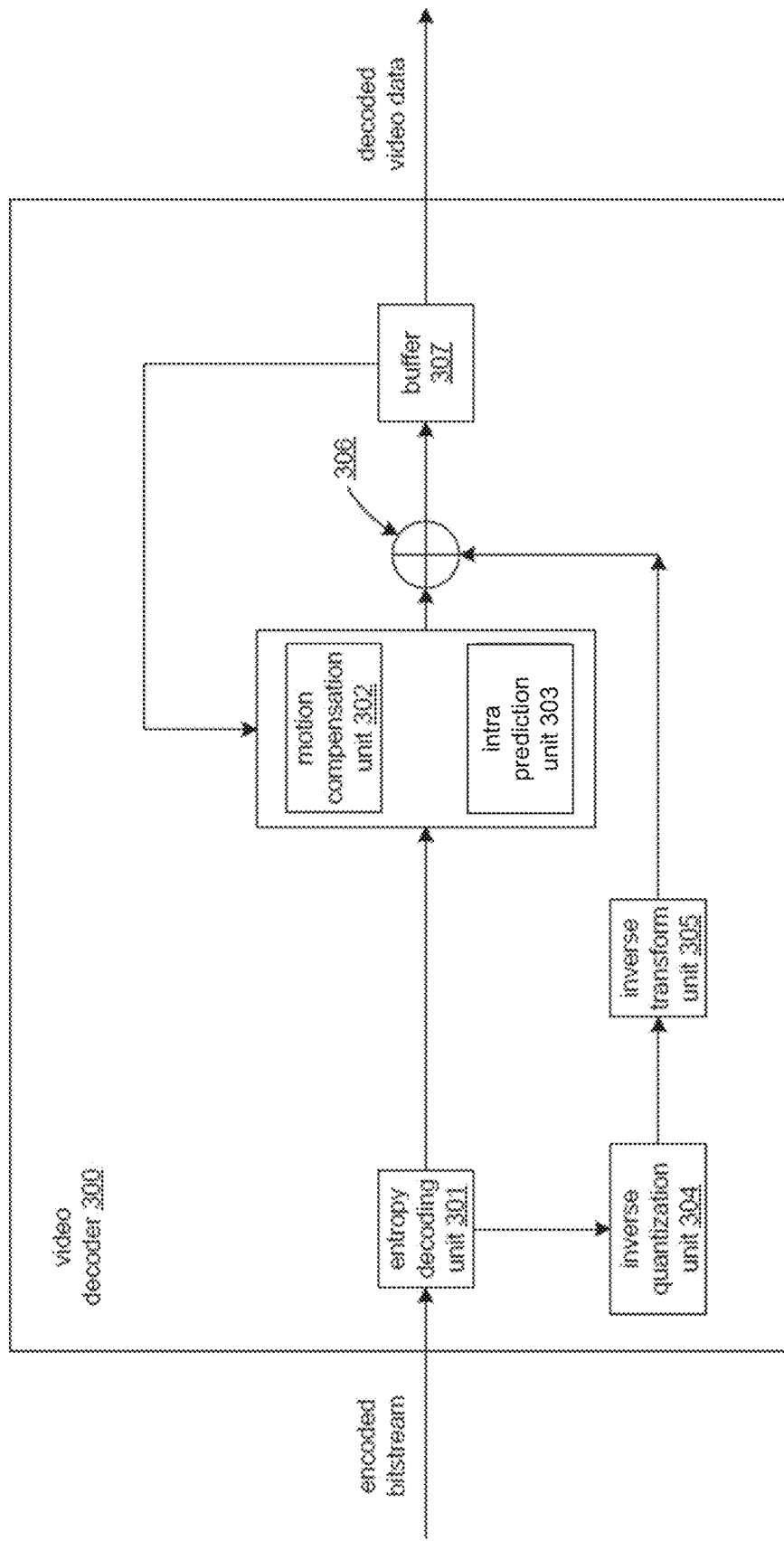
FIG. 20 is a block diagram that illustrates a decoder according to various embodiments of the present disclosure.

FIG. 20 is a block diagram illustrating an example of video decoder 300 which may be video decoder 124 in the system 100 illustrated in FIG. 18.

The video decoder 300 may be configured to perform any or all of the techniques of this disclosure. In the example of FIG. 20, the video decoder 300 includes a plurality of functional components. The techniques described in this disclosure may be shared among the various components of the video decoder 300. In some examples, a processor may be configured to perform any or all of the techniques described in this disclosure.

In the example of FIG. 20, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 19).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

A listing of solutions preferred by some embodiments is provided next.

The following solutions show example embodiments of techniques discussed in the previous section (e.g., items 1 and 2).

Figure 17:
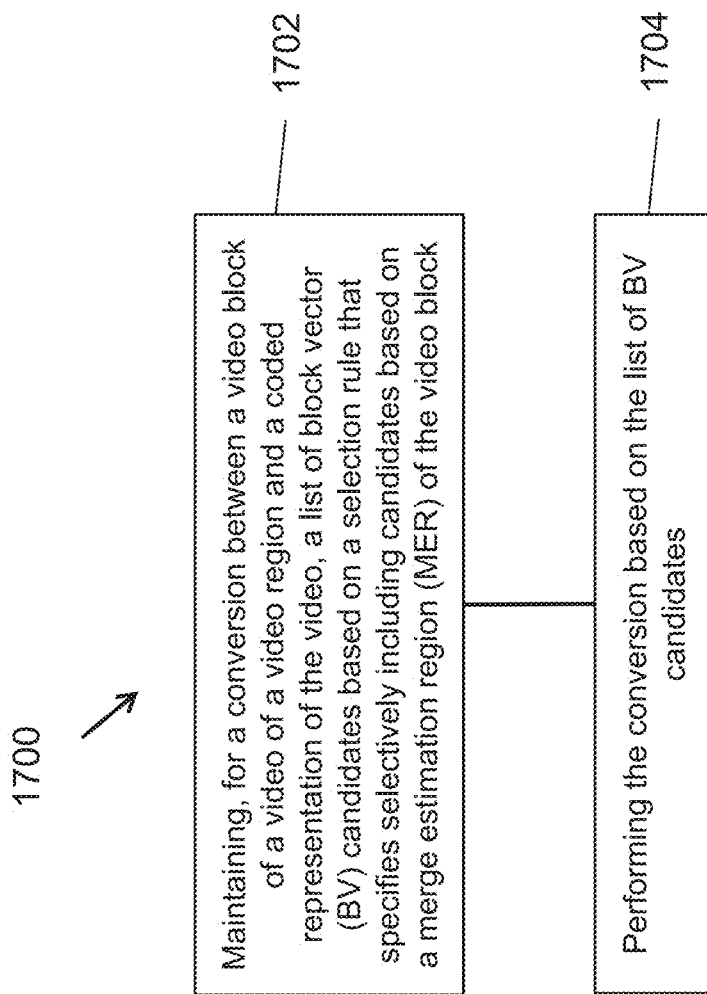
FIG. 17 is a flowchart for an example method of video processing.

1. A video processing method (e.g., method 1700 shown in FIG. 17), comprising: determining (1702), for a conversion between a video unit of a video and a coded representation of the video, whether an indication of applicability of in-loop filtering across video regions of the video unit is included in the coded representation; and performing (1704) the conversion based on the determining.

2. The method of solution 1, wherein the video unit comprises a picture.

3. The method of any of solutions 1-2, wherein the video region comprises a tile.

4. The method of any of solutions 1-2, wherein the video region comprises a slice.

The following solutions show example embodiments of techniques discussed in the previous section (e.g., item 3).

5. A method of video processing, comprising: performing a conversion between a video region of a video and a coded representation of the video, wherein the coded representation conforms to a format rule, wherein the format rule specifies that information about applicability a luma mapping with chroma scaling (LMCS) tool to the conversion is indicated in the coded representation at a video slice level; wherein, the LMCS tool includes, during the conversion, to construct the current video block based on a first domain and a second domain and/or chroma residue is scaled in a luma-dependent manner.

The following solutions show example embodiments of techniques discussed in the previous section (e.g., items 4, 5, 7, 8).

6. A method of video processing, comprising: performing a conversion between a video and a coded representation of the video, wherein the conversion confirms to a size rule that specifies that: enforcing the size rule, during encoding, a maximum size of a video region coded using a transform-skip coding scheme or a delta pulse coded modulation coding scheme, or parsing and decoding the coded representation, during decoding, by enforcing the size rule for the maximum size of the video region decoded using a transform-skip decoding scheme or a delta pulse coded modulation decoding scheme.

7. The method of solution 6, wherein the size rule specifies that the maximum size of the video region that is a transform skip block is less than or equal to a coding tree block size.

8. The method of solution 6, wherein the size rule specifies that the maximum size of the video region that is processed using block based delta pulse mode coding is less than or equal to a coding tree block size.

The following solutions show example embodiments of techniques discussed in the previous section (e.g., item 5).

9. The method of solution 6, wherein the size rule specifies that the maximum size of the video region that is a transform skip block is less than or equal to a minimum coding block size.

10. The method of solution 6, wherein the size rule specifies that the maximum size of the video region that is processed using block based delta pulse mode coding is less than or equal to a minimum coding block size.

The following solutions show example embodiments of techniques discussed in the previous section (e.g., item 7).

11. The method of any of solutions 6 to 10, wherein the size is indicated in a field in the coded representation and wherein a minimum allowed coding block size for the conversion controls where the field occurs in the coded representation and/or how the size is interpreted from the field.

The following solutions show example embodiments of techniques discussed in the previous section (e.g., item 8).

12. The method of any of solutions 6 to 10, wherein a minimum allowed coding block size for the conversion controls whether a field indicative of the size rule occurs in the coded representation and/or how the size is interpreted from the field.

The following solutions show example embodiments of techniques discussed in the previous section (e.g., item 6).

13. A method of video processing, comprising: performing a conversion between a video region of a video and a coded representation of the video, wherein the coded representation conforms to a format rule that specifies that a minimum allowed transform block size used during the conversion controls whether or how an indication of maximum allowed transform block size is included in the coded representation.

14. The method of solution 13, wherein the format rule specifies that the minimum allowed transform block size is greater than or equal to the minimum allowed coding block size.

The following solutions show example embodiments of techniques discussed in the previous section (e.g., item 9).

15. A method of video processing, comprising: performing a conversion between a video unit of a video and a coded representation of the video according to a format rule, wherein the coded representation conforms to the format rule that specifies that a minimum allowed coding block size used during the conversion controls whether a field carrying information regarding applicability of a coding tool in the conversion is included at a video region level.

16. The method of solution 15, wherein the video region corresponds to a sequence parameter set or a picture parameter set or a picture header or a slice header.

17. The method of any of solutions 15-16, wherein the coding tool includes a combined inter-intra prediction tool.

18. The method of any of solutions 15-16, wherein the coding tool includes a multiple transform selection coding tool.

The following solutions show example embodiments of techniques discussed in the previous section (e.g., items 10, 11).

19. A method of video processing, comprising: determining, for a conversion between a video region of a video and a coded representation of the video, that due to using a dual-tree coding is used for the conversion, that splitting schemes used for luma and chroma components of the video have different allowed minimum block sizes for the luma and chroma components, and performing the conversion based on the determining.

20. The method of 19, wherein the splitting schemes include binary-tree splitting.

21. The method of solution 19, wherein the splitting schemes include ternary-tree splitting.

The following solutions show example embodiments of techniques discussed in the previous section (e.g., item 12).

22. A method of video processing, comprising: performing a conversion between a video region of a video and a coded representation of the video region by conforming a format rule for the coded representation; wherein the format rule specifies that a maximum number of sub-block based merge candidates used during the conversion is derivable as a sum of a first variable and a second variable, wherein use of affine prediction controls a value of the first variable, and wherein use of sub-block based temporal motion vector prediction controls a value of the second variable.

23. The method of solution 22, wherein the first variable represents a number of allowed affine merge candidates.

The following solutions show example embodiments of techniques discussed in the previous section (e.g., item 13).

24. A method of video processing, comprising: performing a conversion between a video region of a video and a coded representation of the video region by conforming a processing rule that is applicable to the conversion due to the video being a 4:2:2 or a 4:4:4 video, wherein the processing rule defines that chroma and luma are aligned for one or more of the following: (a) a number of pixel lines between a virtual boundary of an adaptive loop filtering operation and a bottom boundary of a coding tree block; or (b) a filter strength of a filter applied to a row between the virtual boundary of the adaptive loop filtering operation and the bottom boundary of the coding tree block; or (c) a padding method used for padding video samples in a row.

25. The method of solution 24, wherein the processing rule further defines a vertical alignment of virtual boundaries between chroma and luma components.

26. The method of solution 24, wherein the processing rule defines that a padding method used for padding K lines and/or H columns of chroma is aligned with a padding method used for luma.

27. The method of any of above solutions, wherein the video region comprises a video coding unit.

28. The method of any of above solutions, wherein the video region comprises a video picture.

29. The method of any of solutions 1 to 28, wherein the conversion comprises encoding the video into the coded representation.

30. The method of any of solutions 1 to 28, wherein the conversion comprises decoding the coded representation to generate pixel values of the video.

31. A video decoding apparatus comprising a processor configured to implement a method recited in one or more of solutions 1 to 30.

32. A video encoding apparatus comprising a processor configured to implement a method recited in one or more of solutions 1 to 30.

33. A computer program product having computer code stored thereon, the code, when executed by a processor, causes the processor to implement a method recited in any of solutions 1 to 30.

34. A method, apparatus or system described in the present document.

FIG. 21 is a flowchart for an example method (2100) of video processing. Operation 2102 includes performing a conversion between a video comprising a video unit and a bitstream of the video, wherein the bitstream conforms to a format rule, and wherein the format rule specifies that a first syntax element indicating whether an in-loop filtering operation is performed across tile boundaries is selectively included in the bitstream responsive to whether or how the video unit is partitioned into tiles.

In some embodiments for method 2100, the video unit comprises a picture. In some embodiments for method 2100, the first syntax element is in a picture parameter set. In some embodiments for method 2100, the format rule specifies that the first syntax element is included in the bitstream in response to the video unit being partitioned into more than one tile. In some embodiments for method 2100, the format rule specifies that the first syntax element is not included in the bitstream in response to the video unit comprising only one tile. In some embodiments for method 2100, the format rule specifies that the first syntax element is included in the bitstream in response to the bitstream including a value of zero for a second syntax element that indicates whether there is one tile per picture as a constraint.

In some embodiments for method 2100, the format rule specifies that the first syntax element may be equal to zero and is included in the bitstream in response to the bitstream including a value of one for a second syntax element that indicates whether there is one tile per picture as a constraint. In some embodiments for method 2100, the second syntax element is one_tile_per_pic_constraint_flag. In some embodiments for method 2100, the in-loop filtering operation includes at least one of a deblocking filter operation, a sample adaptive offset operation, or an adaptive loop filter operation. In some embodiments for method 2100, the first syntax element is loop_filter_across_tiles_enabled_flag. In some embodiments for method 2100, the performing the conversion comprising encoding the video into the bitstream.

In some embodiments for method 2100, the performing the conversion comprises generating the bitstream from the video, and the method further comprises storing the bitstream in a non-transitory computer-readable recording medium. In some embodiments for method 2100, the performing the conversion comprises decoding the video from the bitstream. In some embodiments, a video decoding apparatus comprising a processor configured to implement method 2100 and operations of the related embodiments. In some embodiments, a video encoding apparatus comprising a processor configured to implement method 2100 and operations of the related embodiments.

In some embodiments, a computer program product having computer instructions stored thereon, the instructions, when executed by a processor, causes the processor to implement method 2100 and operations related to related embodiments. In some embodiments, a non-transitory computer-readable recording medium storing a bitstream of a video which is generated by a method performed by a video processing apparatus, wherein the method comprises: generating the bitstream from the video comprising a video unit; wherein the bitstream conforms to a format rule, and wherein the format rule specifies that a first syntax element indicating whether an in-loop filtering operation is performed across tile boundaries is selectively included in the bitstream responsive to whether or how the video unit is partitioned into tiles. In some embodiments, a non-transitory computer-readable storage medium storing instructions that cause a processor to implement method 2100 and operations of the related embodiments. In some embodiments, a method of bitstream generation, comprising: generating a bitstream of a video according to method 2100 and operations of the related embodiments, and storing the bitstream on a computer-readable program medium.

FIG. 22 is a flowchart for an example method (2200) of video processing. Operation 2202 includes performing a conversion between a video unit of a video and a bitstream of the video, wherein the bitstream conforms to a format rule, and wherein the format rule specifies that a syntax element indicating whether an in-loop filtering operation is performed across slice boundaries is selectively included in the bitstream responsive to whether or how the video unit is partitioned into slices.

In some embodiments of method 2200, the video unit comprises a picture. In some embodiments of method 2200, the video unit comprises a sub-picture. In some embodiments of method 2200, the syntax element is in a picture parameter set. In some embodiments of method 2200, the rule specifies that the syntax element is not included in the bitstream in response to the video unit being partitioned into only one slice. In some embodiments of method 2200, the rule specifies that the syntax element is not included in the bitstream in response to each sub-picture of the video unit being partitioned into only one slice. In some embodiments of method 2200, the rule specifies that the syntax element is included in the bitstream in response to each sub-picture of the video unit being partitioned into only one slice.

In some embodiments of method 2200, the rule specifies that the syntax element is included in the bitstream in response to a first flag being equal to 1 which specifies that each sub-picture consists of one and only one rectangular slice. In some embodiments of method 2200, the first flag is single_slice_per_subpic_flag. In some embodiments of method 2200, the first flag is in a picture parameter set.

In some embodiments of method 2200, the rule specifies that the syntax element is included in the bitstream in response to the video unit comprising a picture that is partitioned in a non-rectangular shape. In some embodiments of method 2200, the rule specifies that the syntax element is included in the bitstream in response to a second flag being equal to 0 which specifies that a raster-san slice mode is in use for each picture. In some embodiments of method 2200, the raster-san slice mode is a non-rectangular slice mode. In some embodiments of method 2200, the second flag is rect_slice_flag. In some embodiments of method 2200, the second flag is in a picture parameter set. In some embodiments of method 2200, the rule specifies that the syntax element is not included in the bitstream in response to the video unit comprising a picture that is partitioned in a rectangular shape and a number of slices of the video unit is equal to one.

In some embodiments of method 2200, the rule specifies that the syntax element is included in the bitstream in response to the bitstream including a value of zero for a syntax element that indicates whether there is one slice per picture as a constraint. In some embodiments of method 2200, the rule specifies that the syntax element may be equal to zero and is included in the bitstream in response to the bitstream including a value of one for a syntax element that indicates whether there is one slice per picture as a constraint. In some embodiments of method 2200, the in-loop filtering operation includes at least one of a deblocking filter operation, a sample adaptive offset operation, or an adaptive loop filter operation. In some embodiments of method 2200, the performing the conversion comprising encoding the video into the bitstream. In some embodiments of method 2200, the performing the conversion comprises generating the bitstream from the video, and the method further comprises storing the bitstream in a non-transitory computer-readable recording medium.

In some embodiments of method 2200, the performing the conversion comprises decoding the video from the bitstream. In some embodiments, a video decoding apparatus comprising a processor configured to implement method 2200 and operations of the related embodiments. In some embodiments, a video encoding apparatus comprising a processor configured to implement method 2200 and operations of the related embodiments. In some embodiments, a computer program product having computer instructions stored thereon, the instructions, when executed by a processor, causes the processor to implement method 2200 and operations of the related embodiments. In some embodiments, a non-transitory computer-readable recording medium storing a bitstream of a video which is generated by a method performed by a video processing apparatus, wherein the method comprises: generating the bitstream from a video unit of the video; wherein the bitstream conforms to a format rule, and wherein the format rule specifies that a syntax element indicating whether an in-loop filtering operation is performed across slice boundaries is selectively included in the bitstream responsive to whether or how the video unit is partitioned into slices.

In some embodiments, a non-transitory computer-readable storage medium storing instructions that cause a processor to implement method 2200 and operations of the related embodiment. In some embodiments, a method of bitstream generation, comprising: generating a bitstream of a video according to method 2200 and operations of the related embodiment, and storing the bitstream on a computer-readable program medium.

FIG. 23 is a flowchart for an example method (2300) of video processing. Operation 2302 includes performing a conversion between a video region of a video and a bitstream of the video, wherein the bitstream conforms to a format rule, wherein the format rule specifies that information about applicability of a tool to the conversion is indicated in the bitstream at a video slice level and/or at a video picture level, and wherein the tool maps luma samples to particular values and selectively applies a scaling operation to the values of chroma samples.

In some embodiments of method 2300, the format rule specifies that the information about applicability of the tool includes a first indication of whether to enable the tool. In some embodiments of method 2300, the format rule specifies that the information about applicability of the tool includes a second indication of parameters, and the parameters include an identifier of an Adaptation Parameter Set (APS) for the tool at the video picture level, and/or a value that indicates whether a chroma residual scale is enabled at the video picture level. In some embodiments of method 2300, the format rule specifies that the information about applicability of the tool is indicated at both the video slice level and the video picture level.

In some embodiments of method 2300, the format rule specifies that the information about applicability of the tool is indicated at both the video slice level and the video picture level, and a previous information about applicability of the tool when included at the video picture level is overwritten with the information about applicability of the tool when the information about applicability of the tool is included at the video slice level. In some embodiments of method 2300, the format rule specifies that the information about applicability of the tool is indicated at either the video slice level or the video picture level. In some embodiments of method 2300, the format rule specifies that the information about applicability of the tool is indicated at either the video slice level to indicate which Adaptation Parameter Set (APS) is used for a current slice of the video region. In some embodiments of method 2300, the format rule specifies that the bitstream include a syntax element at a Sequence Parameter Set (SPS) or at a Picture Parameter Set (PPS) to indicate whether the information about applicability of the tool is indicated at the video slice level or at the video picture level.

In some embodiments of method 2300, the syntax element controls only the first indication. In some embodiments of method 2300, the syntax element controls only the second indication. In some embodiments of method 2300, the syntax element controls both the first indication and the second indication. In some embodiments of method 2300, the format rule specifies that the information about applicability of the tool is indicated in a syntax element in a picture header with a default value in response to the information not being present in the picture header. In some embodiments of method 2300, the format rule specifies that the information about applicability of the tool is indicated in a syntax element in a slice header with a default value in response to the information not being present in the slice header. In some embodiments of method 2300, the format rule specifies that the information about applicability of the tool is indicated in a syntax element in a slice header, the format rule specifies that the syntax element has a value of a corresponding syntax element that indicates the information about applicability of the tool in a picture header, and the format rule specifies that the syntax element has the value of the corresponding syntax element in response to the information not being present in the slice header.

In some embodiments of method 2300, the format rule specifies that a plurality of Adaptation Parameter Set (APS) identifiers of the tool enabled APS are indicated in a picture header in response to slices associated with the picture header referring to the plurality of APS identifiers. In some embodiments of method 2300, a length of a list of the plurality of APS identifiers is dependent on a number of the slices in a picture. In some embodiments of method 2300, the format rule specifies that a syntax element is included in a slice header, and wherein the syntax element indicates which tool enabled APS from the plurality of APS is to be used for a current slice. In some embodiments of method 2300, the tool, when enabled, performs a switching between samples of a reshaped domain and of an original domain for the video region in case that the video region is from a luma component, or wherein the tool, when enabled, performs a scaling of a chroma residual of the video region in case that the video region is from a chroma component.

FIG. 24 is a flowchart for an example method (2400) of video processing. Operation 2402 includes performing a conversion between a video region of a video and a bitstream of the video, wherein the conversion confirms to a size rule, and wherein, the size rule specifies a maximum size of the video region coded using a transform-skip (TS) coding scheme or a block-based delta pulse code modulation (BDPCM) coding scheme, or a maximum size of a transform block for the video region according to a coding characteristic of the video region.

In some embodiments of method 2400, the size rule specifies that the maximum size of the video region is less than or equal to a coding tree block (CTB) size. In some embodiments of method 2400, the size rule specifies that a maximum allowed width and height for the TS coding or decoding scheme and/or for the BDPCM coding or decoding scheme for a luma block is less than or equal to the CTB size. In some embodiments of method 2400, the size rule specifies that a maximum allowed width and height for the TS coding or decoding scheme and/or for the BDPCM coding or decoding scheme for a chroma block is less than or equal to the CTB size divided by subWidthC and/or the CTB size divided by subHeightC, wherein the subWidthC and the subHeightC are dependent on chroma format of the video. In some embodiments of method 2400, the size rule specifies that a maximum allowed width for the TS coding or decoding scheme and/or for the BDPCM coding or decoding scheme for a chroma block is less than or equal to the CTB size divided by subWidthC and/or the CTB size divided by subHeightC.

In some embodiments of method 2400, the size rule specifies that a maximum allowed height for the TS coding or decoding scheme and/or for the BDPCM coding or decoding scheme for a chroma block is less than or equal to the CTB size divided by subWidthC and/or the CTB size divided by subHeightC. In some embodiments of method 2400, a first value is equal to log 2_transform_skip_max_size_minus2 plus 2, wherein the first value is less than or equal to a second value for CtbLog2SizeY, and wherein log 2_transform_skip_max_size_minus2 plus 2 is equal to log 2 of a maximum block size used for the TS coding scheme or for the TS decoding scheme.

In some embodiments of method 2400, a first value that describes a maximum value for log 2_transform_skip_max_size_minus2 is equal to a second value for CtbLog2SizeY minus 2 wherein log 2_transform_skip_max_size_minus2 plus 2 is equal to log 2 of a maximum block size used for the TS coding scheme or for the TS decoding scheme. In some embodiments of method 2400, the size rule specifies that the maximum size of the video region that is a transform skip block is a minimum of (CtbSizeY, 1<<(log 2_transform_skip_max_size_minus2+2)), wherein << indicates a left shift operation, wherein CtbSizeY is the CTB size, and wherein log 2_transform_skip_max_size_minus2 plus 2 is equal to log 2 of a maximum block size used for the TS coding scheme or for the TS decoding scheme. In some embodiments of method 2400, the size rule specifies that the maximum size of the video region that is a transform skip block is 1<<Min(log 2_transform_skip_max_size_minus2+2, CtbLog2SizeY), wherein << indicates a left shift operation, wherein CtbSizeY is the CTB size, and wherein log 2_transform_skip_max_size_minus2 plus 2 is equal to log 2 of a maximum block size used for the TS coding scheme or for the TS decoding scheme. In some embodiments of method 2400, the size rule specifies that the maximum size for the TS coding or decoding scheme and/or for the BDPCM coding or decoding scheme for a chroma block is less than or equal to a maximum transform block size for the chroma block.

In some embodiments of method 2400, a maximum allowed width and height for the TS coding or decoding scheme and/or for the BDPCM coding or decoding scheme for the chroma block is less than or equal to a maximum transform block size for a luma block divided by SubWidthC. In some embodiments of method 2400, a maximum allowed width for the TS coding or decoding scheme and/or for the BDPCM coding or decoding scheme for the chroma block is less than or equal to a maximum transform block size for a luma block divided by SubWidthC. In some embodiments of method 2400, a maximum allowed height for the TS coding or decoding scheme and/or for the BDPCM coding or decoding scheme for the chroma block is less than or equal to a maximum transform block size for a luma block divided by subHeightC. In some embodiments of method 2400, the size rule specifies that the maximum size for the video region that is a transform skip block is indicated in the bitstream with a binary syntax element. In some embodiments of method 2400, the size rule specifies that the maximum size for the video region that is a transform skip block and/or a maximum allowed transform block size is greater than or equal to a minimum coding block size.

Figure 25:
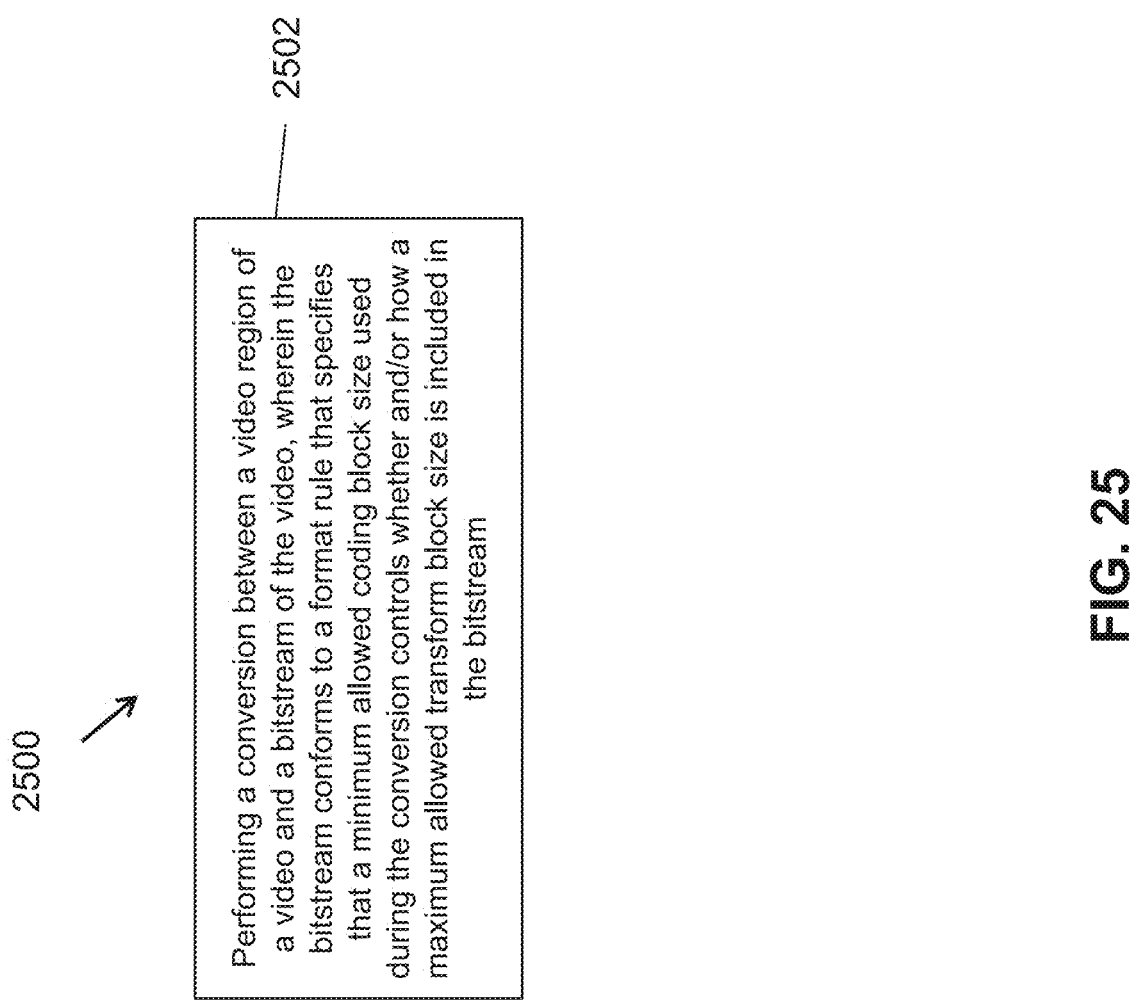

FIG. 25 is a flowchart for an example method (2500) of video processing. Operation 2502 includes performing a conversion between a video region of a video and a bitstream of the video, wherein the bitstream conforms to a format rule that specifies that a minimum allowed coding block size used during the conversion controls whether and/or how a maximum allowed transform block size is included in the bitstream.

In some embodiments of method 2500, the format rule specifies that the minimum allowed transform block size is greater than or equal to the minimum allowed coding block size. In some embodiments of method 2500, a value of sps_max_luma_transform_size_64_flag included in the bitstream is equal to 1 in response to the minimum allowed coding block size being equal to 64. In some embodiments of method 2500, a value of sps_max_luma_transform_size_64_flag is not included in the bitstream and is inferred to be 1 in response to the minimum allowed coding block size being equal to 64.

Figure 26:
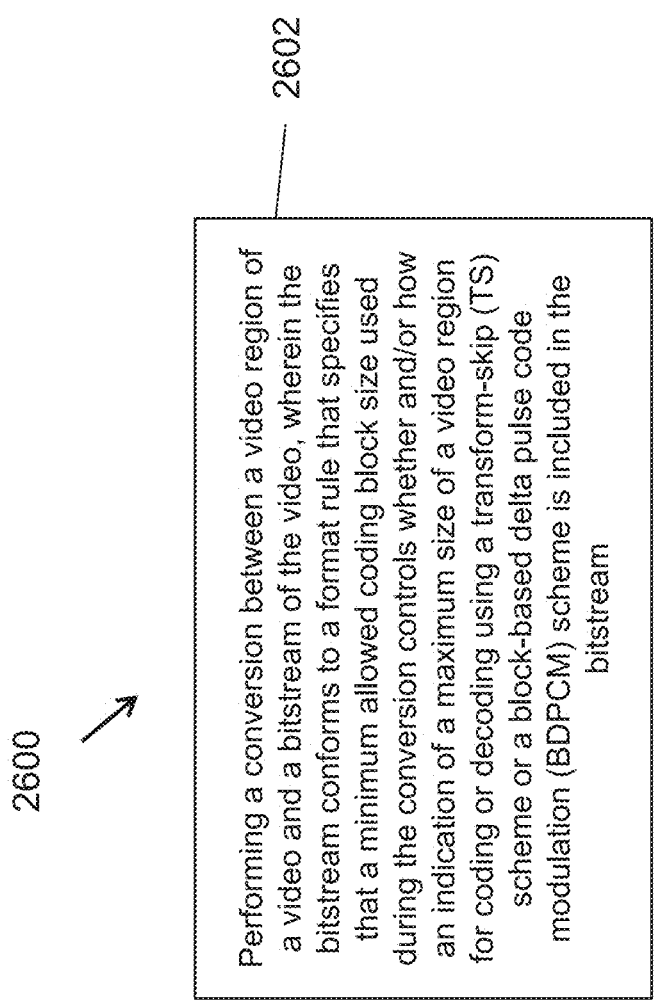

FIG. 26 is a flowchart for an example method (2600) of video processing. Operation 2602 includes performing a conversion between a video region of a video and a bitstream of the video, wherein the bitstream conforms to a format rule that specifies that a minimum allowed coding block size used during the conversion controls whether and/or how an indication of a maximum size of a video region for coding or decoding using a transform-skip (TS) scheme or a block-based delta pulse code modulation (BDPCM) scheme is included in the bitstream.

In some embodiments of method 2600, the format rule specifies that the maximum size of the video region is greater than or equal to the minimum allowed coding block size. In some embodiments of method 2600, the format rule specifies that the maximum size of the video region is less than or equal to W, wherein W is an integer. In some embodiments of method 2600, W is 32. In some embodiments of method 2600, the format rule specifies that the maximum size of the video region is greater than or equal to the minimum allowed coding block size, and wherein the format rule specifies that the maximum size of the video region is less than or equal to W. In some embodiments of method 2600, the format rule specifies that the minimum allowed coding block size is less than or equal to X when the TS scheme and/or the BDPCM scheme is enabled. In some embodiments of method 2600, the format rule specifies that the maximum size of the video region is greater than or equal to the minimum allowed coding block size when the TS scheme and/or the BDPCM scheme is enabled.

In some embodiments of method 2600, the format rule specifies that log 2 of the maximum size is greater than or equal to log 2 of a minimum luma coding block size when the TS scheme is enabled. In some embodiments of method 2600, the format rule specifies that the maximum size of the video region is a maximum of either the maximum size or the minimum allowed coding block size. In some embodiments of method 2600, the format rule specifies that the maximum size of the video region is a minimum of a first value and a second value, the first value is an integer W, and the second value is the maximum of either the maximum size or the minimum allowed coding block size. In some embodiments of method 2600, the format rule specifies that the maximum size of the video region is a maximum of either the maximum size or the minimum allowed coding block size when the TS scheme and/or the BDPCM scheme is enabled. In some embodiments of method 2600, the format rule specifies that the maximum size of the video region is a minimum of a first value and a second value when the TS scheme and/or the BDPCM scheme is enabled, the first value is an integer W, and the second value is the maximum of either the maximum size or the minimum allowed coding block size.

In some embodiments of method 2600, the format rule specifies that the maximum size of the video region is included in the bitstream based on the minimum allowed coding block size. In some embodiments of method 2600, the format rule specifies that the maximum size of the video region is indicated by including a difference between log 2 of the maximum size of the video region and log 2 of the minimum allowed coding block size in the bitstream. In some embodiments of method 2600, the format rule specifies the following: MaxTsSize=1<<(MinCbLog2SizeY+log 2_diff_max_trasform_skip_min_coding_block), << indicates a left shift operation, wherein MaxTsSize is the maximum size of the video region, wherein MinCbLog2SizeY is log 2 of a minimum coding unit size, and wherein log 2_diff_max_trasform_skip_min_coding_block is log 2 of the difference between the maximum size of the video region and the minimum allowed coding block size in the bitstream.

In some embodiments of method 2600, the format rule specifies the following:

MaxTsSize=min(W,1<<(MinCbLog2SizeY+log 2_diff_max_trasform_skip_min_coding_block)), wherein << indicates a left shift operation, wherein W is an integer, wherein MaxTsSize is the maximum size of the video region, wherein MinCbLog2SizeY is log 2 of a minimum coding unit size, and wherein log 2_diff_max_trasform_skip_min_coding_block is log 2 of the difference between the maximum size of the video region and the minimum allowed coding block size in the bitstream.

FIG. 27 is a flowchart for an example method (2700) of video processing. Operation 2702 includes performing a conversion between a video unit of a video and a bitstream of the video according to a format rule, wherein the bitstream conforms to the format rule that specifies that a minimum allowed coding block size used during the conversion controls whether and/or how a field indicative of whether a transform-skip (TS) scheme or a block-based delta pulse code modulation (BDPCM) scheme is enabled or disabled is included in the bitstream.

In some embodiments of method 2700, the format rule specifies that the field is inferred to be zero and is not included in the bitstream in response to the minimum allowed coding block size being equal to 64. In some embodiments of method 2700, the format rule specifies that the field is inferred to be zero and is not included in the bitstream in response to the minimum allowed coding block size being greater than a maximum allowed size for the TS coding scheme and/or the BDPCM coding scheme.

Figure 28:
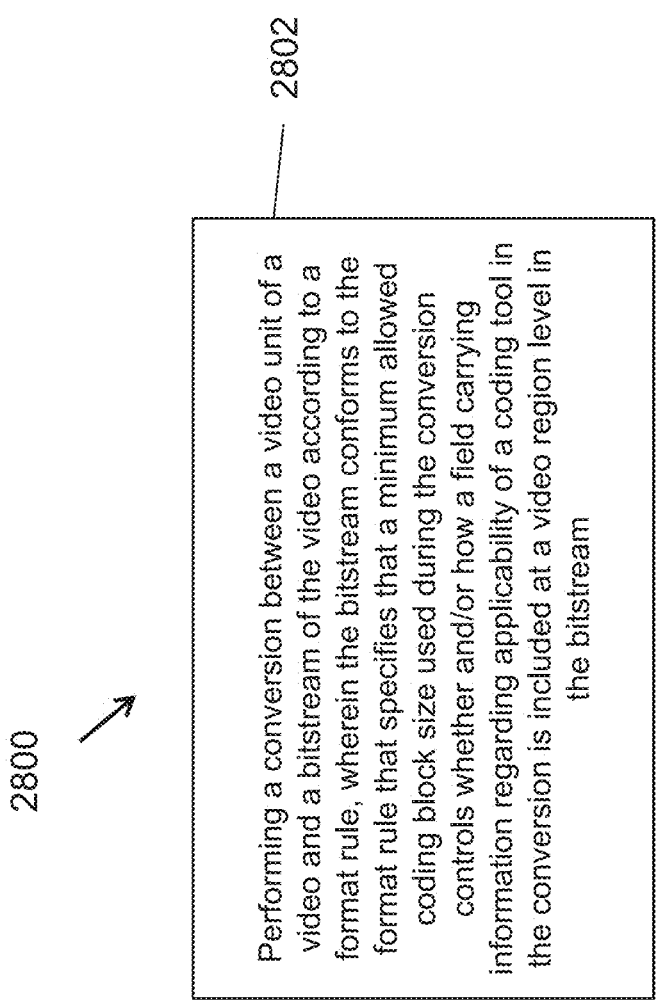

FIG. 28 is a flowchart for an example method (2800) of video processing. Operation 2802 includes performing a conversion between a video unit of a video and a bitstream of the video according to a format rule, wherein the bitstream conforms to the format rule that specifies that a minimum allowed coding block size used during the conversion controls whether and/or how a field carrying information regarding applicability of a coding tool in the conversion is included at a video region level in the bitstream.

In some embodiments of method 2800, the video region level corresponds to a sequence parameter set or a picture parameter set or a picture header or a slice header. In some embodiments of method 2800, the format rule specifies that the field for the coding tool is inferred to be not used and is not included in the bitstream in response to the minimum allowed coding block size being greater than an integer T. In some embodiments of method 2800, the format rule specifies that the field for the coding tool indicates that the coding tool is not used and is included in the bitstream in response to the minimum allowed coding block size being greater than an integer T. In some embodiments of method 2800, the coding tool includes a combined inter-intra prediction (CIIP) tool. In some embodiments of method 2800, the coding tool includes a multiple transform selection (MTS) coding tool. In some embodiments of method 2800, the coding tool includes a segment block transform (SBT) coding tool. In some embodiments of method 2800, the coding tool includes a Symmetric Motion Vector Difference (SMVD) coding tool. In some embodiments of method 2800, the coding tool includes a bi-directional optical flow (BDOF) coding tool. In some embodiments of method 2800, the coding tool includes an affine prediction coding tool.

In some embodiments of method 2800, the coding tool includes a Prediction Refine with Optical Flow (PROF) coding tool. In some embodiments of method 2800, the coding tool includes a Decoder-side Motion Vector Refinement (DMVR) coding tool. In some embodiments of method 2800, the coding tool includes a Bi-prediction with CU-level Weights (BCW) coding tool. In some embodiments of method 2800, the coding tool includes a Merge with Motion Vector Difference (MMVD) coding tool. In some embodiments of method 2800, the coding tool includes a Geometric Partitioning Mode (GPM) coding tool. In some embodiments of method 2800, the coding tool includes an Intra Block Copy (IBC) coding tool. In some embodiments of method 2800, the coding tool includes a palette coding tool. In some embodiments of method 2800, the coding tool includes an Adaptive Color Transform (ACT) coding tool. In some embodiments of method 2800, the coding tool includes a Joint Cb-Cr Residue coding (JCCR) coding tool. In some embodiments of method 2800, the coding tool includes a Cross-Component Linear Model prediction (CCLM) coding tool. In some embodiments of method 2800, the coding tool includes a Multiple Reference Line (MRL) coding tool. In some embodiments of method 2800, the coding tool includes a Matrix-based Intra-Prediction (MIP) coding tool. In some embodiments of method 2800, the coding tool includes an Intra Subpartitions Prediction (ISP) coding tool.

Figure 29:
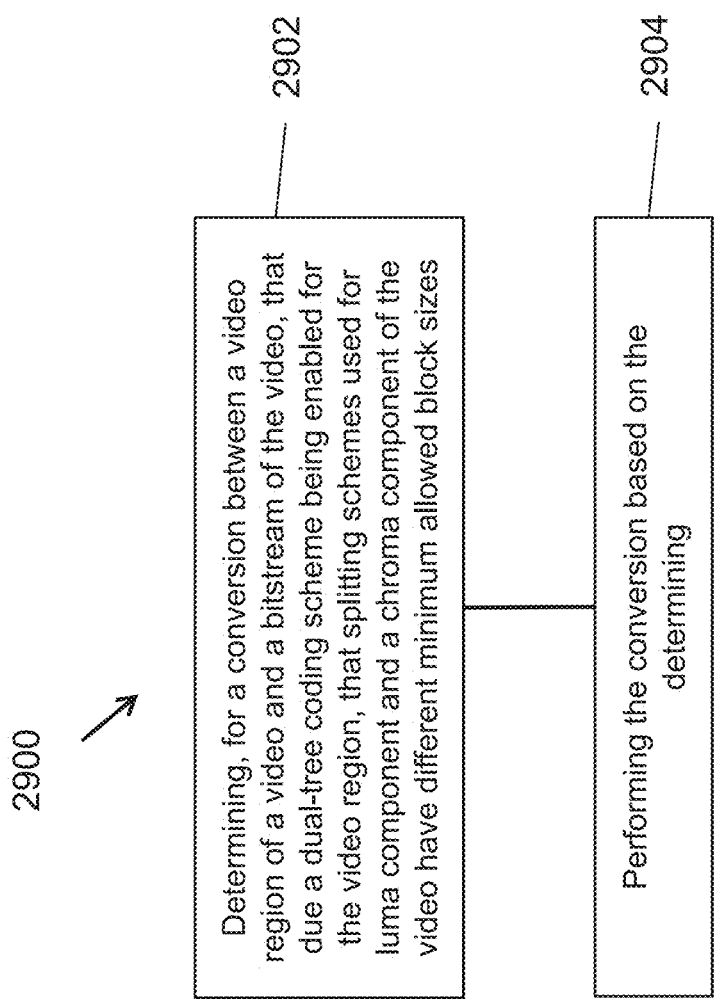

FIG. 29 is a flowchart for an example method (2900) of video processing. Operation 2902 includes determining, for a conversion between a video region of a video and a bitstream of the video, that due a dual-tree coding scheme being enabled for the video region, that splitting schemes used for luma component and a chroma component of the video have different minimum allowed block sizes. Operation 2904 includes performing the conversion based on the determining.

In some embodiments of method 2900, the splitting schemes include binary-tree splitting. In some embodiments of method 2900, a first minimum allowed block size for the binary-tree splitting for the luma component is MinBtSizeY=1<<MinBtLog2SizeY, wherein a second minimum allowed block size for the binary-tree splitting for the chroma component is MinBtSizeC=1<<MinBtLog2SizeC, wherein << indicates a left shift operation, wherein MinBtSizeY is the first minimum allowed block size, wherein MinBtLog2SizeY is log 2 of MinBtSizeY, wherein MinBtSizeC is the first minimum allowed block size, wherein MinBtLog2SizeC is log 2 of MinBtSizeC, and wherein MinBtLog2SizeY is not equal to MinBtLog2SizeC. In some embodiments of method 2900, MinBtLog2SizeY is signalled by being predicted based on a minimum coding unit size. In some embodiments of method 2900, a difference between MinBtLog2SizeY and log 2 of the minimum coding unit size is included in the bitstream. In some embodiments of method 2900, MinBtLog2SizeC is signalled by being predicted based on a minimum coding unit size.

In some embodiments of method 2900, a difference between MinBtLog2SizeC and log 2 of the minimum coding unit size is included in the bitstream. In some embodiments of method 2900, the splitting schemes include ternary-tree splitting. In some embodiments of method 2900, a minimum allowed coding block size MinCbSizeY is equal to 1<<MinCbLog2SizeY, wherein << indicates a left shift operation, and wherein MinCbLog2SizeY is log 2 of a minimum coding unit size. In some embodiments of method

2900, a first minimum allowed block size for the ternary-tree splitting for the luma component is MinTtSizeY=1<<MinTtLog2SizeY, wherein a second minimum allowed block size for the ternary-tree splitting for the chroma component is MinTtSizeC=1<<MinTtLog2SizeC, wherein << indicates a left shift operation, wherein MinTtSizeY is the first minimum allowed block size, wherein MinTtLog2SizeY is log 2 of MinTtSizeY, wherein MinTtSizeC is the first minimum allowed block size, wherein MinTtLog2SizeC is log 2 of MinTtSizeC, and wherein MinTtLog2SizeY is not equal to MinTtLog2SizeC. In some embodiments of method 2900, MinTtLog2SizeY is signalled by being predicted based on a minimum coding unit size. In some embodiments of method 2900, a difference between MinTtLog2SizeY and log 2 of the minimum coding unit size is included in the bitstream. In some embodiments of method 2900, MinTtLog2SizeC is signalled by being predicted based on a minimum coding unit size. In some embodiments of method 2900, a difference between MinTtLog2SizeC and log 2 of the minimum coding unit size is included in the bitstream.

Figure 30:
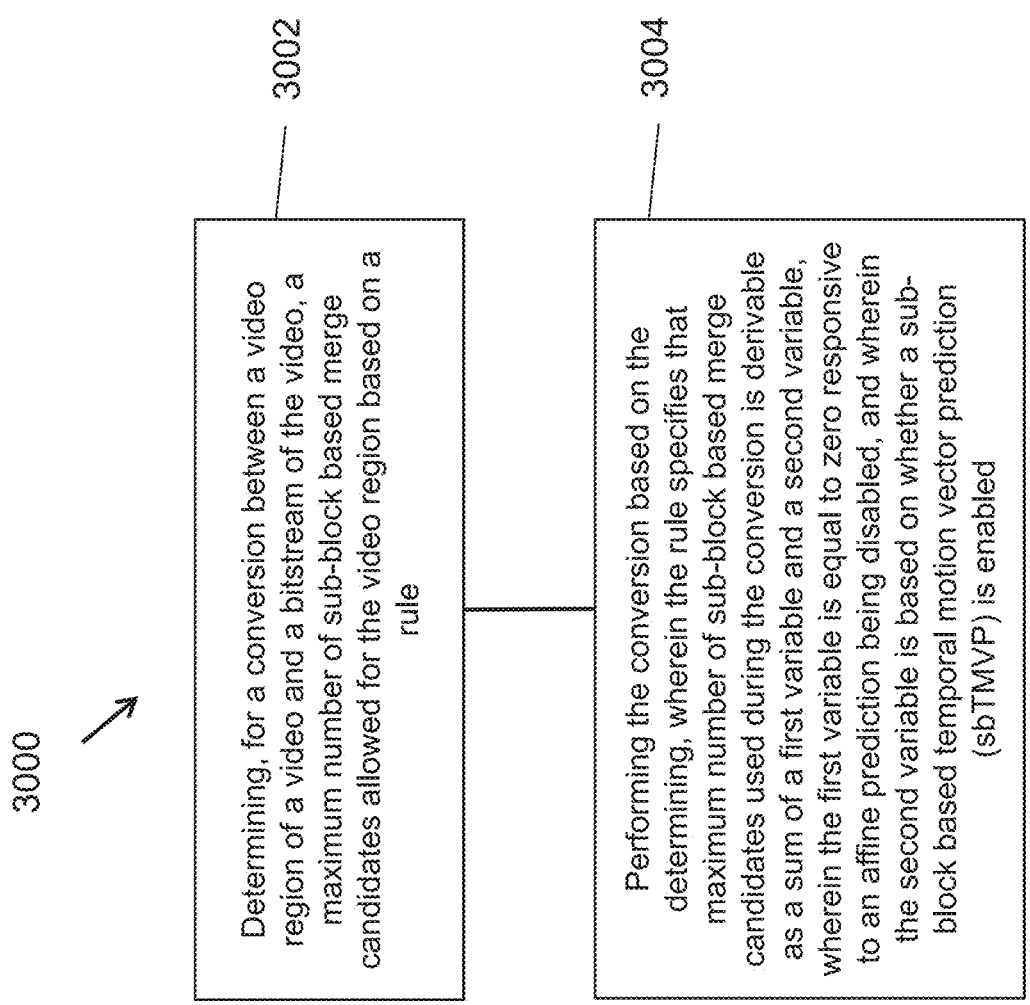

FIG. 30 is a flowchart for an example method (3000) of video processing. Operation 3002 includes determining, for a conversion between a video region of a video and a bitstream of the video, a maximum number of sub-block based merge candidates allowed for the video region based on a rule. Operation 3004 includes performing the conversion based on the determining, wherein the rule specifies that maximum number of sub-block based merge candidates used during the conversion is derivable as a sum of a first variable and a second variable, wherein the first variable is equal to zero responsive to an affine prediction being disabled, and wherein the second variable is based on whether a sub-block based temporal motion vector prediction (sbTMVP) is enabled.

In some embodiments of method 3000, the first variable represents a number of allowed affine merge candidates. In some embodiments of method 3000, the second variable is set to (sps_sbtmvp_enabled_flag && ph_temporal_mvp_enable_flag). In some embodiments of method 3000, the first variable is derived as K-S, wherein S is a value signalled by a syntax element and K is a fixed number. In some embodiments of method 3000, maximum number of sub-block based merge candidates is MaxNumSubblockMergeCand, wherein the first variable is five_minus_max_num_affine_merge_cand, and wherein MaxNumSubblockMergeCand=5−five_minus_max_num_affine_merge_cand+(sps_sbtmvp_enabled_flag && ph_temporal_mvp_enable_flag). In some embodiments of method 3000, maximum number of sub-block based merge candidates is MaxNumSubblockMergeCand, wherein the first variable is four_minus_max_num_affine_merge_cand, and wherein MaxNumSubblockMergeCand=4−four_minus_max_num_affine_merge_cand+(sps_sbtmvp_enabled_flag && ph_temporal_mvp_enable_flag). In some embodiments of method 3000, maximum number of sub-block based merge candidates is MaxNumSubblockMergeCand, and wherein MaxNumSubblockMergeCand=Min(W, MaxNumSubblockMergeCand), wherein W is a fixed number. In some embodiments of method 3000, the first variable is conditionally signalled in the bitstream. In some embodiments of method 3000, the first variable is signalled in the bitstream in response to sps_affine_enabled_flag being equal to 1. In some embodiments of method 3000, five_minus_max_num_affine_merge_cand is inferred to be K in response to the first variable being absent from the bitstream.

FIG. 31 is a flowchart for an example method (3100) of video processing. Operation 3102 includes performing a conversion between a video region of a video and a bitstream of the video region by conforming a processing rule that is applicable to the conversion due to the video being a 4:2:2 video or a 4:4:4 video, wherein the processing rule defines that chroma and luma are aligned for one or more of the following: (a) a number of pixel lines between a virtual boundary of an adaptive loop filtering (ALF) operation and a bottom boundary of a coding tree block (CTB); or (b) a filter strength of a filter applied to a row between the virtual boundary of the ALF operation and the bottom boundary of the CTB; or (c) a padding method used for padding luma and chroma samples in a same row.

In some embodiments of method 3100, the processing rule specifies that a vertical position and/or a horizontal position are aligned for the virtual boundary between chroma and luma components for the ALF operation. In some embodiments of method 3100, the processing rule specifies that a vertical position (vbPosC) of the virtual boundary for the chroma component is equal to (CtbSizeY−S)/SubHeightC in response to a vertical position (vbPosY) of the virtual boundary for the luma component being equal to (CtbSizeY−S). In some embodiments of method 3100, the processing rule specifies that a horizontal position (vbPosC) of the virtual boundary for the chroma component is equal to (CtbSizeY−S)/SubWidthC in response to a horizontal position (vbPosY) of the virtual boundary for the luma component being equal to (CtbSizeY−S). In some embodiments of method 3100, CtbSizeY is a luma CTB size of each coding tree unit (CTU), wherein S is an integer, wherein SubHeightC and/or SubWidthC have a value of 1 or 2. In some embodiments of method 3100, the processing rule specifies that the padding method used for padding K lines and/or H columns of a chroma component near a vertical position and/or a horizontal position of the virtual boundary is aligned with the padding method used for the luma component, and wherein Yc is a vertical or horizontal chroma sample position. In some embodiments of method 3100, Yc is equal to a vertical or horizontal position of the virtual boundary for the chroma component.

In some embodiments of method 3100, an above or left K unavailable lines are padded, or wherein K lines of the corresponding K unavailable lines below or right of the virtual boundary are padded, or wherein K lines of the corresponding K available lines below or right of the virtual boundary are padded. In some embodiments of method 3100, the above K unavailable lines are padded using the virtual boundary. In some embodiments of method 3100, a first row of samples is located immediately above the virtual boundary, wherein samples of a second row immediately above the first row is set equal to samples of the first row, and wherein a sample of a third row that is two rows above the first row is set equal to a sample of the first row. In some embodiments of method 3100, the K lines are padded using the virtual boundary. In some embodiments of method 3100, a first row of samples is located immediately below the virtual boundary, wherein samples of a second row located immediately below the first row are set equal to samples of the first row, and wherein a sample of a third row that is two rows below the first row is set equal to a sample of the first row.

In some embodiments of method 3100, a below or right K unavailable lines are padded, or wherein K lines of the corresponding K unavailable lines above or left of the virtual boundary are padded, or wherein K lines of the corresponding K available lines above or left of the virtual boundary are padded. In some embodiments of method 3100, Yc is equal to a vertical or horizontal position of the virtual boundary for the chroma component minus M, wherein M is an integer. In some embodiments of method 3100, a below or right K unavailable lines are padded, and wherein K lines of the corresponding K unavailable lines above or left of the virtual boundary are padded, or wherein K lines of the corresponding K available lines above or left of the virtual boundary are padded. In some embodiments of method 3100, the below K unavailable lines are padded using the virtual boundary in response to M being equal to 1. In some embodiments of method 3100, a first row of samples is located immediately below the virtual boundary, wherein samples of a second row located immediately below the first row are set equal to samples of the first row, and wherein a sample of a third row that is two rows below the first row is set equal to a sample of the first row. In some embodiments of method 3100, the corresponding K unavailable lines or the corresponding K available lines are padded using the virtual boundary in response to M being equal to 1. In some embodiments of method 3100, a first row of samples is located immediately above the virtual boundary, wherein samples of a second row immediately above the first row is set equal to samples of the first row, and wherein a sample of a third row that is two rows above the first row is set equal to a sample of the first row.

In some embodiments of method 3100, the below K unavailable lines are padded using a downmost line above the virtual boundary in response to M being greater than or equal to 2. In some embodiments of method 3100, a first row of samples is located two rows above the virtual boundary, wherein a sample of a second row located immediately below the virtual boundary is equal to a sample from the first row. In some embodiments of method 3100, the corresponding K unavailable lines or the corresponding K available lines are padded using a corresponding line of a downmost line above the virtual boundary in response to M being greater than or equal to 2. In some embodiments of method 3100, a first row of samples is located two rows above the virtual boundary, wherein a sample of a second row located two rows above the first row is equal to a sample from the first row. In some embodiments of method 3100, Yc is equal to a vertical or horizontal position of the virtual boundary for the chroma component plus N, wherein N is an integer. In some embodiments of method 3100, an above or left K unavailable lines are padded, and wherein K lines of the corresponding K unavailable lines below or right of the virtual boundary are padded, or wherein K lines of the corresponding K available lines below or right of the virtual boundary are padded. In some embodiments of method 3100, the above K unavailable lines are padded using the virtual boundary.

In some embodiments of method 3100, a first row of samples is located two rows below the virtual boundary, and wherein a sample of a second row located immediately above the virtual boundary is equal to a sample from the first row. In some embodiments of method 3100, the corresponding K unavailable lines or the corresponding K available lines are padded using the virtual boundary. In some embodiments of method 3100, a first row of samples is located two rows below the virtual boundary, and wherein a sample of a second row located two rows below the first row is equal to a sample from the first row. In some embodiments of method 3100, the processing rule specifies that a first filter strength of M lines or N columns of a chroma component near a vertical position or a horizontal position of the virtual boundary is aligned with a second filter strength used for the luma component, wherein the second filter strength for the luma component and the first filter strength of the chroma component are controlled by alfShiftY and alfShiftC, respectively, and wherein Yc is a vertical or horizontal chroma sample position. In some embodiments of method 3100, when Yc==vbPosC−M, alfShiftC=T1, and when Yc !=vbPosC−M, alfShiftC=T2, wherein vbPosC is a horizontal position of the virtual boundary for the chroma component. In some embodiments of method 3100, T1=10, and T2=7. In some embodiments of method 3100, when Yc==vbPosC+M (e.g., M=0, 1), alfShiftC=T1, and when Yc !=vbPosC+M, alfShiftC=T2, wherein vbPosC is a horizontal position of the virtual boundary for the chroma component. In some embodiments of method 3100, T1=10, and T2=7.

In some embodiments of methods 2300-3100, the performing the conversion comprising encoding the video into the bitstream. In some embodiments of methods 2300-3100, the performing the conversion comprises generating the bitstream from the video, and the method further comprises storing the bitstream in a non-transitory computer-readable recording medium. In some embodiments of methods 2300-3100, the performing the conversion comprises decoding the video from the bitstream. In some embodiments, a video decoding apparatus comprising a processor configured to implement methods 2300-3100 and operations of the related embodiments. In some embodiments, a video encoding apparatus comprising a processor configured to implement methods 2300-3100 and operations of the related embodiments. In some embodiments, a computer program product having computer instructions stored thereon, the instructions, when executed by a processor, causes the processor to implement methods 2300-3100 and operations of the related embodiments. In some embodiments, a non-transitory computer-readable recording medium storing a bitstream of a video which is generated by a method performed by a video processing apparatus, wherein the method comprises: generating the bitstream from the video region of the video, wherein the bitstream conforms to a format rule, wherein the format rule specifies that information about applicability of a tool to the conversion is indicated in the bitstream at a video slice level and/or at a video picture level, and wherein the tool maps luma samples to particular values and selectively applies a scaling operation to the values of chroma samples. In some embodiments, a non-transitory computer-readable storage medium storing instructions that cause a processor to implement methods 2300-3100 and operations of the related embodiments. In some embodiments, a method of bitstream generation, comprising: generating a bitstream of a video according to methods 2300-3100 and operations of the related embodiments, and storing the bitstream on a computer-readable program medium. In some embodiments, a method, an apparatus, a bitstream generated according to a disclosed method or a system described in the present document.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically EPROM (EEPROM), and flash memory devices; magnetic disks, e.g., internal hard disks or removable disks; magneto optical disks; and compact disc read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
performing a conversion between a video comprising a video unit and a bitstream of the video,
wherein the bitstream conforms to a format rule,
wherein the format rule specifies that a first syntax element indicating whether an in-loop filtering operation is allowed to be performed across tile boundaries is selectively included in the bitstream based on whether the video unit is partitioned into more than one tile,
wherein the format rule specifies that the first syntax element is included in the bitstream when the bitstream includes a value of zero for a second constraints information syntax element,
wherein the second constraints information syntax element indicates whether there is only one tile per picture as a constraint, and
wherein the value of zero for the second constraints information syntax element indicates that the constraint is not imposed.

2. The method of claim 1, wherein the video unit is a picture.

3. The method of claim 1, wherein the first syntax element is in a picture parameter set.

4. The method of claim 1, wherein the format rule specifies that the first syntax element is included in the bitstream when the video unit being partitioned into more than one tile.

5. The method of claim 1, wherein the format rule specifies that the first syntax element is excluded from the bitstream when the video unit comprising only one tile.

6. The method of claim 1, wherein the format rule specifies that the first syntax element is inferred to be equal to zero and is excluded from the bitstream when the bitstream includes a value of one for a second constraints information syntax element, wherein the second constraints information syntax element indicates whether there is only one tile per picture as a constraint, wherein the value of one for the second constraints information syntax element indicates that the constraint is imposed, and wherein the first syntax element being equal to zero indicates that the in-loop filtering operation across the tile boundaries is disabled.

7. The method of claim 1, wherein the second constraints information syntax element is one_tile_per_pic_constraint_flag.

8. The method of claim 1, wherein the in-loop filtering operation includes at least one of a deblocking filter operation, a sample adaptive offset operation, or an adaptive loop filter operation.

9. The method of claim 1, wherein the first syntax element is loop_filter_across_tiles_enabled_flag.

10. The method of claim 1, wherein the conversion comprises encoding the video into the bitstream.

11. The method of claim 1, wherein the conversion comprises decoding the video from the bitstream.

12. An apparatus for processing video data comprising a processor and a non-transitory memory with instructions thereon, wherein the instructions upon execution by the processor, cause the processor to:
perform a conversion between a video comprising a video unit and a bitstream of the video,
wherein the bitstream conforms to a format rule,
wherein the format rule specifies that a first syntax element indicating whether an in-loop filtering operation is allowed to be performed across tile boundaries is selectively included in the bitstream based on whether the video unit is partitioned into more than one tile,
wherein the format rule specifies that the first syntax element is included in the bitstream when the bitstream includes a value of zero for a second constraints information syntax element,
wherein the second constraints information syntax element indicates whether there is only one tile per picture as a constraint, and
wherein the value of zero for the second constraints information syntax element indicates that the constraint is not imposed.

13. The apparatus of claim 12, wherein the video unit is a picture,
wherein the format rule specifies that the first syntax element is included in the bitstream when the video unit being partitioned into more than one tile,
wherein the format rule specifies that the first syntax element is excluded from the bitstream when the video unit comprising only one tile,
wherein the in-loop filtering operation includes at least one of a deblocking filter operation, a sample adaptive offset operation, or an adaptive loop filter operation, and
wherein the first syntax element is loop_filter_across_tiles_enabled_flag.

14. The apparatus of claim 12,
wherein the format rule specifies that the first syntax element is inferred to be equal to zero and is excluded from the bitstream when the bitstream includes a value of one for a second constraints information syntax element, wherein the second constraints information syntax element indicates whether there is only one tile per picture as a constraint, wherein the value of one for the second constraints information syntax element indicates that the constraint is imposed, and wherein the first syntax element being equal to zero indicates that the in-loop filtering operation across tile boundaries is disabled, and
wherein the second constraints information syntax element is one_tile_per_pic_constraint_flag.

15. A non-transitory computer-readable storage medium storing instructions that cause a processor to:
perform a conversion between a video comprising a video unit and a bitstream of the video,
wherein the bitstream conforms to a format rule,
wherein the format rule specifies that a first syntax element indicating whether an in-loop filtering operation is allowed to be performed across tile boundaries is selectively included in the bitstream based on whether the video unit is partitioned into more than one tile,
wherein the format rule specifies that the first syntax element is included in the bitstream when the bitstream includes a value of zero for a second constraints information syntax element,
wherein the second constraints information syntax element indicates whether there is only one tile per picture as a constraint, and
wherein the value of zero for the second constraints information syntax element indicates that the constraint is not imposed.

16. The non-transitory computer-readable storage medium of claim 15, wherein the video unit is a picture,
wherein the format rule specifies that the first syntax element is included in the bitstream when the video unit being partitioned into more than one tile,
wherein the format rule specifies that the first syntax element is excluded from the bitstream when the video unit comprising only one tile,
wherein the in-loop filtering operation includes at least one of a deblocking filter operation, a sample adaptive offset operation, or an adaptive loop filter operation, and
wherein the first syntax element is loop_filter_across_tiles_enabled_flag.

17. The non-transitory computer-readable storage medium of claim 15,
wherein the format rule specifies that the first syntax element is inferred to be equal to zero and is excluded from the bitstream when the bitstream includes a value of one for a second constraints information syntax element, wherein the second constraints information syntax element indicates whether there is only one tile per picture as a constraint, wherein the value of one for the second constraints information syntax element indicates that the constraint is imposed, and wherein the first syntax element being equal to zero indicates that the in-loop filtering operation across tile boundaries is disabled, and wherein the second constraints information syntax element is one_tile_per_pic_constraint_flag.

18. A non-transitory computer-readable recording medium storing a bitstream of a video which is generated by a method performed by a video processing apparatus, wherein the method comprises:

generating a bitstream for a video comprising a video unit, wherein the bitstream conforms to a format rule, wherein the format rule specifies that a first syntax element indicating whether an in-loop filtering operation is allowed to be performed across tile boundaries is selectively included in the bitstream based on whether the video unit is partitioned into more than one tile, wherein the format rule specifies that the first syntax element is included in the bitstream when the bitstream includes a value of zero for a second constraints information syntax element, wherein the second constraints information syntax element indicates whether there is only one tile per picture as a constraint, and wherein the value of zero for the second constraints information syntax element indicates that the constraint is not imposed.

19. The non-transitory computer-readable recording medium of claim 18, wherein the video unit is a picture, wherein the format rule specifies that the first syntax element is included in the bitstream when the video unit being partitioned into more than one tile, wherein the format rule specifies that the first syntax element is excluded from the bitstream when the video unit comprising only one tile, wherein the in-loop filtering operation includes at least one of a deblocking filter operation, a sample adaptive offset operation, or an adaptive loop filter operation, wherein the first syntax element is loop_filter_across_tiles_enabled_flag, wherein the format rule specifies that the first syntax element is inferred to be equal to zero and is excluded from the bitstream when the bitstream includes a value of one for a second constraints information syntax element, wherein the second constraints information syntax element indicates whether there is only one tile per picture as a constraint, wherein the value of one for the second constraints information syntax element indicates that the constraint is imposed, and wherein the first syntax element being equal to zero indicates that the in-loop filtering operation across tile boundaries is disabled, and wherein the second constraints information syntax element is one_tile_per_pic_constraint_flag.

* * * * *